United States Patent
Setlur et al.

(10) Patent No.: US 11,030,207 B1
(45) Date of Patent: Jun. 8, 2021

(54) UPDATING DISPLAYED DATA VISUALIZATIONS ACCORDING TO IDENTIFIED CONVERSATION CENTERS IN NATURAL LANGUAGE COMMANDS

(71) Applicant: Tableau Software, Inc., Seattle, WA (US)

(72) Inventors: Vidya R. Setlur, Portola Valley, CA (US); Sarah E. Battersby, Seattle, WA (US); Melanie K. Tory, Palo Alto, CA (US); Richard C. Gossweiler, III, Sunnyvale, CA (US); Angel Xuan Chang, Stanford, CA (US); Isaac J. Dykeman, Bethesda, MD (US); MD Enamul Hoque Prince, Vancouver (CA)

(73) Assignee: Tableau Software, Inc., Seattle, WA (US)

( * ) Notice: Subject to any disclaimer, the term of this patent is extended or adjusted under 35 U.S.C. 154(b) by 143 days.

(21) Appl. No.: 15/978,067

(22) Filed: May 11, 2018

Related U.S. Application Data

(63) Continuation-in-part of application No. 15/804,991, filed on Nov. 6, 2017, now Pat. No. 10,817,527, (Continued)

(51) Int. Cl.
*G06F 17/30* (2006.01)
*G06F 16/248* (2019.01)
(Continued)

(52) U.S. Cl.
CPC ........ *G06F 16/248* (2019.01); *G06F 3/04847* (2013.01); *G06F 16/243* (2019.01);
(Continued)

(58) Field of Classification Search
CPC .... G06F 16/951; G06F 16/901; G06F 16/248; G06F 16/221; G06F 16/26
See application file for complete search history.

(56) References Cited

U.S. PATENT DOCUMENTS

| 7,089,266 B2 * | 8/2006 | Stolte | G06F 40/18 |
| | | | 707/769 |
| 7,716,173 B2 * | 5/2010 | Stolte | G06F 16/283 |
| | | | 707/600 |

(Continued)

OTHER PUBLICATIONS

Allen, J. Recognizing Intentions from Natural Language Utterances. In Computational Models of Discourse, M. Brady, Ed. M.I.T. Press, Cambridge, Massachusetts, 1982, 12 pgs.

(Continued)

*Primary Examiner* — Daniel A Kuddus
(74) *Attorney, Agent, or Firm* — Morgan, Lewis & Bockius LLP

(57) ABSTRACT

A method uses natural language for visual analysis of a dataset. The method displays a data visualization based on a first dataset. The method then extracts analytic phrases from a first natural language command related to the data visualization. The method computes conversation centers associated with the first natural language command based on the analytic phrases and computes analytical functions for the conversation centers, thereby creating functional phrases. The method updates the data visualization based on the functional phrases. The method extracts new analytic phrases from a second natural language command related to the updated data visualization and computes a temporary conversation centers associated with the second natural language command based on the new analytic phrases. The method derives new conversation centers from the original conversation centers and the temporary conversation centers (Continued)

using transitional rules. The method then updates the data visualization based on the new conversation centers.

23 Claims, 67 Drawing Sheets

Related U.S. Application Data which is a continuation-in-part of application No. 15/486,265, filed on Apr. 12, 2017, now Pat. No. 10,515,121.

(60) Provisional application No. 62/321,695, filed on Apr. 12, 2016, provisional application No. 62/418,052, filed on Nov. 4, 2016, provisional application No. 62/500,999, filed on May 3, 2017, provisional application No. 62/598,399, filed on Dec. 13, 2017.

(51) Int. Cl.
    *G06K 9/62*         (2006.01)
    *G06F 3/0484*     (2013.01)
    *G06F 16/242*     (2019.01)
    *G06F 16/2452*    (2019.01)
    *G06F 40/30*      (2020.01)

(52) U.S. Cl.
    CPC ........ *G06F 16/24522* (2019.01); *G06F 40/30* (2020.01); *G06K 9/6223* (2013.01)

(56) References Cited

U.S. PATENT DOCUMENTS

| | | | | |
|---|---|---|---|---|
| 8,489,641 | B1 | 7/2013 | Seefeld et al. | |
| 8,713,012 | B2* | 4/2014 | Martino | G06Q 10/06 707/736 |
| 8,713,072 | B2* | 4/2014 | Stolte | G06F 16/283 707/802 |
| 8,972,457 | B2* | 3/2015 | Stolte | G06F 40/177 707/802 |
| 9,183,235 | B2* | 11/2015 | Stolte | G06F 16/252 |
| 9,477,752 | B1 | 10/2016 | Romano | |
| 9,501,585 | B1* | 11/2016 | Gautam | G06F 16/26 |
| 9,575,720 | B2 | 2/2017 | Faaborg et al. | |
| 9,794,613 | B2 | 10/2017 | Jang et al. | |
| 9,858,292 | B1* | 1/2018 | Setlur | G06F 16/248 |
| 9,953,645 | B2* | 4/2018 | Bak | G10L 15/22 |
| 2004/0030741 | A1* | 2/2004 | Wolton | G06F 16/954 709/202 |
| 2006/0218140 | A1* | 9/2006 | Whitney | G06F 16/338 |
| 2007/0174350 | A1* | 7/2007 | Pell | G06F 3/038 |
| 2009/0299990 | A1* | 12/2009 | Setlur | G06F 16/58 |
| 2010/0030552 | A1 | 2/2010 | Chen et al. | |
| 2010/0110076 | A1* | 5/2010 | Hao | G07C 3/12 345/440 |
| 2010/0313164 | A1 | 12/2010 | Louch et al. | |
| 2012/0179713 | A1* | 7/2012 | Stolte | G06F 16/282 707/769 |
| 2013/0031126 | A1* | 1/2013 | Setlur | G06F 16/248 707/769 |
| 2015/0058318 | A1* | 2/2015 | Blackwell | G06F 16/248 707/722 |
| 2015/0123999 | A1 | 5/2015 | Ofstad et al. | |
| 2015/0310855 | A1* | 10/2015 | Bak | G10L 15/22 704/249 |
| 2015/0379989 | A1 | 12/2015 | Balasubramanian et al. | |
| 2016/0261675 | A1 | 9/2016 | Block et al. | |
| 2018/0108359 | A9 | 4/2018 | Gunn et al. | |

OTHER PUBLICATIONS

Androutsopoulos, I., Ritchie, G. D., and Thanisch, P. Natural language interfaces to databases—an introduction. Natural Language Engineering 1, Mar. 16, 1995, 50 pgs.

Aurisano, J., Kumar, A., Gonzales, A., Reda, K., Leigh, J., Di Eugenio, B., and Johnson, A. Show me data? observational study of a conversational interface in visual data exploration. In Poster at IEEE VIS 2015, IEEE (2015) 2 pgs.

Bostock, M., Ogievetsky, V., and Heer, J. D3: Data-driven documents. IEEE Transactions on Visualization & Graphics (Proc. InfoVis), Oct. 23, 2011, 9 pgs.

Carbonell, J. G., Boggs, W. M., Mauldin, M. L., and Anick, P. G. The xcalibur project, a natural language interface to expert systems and data bases, 1985, 5 pgs.

Cover, T. M., and Thomas, J. A. Elements of Information Theory. Wiley-Interscience, New York, NY, USA, 1991, 36 pgs.

Cox, K., Grinter, R. E., Hibino, S. L., Jagadeesan, L. J., and Mantilla, D. A multi-modal natural language interface to an information visualization environment. International Journal of Speech Technology 4, 3 (2001), 18 pgs.

Egenhofer, M. Spatial sql: A query and presentation language. IEEE Transactions on Knowledge and Data Engineering 6, 1 (1994), 12 pgs.

Finin, T., Joshi, A. K., and Webber, B. Natural language interactions with artificial experts. Proceedings of the IEEE 74, 7 (Jun. 1986), 19 pgs.

Frank, A. U., and Mark, D. M. Language issues for geographical information systems. In Geographical Information Systems: Principles and Applications, vol. 1, D. Maguire, M. Goodchild, and D. Rhind, Eds. Longman, London, 1991, 26 pgs.

Gao, T., Dontcheva, M., Adar, E., Liu, Z., and Karahalios, K. G. Datatone: Managing ambiguity in natural language interfaces for data visualization. In Proceedings of the 28th Annual ACM Symposium on User Interface Software Technology, UIST '15, ACM (New York, NY, USA, 2015), 12 pgs.

Grammel, L., Tory, M., and Storey, M. A. How information visualization novices construct visualizations. IEEE Transactions on Visualization and Computer Graphics 16, (Nov. 6, 2010), 10 pgs.

IBM Watson Analytics. http://www.ibm.com/analytics/watson-analytics/, downloaded on May 9, 2017, 6 pgs.

Kumar et al., "Towards a Dialogue System that Supports Rich Visualizations of Data," Proceeding of the Sigdual 2016 Conference, LA, USA, ACL, Sep. 13, 2016, pp. 304-209, Xp055496498.

Lawson, I-want-to-go moments: From search to store. https://www.thinkwithgoogle.com/articles/i-want-to-go-micro-moments.html, Apr. 2015, 7 pgs.

Li, F., and Jagadish, H. V. Constructing an interactive natural language interface for relational databases. Proc. VLDB Endow. 8, (Sep. 1, 2014), 12 pgs.

Microsoft Q & A. https://powerbi.microsoft.com/en-us/documentation/powerbi-service-q-and-a/, Mar. 14, 2017, 5 pgs.

Montello, D., Goodchild, M., Gottsegen, J., and Fohl, P. Where's downtown? behavioral methods for determining referents for vague spatial queries. Spatial Cognition and Computation 3, 2&3 (2003), 20 pgs.

NarrativeScience, Turn your data into better decisions with Quill, https://www.narrativescience.com/quill, downloaded on May 9, 2017, 12 pgs.

Ng, H. T., and Zelle, J. Corpus-based approaches to semantic interpretation in natural language processing. AI Magazine Winter 1997, (1997), 20 pgs.

Node.js®. https://nodejs.org/, downloaded on May 10, 2017, 1 pg.

Oviatt, S., and Cohen, P. Perceptual user interfaces: Multimodal interfaces that process what comes naturally. Commun. ACM 43, (Mar. 3, 2000), 9 pgs.

Parr, T. The Definitive ANTLR 4 Reference, 2nd ed. Pragmatic Bookshelf 2013, 322 pgs.

Pedersen, T., Patwardhan, S., and Michelizzi, J. Wordnet::similarity: Measuring the relatedness of concepts. In Demonstration Papers at

(56) References Cited

OTHER PUBLICATIONS

HLT-NAACL 2004, HLT-NAACL—Demonstrations '04, Association for Computational Linguistics (Stroudsburg, PA, USA, 2004), 2 pgs.
Popescu, A.-M., Etzioni, O., and Kautz, H. Towards a 1 theory of natural language interfaces to databases. In Proceedings of the 8th International Conference on Intelligent User Interfaces, IUI '03, ACM (New York, NY, USA, 2003), 9 pgs.
Pustejovsky, J., Castanño, J., Ingria, R., Saurí, R., Gaizauskas, R., Setzer, A., and Katz, G. Timeml: Robust specification of vvent and temporal expressions in text. In in Fifth International Workshop on Computational Semantics (IWCS-5 (2003), 7 pgs.
Reinhart, T. Pragmatics and Linguistics: An Analysts of Sentence Topics. IU Linguistics Club publications. Reproduced by the Indiana University Linguistics Club, 1982, 5 pgs.
Setlur, Pre-Interview First Office Action dated Jul. 5, 2018, received in U.S. Appl. No. 15/486,265, 5 pgs.
Setlur, First Action Interview Office Action dated Aug. 29, 2019, received in U.S. Appl. No. 15/486,265, 6 pgs.
Setlur, Final Office Action dated Apr. 25, 2019, received in U.S. Appl. No. 15/486,265, 15 pgs.
Setlur, Notice of Allowance dated Sep. 6, 2019, received in U.S. Appl. No. 15/486,265, 13 pgs.
Setlur, Pre-Interview First Office Action dated Sep. 6, 2019, received in U.S. Appl. No. 15/804,991, 4 pgs.
Setlur, First Action Interview Office Action dated Oct. 29, 2019, received in U.S. Appl. No. 15/804,991, 6 pgs.
Setkur et al., Eviza: A Natural Language Interface for Visual Analysis, ACM Oct. 16, 2016, 13 pgs.
Sun, Y., L. J. J. A., and Di Eugenio, B. Articulate: Creating meaningful visualizations from natural language. In Innovative Approaches of Data Visualization and Visual Analytics, IGI Global, Hershey, PA (2014), 20 pgs.
Tableau, Communication Pursuant to Rules 161(1) and 162, EP18729514.2, dated Jun. 17, 2019, 3 pgs.
Tableau Software, Inc., International Searh Report and Written Opinion, PCT/US2018/030959, dated Sep. 14, 2018, 13 pgs.
Tableau Software, Inc., International Preliminary Report on Patentability, PCT/US2018/030959, dated Nov. 5, 2019, 11 pgs.
ThoughtSpot. Search-Driven Analytics for Humans, http://www.thoughtspot.com/, downloaded May 9, 2017, 9 pgs.
Turf: Advanced geospatial analysis for browsers and node. http://turfjs.org, downloaded May 9, 2017, 2 pgs.
Wikipedia, Extended Backus-Naur Form. https://en.wikipedia.org/wiki/Extended_Backus%E2%80%93Naur_Form, last edited on Jan. 7, 2017, 7 pgs.
Winograd, T. Procedures as a Representation for Data in a Computer Program for Understanding Natural Language. PhD thesis, Feb. 1971, 472 pgs.
WolframAlpha. Profesional-grade computational, https://www.wolframal.com/, downloaded May 9, 2017, 25 pgs.
Wu, Z., and Palmer, M. Verbs semantics and lexical selection. In Proceedings of the 32nd Annual Meeting on Association for Computational Linguistics, ACL '94, Association for Computational Linguistics (Stroudsburg, PA, USA, 1994), 6 pgs.

\* cited by examiner

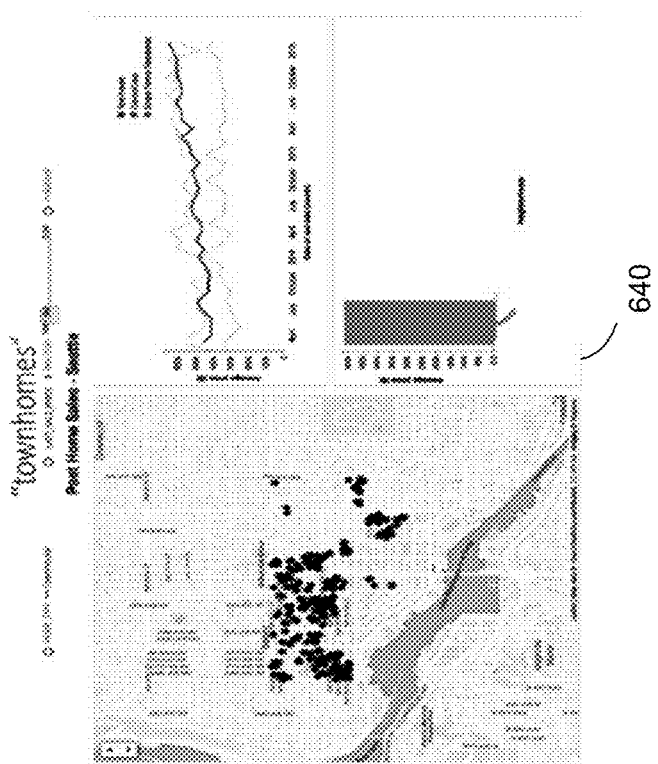
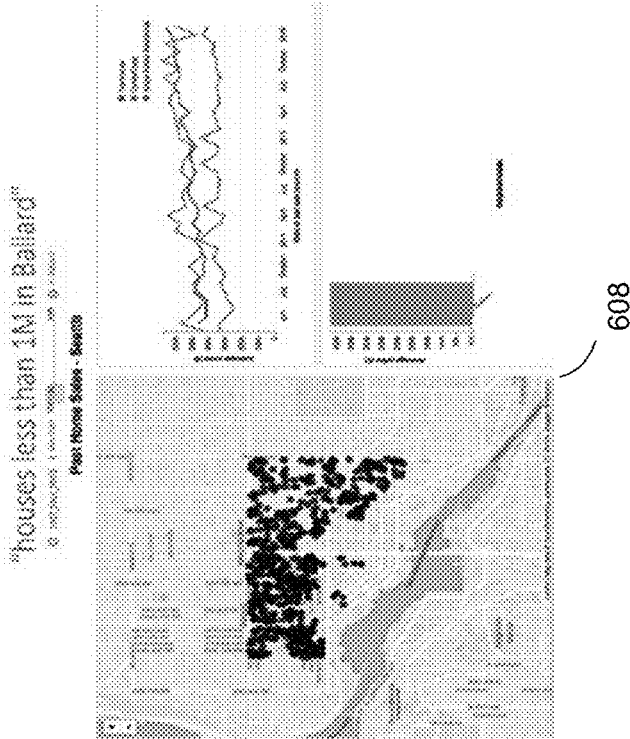
Figure 6B

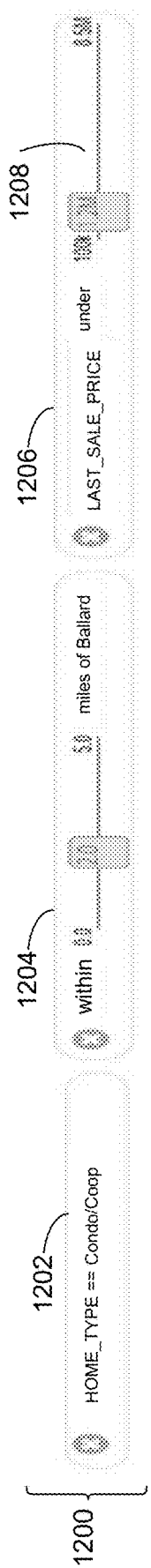

Figure 12A

A JOHN: condo under 600k last summer
  EVIZEON: 995 results found.

B JOHN: near Ballars
  EVIZEON: Showing results for near *Ballard*

C JOHN: Luxuriouslooking homes near south lake union
  EVIZEON: The system doesn't understand the query: *luxuriouslooking*. Showing results for homes near south lake union.

D JOHN: houses in downtown under 50k
  EVIZEON: No results found. Try a different query.

E JOHN: houses with overlooking lake
  EVIZEON: Please provide a more specific query.

Figure 12B

UPDATING DISPLAYED DATA VISUALIZATIONS ACCORDING TO IDENTIFIED CONVERSATION CENTERS IN NATURAL LANGUAGE COMMANDS

RELATED APPLICATIONS

This application is a continuation-in-part of U.S. patent application Ser. No. 15/804,991, filed Nov. 6, 2017, entitled "Systems and Methods of Using Natural Language Processing for Visual Analysis of a Data Set," which is a continuation-in-part of U.S. patent application Ser. No. 15/486,265, filed Apr. 12, 2017, entitled "Systems and Methods of Using Natural Language Processing for Visual Analysis of a Data Set," which claims priority to both (1) U.S. Provisional Application Ser. No. 62/321,695, filed Apr. 12, 2016, entitled "Using Natural Language Processing for Visual Analysis of a Data Set" and (2) U.S. Provisional Application Ser. No. 62/418,052, filed Nov. 4, 2016, entitled "Using Natural Language Processing for Visual Analysis of a Data Set," each of which is incorporated by reference herein in its entirety. U.S. patent application Ser. No. 15/804,991 also claims priority to U.S. Provisional Application Ser. No. 62/500,999, filed May 3, 2017, entitled "Applying Pragmatics Principles for Interaction with Visual Analytics," which is incorporated by reference herein in its entirety. This application also claims priority to U.S. Provisional Application Ser. No. 62/598,399, filed Dec. 13, 2017, entitled "Identifying Intent in Visual Analytical Conversations," which is incorporated by reference herein in its entirety.

This application is related to U.S. Pat. No. 9,183,235, filed Mar. 3, 2015, which is incorporated by reference herein in its entirety.

TECHNICAL FIELD

The disclosed implementations relate generally to data visualization and more specifically to systems, methods, and user interfaces that enable users to interact with and explore datasets using a natural language interface.

BACKGROUND

Data visualization applications enable a user to understand a data set visually, including distribution, trends, outliers, and other factors that are important to making business decisions. Some data sets are very large or complex, and include many data fields. Various tools can be used to help understand and analyze the data, including dashboards that have multiple data visualizations. However, some functionality may be difficult to use or hard to find within a complex user interface. Most systems return only very basic interactive visualizations in response to queries, and others require expert modeling to create effective queries. Other systems require simple closed-ended questions, and then are only capable of returning a single text answer or a static visualization.

SUMMARY

Accordingly, there is a need for tools that allow users to effectively utilize functionality provided by data visualization applications. One solution to the problem is providing a natural language interface as part of a data visualization application (e.g., within the user interface for the data visualization application) for an interactive query dialog that provides graphical answers to natural language queries. The natural language interface allows users to access complex functionality using ordinary questions or commands. Questions and insights often emerge from previous questions and patterns of data that a person sees. By modeling the interaction behavior as a conversation, the natural language interface can apply principles of pragmatics to improve interaction with visual analytics. Through various techniques for deducing the grammatical and lexical structure of utterances and their context, the natural language interface supports various pragmatic forms of natural language interaction with visual analytics. These pragmatic forms include understanding incomplete utterances, referring to entities within utterances and visualization properties, supporting long, compound utterances, identifying synonyms and related concepts, and 'repairing' responses to previous utterances. Furthermore, the natural language interface provides appropriate visualization responses either within an existing visualization or by creating new visualizations when necessary, and resolves ambiguity through targeted textual feedback and ambiguity widgets. In this way, the natural language interface allows users to efficiently explore data displayed (e.g., in a data visualization) within the data visualization application.

In accordance with some implementations, a method executes at an electronic device with a display. For example, the electronic device can be a smart phone, a tablet, a notebook computer, or a desktop computer. The device displays a data visualization based on a dataset retrieved from a database using a first set of one or more database queries. A user specifies a first natural language command related to the displayed data visualization. Based on the displayed data visualization, the device extracts a first set of one or more independent analytic phrases from the first natural language command. The device then computes a first set of one or more conversation centers associated with the first natural language command based on the first set of one or more analytic phrases. The device then computes a first set of analytical functions associated with the first set of one or more conversation centers, thereby creating a first set of one or more functional phrases. The device then updates the data visualization based on the first set of one or more functional phrases.

In some implementations, the device receives a second natural language command related to the updated data visualization. After receiving the second natural language command, the device extracts a second set of one or more independent analytic phrases from the second natural language command, and computes a temporary set of one or more conversation centers associated with the second natural language command based on the second set of one or more analytic phrases, according to some implementations. The device then derives a second set of one or more conversation centers from the first set of one or more conversation centers and the temporary set of one or more conversation centers using one or more transitional rules. The device computes a second set of one or more analytical functions associated with the second set of one or more conversation centers, thereby creating a second set of one or more functional phrases. The device then updates the data visualization based on the second set of one or more functional phrases.

In some implementations, each of the conversation centers of the first set of one or more conversation centers, the temporary set of one or more conversation centers, and the second set of one or more conversation centers comprises a value for a variable (e.g., a data attribute or a visualization property). In such implementations, the device uses the transitional rules by performing a sequence of operations that comprises: determining whether a first variable is included in the first set of one or more conversation centers; determining whether the first variable is included in the temporary set of one or more conversation centers; determining a respective transitional rule of the one or more transitional rules to apply based on whether the first variable is included in the first set of one or more conversation centers and/or the temporary set of one or more conversation centers; and applying the respective transitional rule.

In some implementations, the one or more transitional rules used by the device comprise a CONTINUE rule for including each conversation center in the first set of one or more conversation centers in the second set of one or more conversation centers, and adding one or more conversation centers from the temporary set of one or more conversation centers to the second set of one or more conversation centers.

In some such implementations, the device applies the respective transitional rule by performing a sequence of operations that comprises: when (i) the first variable is included in the temporary set of one or more conversation centers, and (ii) the first variable is not included in the first set of one or more conversation centers, the device applies the CONTINUE rule to include the first variable to the second set of one or more conversation centers.

In some implementations, the one or more transitional rules used by the device comprise a RETAIN rule for retaining each conversation center in the first set of one or more conversation centers in the second set of one or more conversation centers without adding any conversation center from the temporary set of one or more conversation centers to the second set of one or more conversation centers.

In some such implementations, the device applies the respective transitional rule by performing a sequence of operations that comprises: when (i) the first variable is included in the first set of one or more conversation centers, and (ii) the first variable is not included in the temporary set of one or more conversation centers, apply the RETAIN rule to include each conversation center in the first set of one or more conversation centers to the second set of one or more conversation centers.

In some implementations, the one or more transitional rules used by the device comprise a SHIFT rule for including each conversation center in the first set of one or more conversation centers in the second set of one or more conversation centers, and replacing one or more conversation centers in the second set of one or more conversation centers with conversation centers in the temporary set of one or more conversation centers.

In some such implementations, the device applies the respective transitional rule by performing a sequence of operations that comprises: when (i) the first variable is included in the first set of one or more conversation centers, and (ii) the first variable is included in the temporary set of one or more conversation centers: determine whether a first value of the first variable in the first set of one or more conversation centers is different from a second value of the first variable in the temporary set of one or more conversation centers; when the first value is different from the second value, apply the SHIFT rule for including each conversation center in the first set of one or more conversation centers in the second set of one or more conversation centers, and replace the value for the first variable in the second set of one or more conversation centers with the second value.

In some such implementations, the device further determines if a widget corresponding to the first variable has been removed by the user. When the widget has been removed, apply the SHIFT rule for including each conversation center in the first set of one or more conversation centers in the second set of one or more conversation centers, and replace the value for the first variable in the second set of one or more conversation centers with a new value (e.g., a maximum value, or a super-set value) that includes the first value.

In some implementations, the device creates a first set of one or more queries based on the first set of one or more functional phrases, and requeries the database using the first set of one or more queries, thereby retrieving a second dataset, and then displays an updated data visualization using the second dataset. In some implementations, the device creates a second set of one or more queries based on the second set of one or more functional phrases, and requeries the database using the second set of one or more queries, thereby retrieving a third dataset, and then displays an updated data visualization using the third dataset. In some instances, requerying the database is performed locally at the computing device using cached or stored data at the computing device. For example, requerying is commonly performed locally when the natural language command specifies one or more filters. In some implementations, the device further creates and displays a new data visualization using the second dataset or the third dataset.

In some implementations, the device further determines if the user has selected a dataset different from the first dataset, or if the user has reset the data visualization, and, if so, resets each of the first set of one or more conversation centers, the temporary set of one or more conversation centers, and the second set of one or more conversation centers to an empty set that includes no conversation centers.

Typically, an electronic device includes one or more processors, memory, a display, and one or more programs stored in the memory. The programs are configured for execution by the one or more processors and are configured to perform any of the methods described herein. The one or more programs include instructions for displaying a data visualization based on a first dataset retrieved from a database using a first set of one or more queries. The one or more programs also include instructions for receiving a first user input to specify a first natural language command related to the data visualization. The one or more programs also include instructions for extracting a first set of one or more independent analytic phrases from the first natural language command. The one or more programs also include instructions for computing a first set of one or more conversation centers associated with the first natural language command based on the first set of one or more analytic phrases. The one or more programs also include instructions for computing a first set of analytical functions associated with the first set of one or more conversation centers, thereby creating a first set of one or more functional phrases, and updating the data visualization based on the first set of one or more functional phrases.

In some implementations, the one or more programs include instructions for receiving a second user input to specify a second natural language command related to the updated data visualization. The one or more programs also include instructions for extracting a second set of one or more independent analytic phrases from the second natural language command. The one or more programs also include instructions for computing a temporary set of one or more conversation centers associated with the second natural language command based on the second set of one or more analytic phrases. The one or more programs also include instructions for deriving a second set of one or more conversation centers from the first set of one or more conversation centers and the temporary set of one or more conversation centers using one or more transitional rules. The one or more programs also include instructions for computing a second set of one or more analytical functions associated with the second set of one or more conversation centers, thereby creating a second set of one or more functional phrases, and updating the data visualization based on the second set of one or more functional phrases.

In some implementations, a non-transitory computer readable storage medium stores one or more programs configured for execution by a computing device having one or more processors, memory, and a display. The one or more programs are configured to perform any of the methods described herein. The one or more programs include instructions for displaying a data visualization based on a first dataset retrieved from a database using a first set of one or more queries. The one or more programs also include instructions for receiving a first user input to specify a first natural language command related to the data visualization. The one or more programs also include instructions for extracting a first set of one or more independent analytic phrases from the first natural language command. The one or more programs also include instructions for computing a first set of one or more conversation centers associated with the first natural language command based on the first set of one or more analytic phrases. The one or more programs also include instructions for computing a first set of analytical functions associated with the first set of one or more conversation centers, thereby creating a first set of one or more functional phrases, and updating the data visualization based on the first set of one or more functional phrases.

In some implementations, the one or more programs include instructions for receiving a second user input to specify a second natural language command related to the updated data visualization. The one or more programs also include instructions for extracting a second set of one or more independent analytic phrases from the second natural language command. The one or more programs also include instructions for computing a temporary set of one or more conversation centers associated with the second natural language command based on the second set of one or more analytic phrases. The one or more programs also include instructions for deriving a second set of one or more conversation centers from the first set of one or more conversation centers and the temporary set of one or more conversation centers using one or more transitional rules. The one or more programs also include instructions for computing a second set of one or more analytical functions associated with the second set of one or more conversation centers, thereby creating a second set of one or more functional phrases, and updating the data visualization based on the second set of one or more functional phrases.

In another aspect, in accordance with some implementations, the device displays a data visualization based on a dataset retrieved from a database using a first set of one or more database queries. A user specifies a first natural language command related to the displayed data visualization. Based on the displayed data visualization, the device extracts a first set of one or more independent analytic phrases from the first natural language command. The device then computes a first set of one or more conversation centers associated with the first natural language command based on the first set of one or more analytic phrases. The device then computes a first set of analytical functions associated with the first set of one or more conversation centers, thereby creating a first set of one or more functional phrases. The device then updates the data visualization based on the first set of one or more functional phrases. The user specifies a second natural language command related to the updated data visualization. After receiving the second natural language command, the device extracts a second set of one or more independent analytic phrases from the second natural language command, and computes a temporary set of one or more conversation centers associated with the second natural language command based on the second set of one or more analytic phrases. The device then computes cohesion between the first set of one or more analytic phrases and the second set of one or more analytic phrases. The device then derives a second set of one or more conversation centers from the first set of one or more conversation centers and the temporary set of one or more conversation centers based on the cohesion. The device computes a second set of one or more analytical functions associated with the second set of one or more conversation centers, thereby creating a second set of one or more functional phrases. The device then updates the data visualization based on the second set of one or more functional phrases.

In some implementations, the device computes the cohesion and derives the second set of one or more conversation centers by performing a sequence of operations that comprises: identifying a phrase structure of the second set of one or more analytic phrases; identifying one or more forms of pragmatics based on the phrase structure; and deriving the second set of one or more conversation centers from the first set of one or more conversation centers and the temporary set of one or more conversation centers based on the one or more forms of pragmatics.

In some such implementations, the device identifies the phrase structure by performing a sequence of operations that comprises: parsing the second natural language command applying a probabilistic grammar, thereby obtaining a parsed output; and resolving the parsed output to corresponding categorical and data attributes. In some such implementations, parsing the second natural language command further comprises deducing syntactic structure by employing a part-of-speech API (e.g., a Part-of-Speech (PS) tagger) provided by a natural language toolkit.

In some implementations, the device identifies the one or more forms of pragmatics by performing a sequence of operations that comprises determining whether the second natural language command is an incomplete utterance (sometimes called an Ellipsis) by determining whether one or more linguistic elements are absent in the phrase structure. In some such implementations, the device derives the second set of one or more conversation centers by performing a sequence of operations that comprises: in accordance with the determination that the second natural language command is an incomplete utterance: determining a first subset of conversation centers in the first set of one or more conversation centers, the first subset of conversation centers corresponding to the one or more linguistic elements absent in the phrase structure; and computing the second set of one or more conversation centers by combining the temporary set of one or more conversation centers with the first subset of conversation centers.

In some implementations, the device identifies the one or more forms of pragmatics by performing a sequence of operations that comprises determining whether the second natural language command is a reference expression by determining whether one or more anaphoric references is present in the phrase structure; and the device derives the second set of one or more conversation centers by performing another sequence of operations that comprises: in accordance with the determination that the second natural command is a reference expression: searching the first set of one or more conversation centers to find a first subset of conversation centers that corresponds to a phrasal chunk in the second natural language command that contains a first anaphoric reference of the one or more anaphoric references; and computing the second set of one or more conversation centers based on the temporary set of one or more conversation centers and the first subset of conversation centers.

In some such implementations, the device further determines if the first anaphoric reference is accompanied by a verb in the second natural language command, and if so, searches the first set of one or more conversation centers to find a first action conversation center that refers to an action verb (e.g., "filter out"); and computes the second set of one or more conversation centers based on the temporary set of one or more conversation centers, the first subset of conversation centers, and the first action conversation center.

In some such implementations, the device determines if the first anaphoric reference is a deictic reference that refers to some object in the environment, typically by pointing, and if so, computes the second set of one or more conversation centers based on the temporary set of one or more conversation centers, and a characteristic of the object. Deictic references are typically enabled through multimodal interaction (e.g., via the use of a mouse in addition to speech or text).

In some such implementations, the device further determines if the first anaphoric reference is a reference to a visualization property in the updated data visualization, and if so, computes the second set of one or more conversation centers based on the temporary set of one or more conversation centers, and data related to the visualization property In some implementations, the device identifies the one or more forms of pragmatics by performing a sequence of operations that comprises determining whether the second natural language command is a repair utterance by determining whether the phrase structure corresponds to one or more predefined repair utterances (say, to repair a potential ambiguity in the first natural language command or how the results are presented to the user). For example, the user utters "get rid of condo" or "change from condo to townhomes." In such implementations, if the device determines that the second natural language command is a repair utterance, the device computes the second set of one or more conversation centers based on the temporary set of one or more conversation centers; and updates one or more data attributes in the second set of one or more conversation centers based on the one or more predefined repair utterances and the phrase structure.

In some such implementations, the device determines if the phrase structure corresponds to a repair utterance to change a default behavior related to displaying a data visualization (e.g., highlighting for selection, such as in response to "no filter, instead"), and if so, the device changes the default behavior related to displaying.

In some implementations, the device identifies the one or more forms of pragmatics by performing a sequence of operations that comprises determining whether the second natural language command is a conjunctive expression by (i) determining explicit or implicit presence of conjunctions in the phrase structure, and (ii) determining whether the temporary set of one or more conversation centers includes each conversation center in the first set of one or more conversation centers. In such implementations, the device derives the second set of one or more conversation centers by performing another set of operations that comprises: in accordance with the determination that the second natural language command is a conjunctive expression, computing the second set of one or more conversation centers based on the temporary set of one or more conversation centers In some such implementations, the device determines if the second natural language command has more than one conjunct; and in accordance with the determination that the second natural language command has more than one conjunct, the device computes the second set of one or more analytical functions by linearizing the second natural language command. In some such implementations, the device linearizes the second natural language command by performing a sequence of operations that comprises: generating a parse tree for the second natural language command; traversing the parse tree in post-order to extract a first analytic phrase and a second analytic phrase, wherein the first analytic phrase and the second analytic phrase are adjacent nodes in the parse tree; computing a first analytical function and a second analytical function corresponding to the first analytic phrase and the second analytic phrase, respectively; and combining the first analytical function with the second analytical function by applying one or more logical operators based on one or more characteristics of the first analytical function and the second analytic function, wherein the one or more characteristics include attributor type, operator type, and a value.

In some such implementations, the first analytical function comprises a first attribute (sometimes herein called a variable, and includes a visualization property), a first operator, and a first value; the second analytical function comprises a second attribute (sometimes herein called a variable, and includes a visualization property), a second operator, and a second value.

In some such implementations, combining the first analytical function with the second analytical function comprises: determining whether the first attribute is a categorical type attribute or an ordered type attribute, and determining whether the second attribute is a categorical type attribute or an ordered type attribute; determining whether the first attribute and the second attribute are identical; and, in accordance with a determination that the first attribute and the second attribute are identical and are both categorical type attributes, applying a union operator to combine the first analytical function and the second analytical function.

In some such implementations, combining the first analytical function with the second analytical function comprises: determining whether the first attribute is a categorical type attribute or an ordered type attribute, and determining whether the second attribute is a categorical type attribute or an ordered type attribute; determining whether the first attribute and the second attribute are identical; and, in accordance with a determination that the first attribute and the second attribute are non-identical, applying the intersection operator to combine the first analytical function and the second analytical function.

In some such implementations, combining the first analytical function with the second analytical function comprises: determining whether the first attribute is a categorical type attribute or an ordered type attribute, and determining whether the second attribute is a categorical type attribute or an ordered type attribute; determining whether the first attribute and the second attribute are identical; and, in accordance with a determination that the first attribute and the second attribute are identical and are both ordered type attributes: determining the operator types of the first operator and the second operator; and, in accordance with a determination that the first operator and the second operator are both equality operators, applying the union operator to combine the first analytical function and the second analytical function.

In some such implementations, combining the first analytical function with the second analytical function comprises: determining whether the first attribute is a categorical type attribute or an ordered type attribute, and determining whether the second attribute is a categorical type attribute or an ordered type attribute; determining whether the first attribute and the second attribute are identical; and, in accordance with a determination that the first attribute and the second attribute are identical and are both ordered type attributes: determining the operator types of the first operator and the second operator; and in accordance with a determination that the first operator is a "less than" operator and the second operator is a "greater than" operator: determining whether the first value is less than the second value; and in accordance with a determination that the first value is less than the second value, applying the union operator to combine the first analytical function and the second analytical function.

In some such implementations, combining the first analytical function with the second analytical function comprises: determining whether the first attribute is a categorical type attribute or an ordered type attribute, and determining whether the second attribute is a categorical type attribute or an ordered type attribute; determining whether the first attribute and the second attribute are identical; and, in accordance with a determination that the first attribute and the second attribute are identical and are both ordered type attributes: determining the operator types of the first operator and the second operator; and in accordance with a determination that the first operator is a "greater than" operator and the second operator is a "lesser than" operator: determining whether the first value is less than the second value; and in accordance with a determination that the first value is less than the second value, applying the intersection operator to combine the first analytical function and the second analytical function.

In some implementations, the device further computes semantic relatedness between the second set of one or more extracted analytic phrases and one or more attributes of data included in the updated data visualization, and computes analytical functions associated with the second set of one or more analytic phrases, thereby creating the second set of one or more functional phrases, based on the semantically related one or more attributes of data. As opposed to grammatical cohesion or cohesion between contexts, lexical cohesion looks for cohesion within the context.

In some such implementations, the device computes semantic relatedness by performing a sequence of operations that comprises: training a first neutral network model on a large corpus of text, thereby learning word embeddings; computing a first word vector for a first word in a first phrase in the second set of one or more analytic phrases using a second neural network model, the first word vector mapping the first word to the word embeddings; computing a second word vector for a first data attribute in the one or more data attributes using the second neural network model, the second word vector mapping the first data attribute to the word embeddings; and computing relatedness between the first word vector and the second word vector using a similarity metric.

In some such implementations, the first neural network model is a Word2vec™ model. In some such implementations, the second neural network model is a recurrent neural network model.

In some such implementations, the similarity metric is based at least on (i) Wu-Palmer distance between word senses associated with the first word vector and the second word vector, (ii) a weighting factor, and (iii) a pairwise cosine distance between the first word vector and the second word vector.

In some such implementations, the device computes analytical functions by performing a sequence of operations that comprises: obtaining word definitions for the second set of one or more analytic phrases from a publicly available dictionary; determining whether the word definitions contain one or more predefined adjectives using a part-of-speech API provided by a natural language toolkit; and in accordance with the determination that the word definitions contain one or more predefined adjectives, mapping the one or more predefined adjectives to one or more analytical functions.

Typically, an electronic device includes one or more processors, memory, a display, and one or more programs stored in the memory. The programs are configured for execution by the one or more processors and are configured to perform any of the methods described herein. The one or more programs include instructions for displaying a data visualization based on a first dataset retrieved from a database using a first set of one or more queries. The one or more programs also include instructions for receiving a first user input to specify a first natural language command related to the data visualization. The one or more programs also include instructions for extracting a first set of one or more independent analytic phrases from the first natural language command. The one or more programs also include instructions for computing a first set of one or more conversation centers associated with the first natural language command based on the first set of one or more analytic phrases. The one or more programs also include instructions for computing a first set of analytical functions associated with the first set of one or more conversation centers, thereby creating a first set of one or more functional phrases. The one or more programs also include instructions for updating the data visualization based on the first set of one or more functional phrases. The one or more programs also include instructions for receiving a second user input to specify a second natural language command related to the updated data visualization. The one or more programs also include instructions for extracting a second set of one or more independent analytic phrases from the second natural language command. The one or more programs also include instructions for computing a temporary set of one or more conversation centers associated with the second natural language command based on the second set of one or more analytic phrases. The one or more programs also include instructions for computing cohesion between the first set of one or more analytic phrases and the second set of one or more analytic phrases. The one or more programs also include instructions for deriving a second set of one or more conversation centers from the first set of one or more conversation centers and the temporary set of one or more conversation centers based on the cohesion. The one or more programs also include instructions for computing a second set of one or more analytical functions associated with the second set of one or more conversation centers, thereby creating a second set of one or more functional phrases, and updating the data visualization based on the second set of one or more functional phrases.

In some implementations, a non-transitory computer readable storage medium stores one or more programs configured for execution by a computing device having one or more processors, memory, and a display. The one or more programs are configured to perform any of the methods described herein. The one or more programs include instructions for displaying a data visualization based on a first dataset retrieved from a database using a first set of one or more queries. The one or more programs also include instructions for receiving a first user input to specify a first natural language command related to the data visualization. The one or more programs also include instructions for extracting a first set of one or more independent analytic phrases from the first natural language command. The one or more programs also include instructions for computing a first set of one or more conversation centers associated with the first natural language command based on the first set of one or more analytic phrases. The one or more programs also include instructions for computing a first set of analytical functions associated with the first set of one or more conversation centers, thereby creating a first set of one or more functional phrases. The one or more programs also include instructions for updating the data visualization based on the first set of one or more functional phrases. The one or more programs also include instructions for receiving a second user input to specify a second natural language command related to the updated data visualization. The one or more programs also include instructions for extracting a second set of one or more independent analytic phrases from the second natural language command. The one or more programs also include instructions for computing a temporary set of one or more conversation centers associated with the second natural language command based on the second set of one or more analytic phrases. The one or more programs also include instructions for computing cohesion between the first set of one or more analytic phrases and the second set of one or more analytic phrases. The one or more programs also include instructions for deriving a second set of one or more conversation centers from the first set of one or more conversation centers and the temporary set of one or more conversation centers based on the cohesion. The one or more programs also include instructions for computing a second set of one or more analytical functions associated with the second set of one or more conversation centers, thereby creating a second set of one or more functional phrases, and updating the data visualization based on the second set of one or more functional phrases.

In another aspect, in accordance with some implementations, a method executes at an electronic device with a display. For example, the electronic device can be a smart phone, a tablet, a notebook computer, or a desktop computer. The device displays a data visualization based on a dataset retrieved from a database using a first set of one or more database queries. A user specifies a first natural language command related to the displayed data visualization. Based on the displayed data visualization, the device extracts a first set of one or more independent analytic phrases from the first natural language command. The device then computes a first set of one or more conversation centers associated with the first natural language command based on the first set of one or more analytic phrases. The device then computes a first set of analytical functions associated with the first set of one or more conversation centers, thereby creating a first set of one or more functional phrases. The device then updates the data visualization based on the first set of one or more functional phrases. The user specifies a second natural language command related to the updated data visualization. After receiving the second natural language command, the device extracts a second set of one or more independent analytic phrases from the second natural language command, and computes a temporary set of one or more conversation centers associated with the second natural language command based on the second set of one or more analytic phrases. The device then derives a second set of one or more conversation centers from the first set of one or more conversation centers and the temporary set of one or more conversation centers using one or more transitional rules. The device then updates the data visualization based on the second set of one or more conversation centers.

In some implementations, the device further determines one or more data attributes corresponding to the second set of one or more conversation centers; scans displayed data visualizations to identify one or more of the displayed data visualizations that contain data marks whose characteristics correspond to a first data attribute in the one or more data attributes; and highlights the data marks whose characteristics correspond to the first data attribute. In some such implementations, the device further filters, from the displayed data visualizations, results that contain data marks whose characteristics do not correspond to the one or more data attributes. Further, in some such implementations, the device receives a user input to determine whether to filter or to highlight the data marks (e.g., via a natural language command, such as 'exclude,' 'remove,' and 'filter only').

In some implementations, the visualization characteristics include one or more of color, size, and shape. In some implementations, the visualization characteristics correspond to a visual encoding of data marks. In some implementations, the visual encoding is one or more of color, size, and shape.

In some implementations, the device determines if none of the displayed data visualizations contain data marks whose characteristics correspond to the first data attribute, and if so, generates a specification for a new data visualization with the first data attribute (e.g., aggregation types) and displays the new data visualization. In some such implementations, displaying the new data visualization further comprises determining a chart type based on the specification; and generating and displaying the chart. Further, in some such implementations, the chart is positioned using a two-dimensional grid-based layout algorithm, automatically coordinated with other data visualizations (sometimes herein called views).

In some implementations, the device further performs a sequence of operations comprising: computing a second set of one or more analytical functions associated with the second set of one or more conversation centers, thereby creating a second set of one or more functional phrases; selecting a first functional phrase from the second set of one or more functional phrases, wherein the first functional phrase comprises a parameterized data selection criterion; selecting an initial range for values of the parameters of the parameterized data selection criterion; displaying an editable user interface control (e.g., widgets) corresponding to the parameterized data selection criterion, wherein the user interface control displays the current values of the parameters; and ordering a displayed set of one or more editable user interface controls based on the order of queries in the second natural language command, wherein the order of queries is inferred while extracting the second set of one or more analytic phrases from the second natural language command. In some such implementations, the user interface control allows adjustment of the first functional phrase. Further, in some such implementations, the user interface control displays a slider, which enables a user to adjust the first functional phrase. In some such implementations, ordering the displayed set of one or more editable user interface controls further comprises using a library that facilitates the compact placement of small word-scale visualization within text. In some such implementations, the library is Sparklificator™.

In some implementations, the device performs a sequence of operations aimed at automatically correcting some user errors. The sequence of operations comprises: determining a first token in the second natural language command that does not correspond to any of the analytic phrases in the second set of one or more analytic phrases (for example, due to a parsing failure); searching for a correctly spelled term corresponding to the first token using a search library by comparing the first token with one or more features of the first dataset; and substituting the correctly spelled term for the first token in the second natural language command to obtain a third natural language command; and extracting the second set of one or more analytic phrases from the third natural language command. In some such implementations, the one or more features include data attributes, cell values, and related keywords of the first dataset. In some such implementations, the search library is a fuzzy string library, such as Fuse.js™.

In some such implementations, the device further performs a sequence of operations comprising: determining whether there is no correctly spelled term corresponding to the first token; and in accordance with a determination that there is no correctly spelled term corresponding to the first token: parsing the second natural language command to obtain a parse tree; pruning the parse tree to remove the portion of the tree corresponding to the first token; and extracting the second set of one or more analytic phrases based on the pruned parse tree.

In some implementations, the device further generates a textual feedback indicating that the first token was unrecognized and therefore removed from the second natural language command—a situation that typically occurs when the utterance was only partially understood. In some such implementations, the device displays the first token.

In some implementations, the device further generates a textual feedback indicating that the correctly spelled term is substituted for the first token in the second natural language command. This is typically the situation when the utterance was not successfully understood, but the device suggested an alternative query. Further, in some such implementations, the device displays and highlights the correctly spelled term.

Typically, an electronic device includes one or more processors, memory, a display, and one or more programs stored in the memory. The programs are configured for execution by the one or more processors and are configured to perform any of the methods described herein. The one or more programs include instructions for displaying a data visualization based on a first dataset retrieved from a database using a first set of one or more queries. The one or more programs also include instructions for receiving a first user input to specify a first natural language command related to the data visualization. The one or more programs also include instructions for extracting a first set of one or more independent analytic phrases from the first natural language command. The one or more programs also include instructions for computing a first set of one or more conversation centers associated with the first natural language command based on the first set of one or more analytic phrases. The one or more programs also include instructions for computing a first set of analytical functions associated with the first set of one or more conversation centers, thereby creating a first set of one or more functional phrases. The one or more programs also include instructions for updating the data visualization based on the first set of one or more functional phrases. The one or more programs also include instructions for receiving a second user input to specify a second natural language command related to the updated data visualization. The one or more programs also include instructions for extracting a second set of one or more independent analytic phrases from the second natural language command. The one or more programs also include instructions for computing a temporary set of one or more conversation centers associated with the second natural language command based on the second set of one or more analytic phrases. The one or more programs also include instructions for deriving a second set of one or more conversation centers from the first set of one or more conversation centers and the temporary set of one or more conversation centers using one or more transitional rules. The one or more programs also include instructions for updating the data visualization based on the second set of one or more conversation centers, wherein the updating comprises: determining one or more data attributes corresponding to the second set of one or more conversation centers; scanning displayed data visualizations to identify one or more of the displayed data visualizations that contain data marks whose characteristics correspond to a first data attribute in the one or more data attributes; and highlighting the data marks whose characteristics correspond to the first data attribute.

In some implementations, a non-transitory computer readable storage medium stores one or more programs configured for execution by a computing device having one or more processors, memory, and a display. The one or more programs are configured to perform any of the methods described herein. The one or more programs include instructions for displaying a data visualization based on a first dataset retrieved from a database using a first set of one or more queries. The one or more programs also include instructions for receiving a first user input to specify a first natural language command related to the data visualization. The one or more programs also include instructions for extracting a first set of one or more independent analytic phrases from the first natural language command. The one or more programs also include instructions for computing a first set of one or more conversation centers associated with the first natural language command based on the first set of one or more analytic phrases. The one or more programs also include instructions for computing a first set of analytical functions associated with the first set of one or more conversation centers, thereby creating a first set of one or more functional phrases. The one or more programs also include instructions for updating the data visualization based on the first set of one or more functional phrases. The one or more programs also include instructions for receiving a second user input to specify a second natural language command related to the updated data visualization. The one or more programs also include instructions for extracting a second set of one or more independent analytic phrases from the second natural language command. The one or more programs also include instructions for computing a temporary set of one or more conversation centers associated with the second natural language command based on the second set of one or more analytic phrases. The one or more programs also include instructions for deriving a second set of one or more conversation centers from the first set of one or more conversation centers and the temporary set of one or more conversation centers using one or more transitional rules. The one or more programs also include instructions for updating the data visualization based on the second set of one or more conversation centers, wherein the updating comprises: determining one or more data attributes corresponding to the second set of one or more conversation centers; scanning displayed data visualizations to identify one or more of the displayed data visualizations that contain data marks whose characteristics correspond to a first data attribute in the one or more data attributes; and highlighting the data marks whose characteristics correspond to the first data attribute.

Thus methods, systems, and graphical user interfaces are disclosed that allow users to efficiently explore data displayed within a data visualization application by using natural language commands.

Both the foregoing general description and the following detailed description are exemplary and explanatory, and are intended to provide further explanation of the invention as claimed.

BRIEF DESCRIPTION OF THE DRAWINGS

For a better understanding of the aforementioned systems, methods, and graphical user interfaces, as well as additional systems, methods, and graphical user interfaces that provide data visualization analytics, reference should be made to the Description of Implementations below, in conjunction with the following drawings in which like reference numerals refer to corresponding parts throughout the figures.

FIGS. 6B-6D illustrate graphical user interfaces (that relate to FIG. 6A) for interactive data analysis using natural language processing in a data visualization application according to some implementations.

FIG. 12A illustrates a set of widgets generated for handling ambiguity in a user query according to some implementations; and FIG. 12B illustrates examples of feedback for various situations according to some implementations.

Reference will now be made to implementations, examples of which are illustrated in the accompanying drawings. In the following description, numerous specific details are set forth in order to provide a thorough understanding of the present invention. However, it will be apparent to one of ordinary skill in the art that the present invention may be practiced without requiring these specific details.

DESCRIPTION OF IMPLEMENTATIONS

Figure 1:
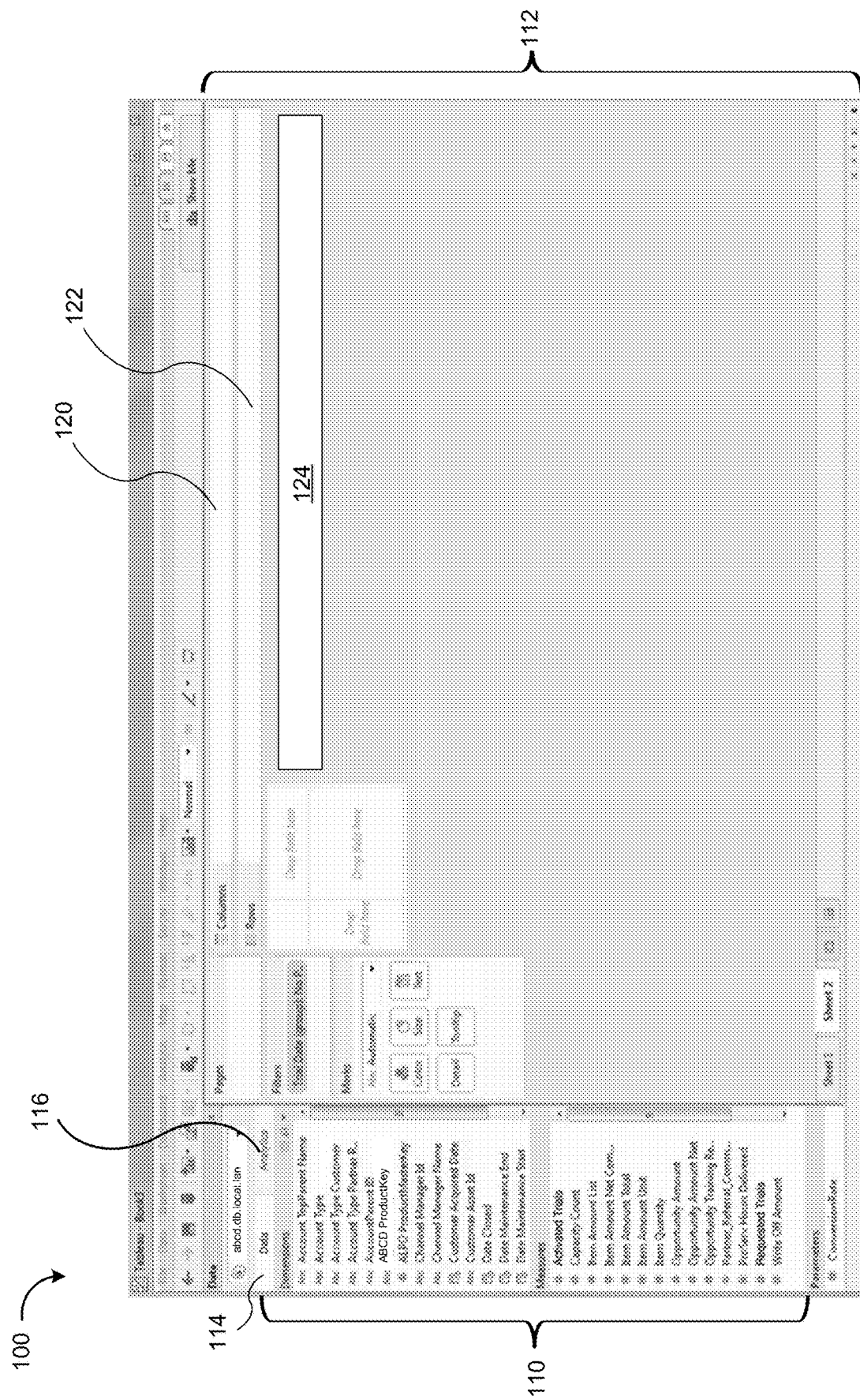
FIG. 1 illustrates a graphical user interface used in some implementations.

FIG. 1 illustrates a graphical user interface 100 for interactive data analysis. The user interface 100 includes a Data tab 114 and an Analytics tab 116 in accordance with some implementations. When the Data tab 114 is selected, the user interface 100 displays a schema information region 110, which is also referred to as a data pane. The schema information region 110 provides named data elements (e.g., field names) that may be selected and used to build a data visualization. In some implementations, the list of field names is separated into a group of dimensions (e.g., categorical data) and a group of measures (e.g., numeric quantities). Some implementations also include a list of parameters. When the Analytics tab 116 is selected, the user interface displays a list of analytic functions instead of data elements (not shown).

The graphical user interface 100 also includes a data visualization region 112. The data visualization region 112 includes a plurality of shelf regions, such as a columns shelf region 120 and a rows shelf region 122. These are also referred to as the column shelf 120 and the row shelf 122. As illustrated here, the data visualization region 112 also has a large space for displaying a visual graphic (also referred to herein as a data visualization). Because no data elements have been selected yet, the space initially has no visual graphic. In some implementations, the data visualization region 112 has multiple layers that are referred to as sheets.

In some implementations, the graphical user interface 100 also includes a natural language processing region 124. The natural language processing region 124 includes an input bar (also referred to herein as a command bar) for receiving natural language commands. A user may interact with the input bar to provide commands. For example, the user may type a command in the input bar to provide the command. In addition, the user may indirectly interact with the input bar by speaking into a microphone (e.g., an audio input device 220) to provide commands. In some implementations, data elements are initially associated with the column shelf 120 and the row shelf 122 (e.g., using drag and drop operations from the schema information region 110 to the column shelf 120 and/or the row shelf 122). After the initial association, the user may use natural language commands (e.g., in the natural language processing region 124) to further explore the displayed data visualization. In some instances, a user creates the initial association using the natural language processing region 124, which results in one or more data elements being placed in the column shelf 120 and the row shelf 122. For example, the user may provide a command to create a relationship between data element X and data element Y. In response to receiving the command, the column shelf 120 and the row shelf 122 may be populated with the data elements (e.g., the column shelf 120 may be populated with data element X and the row shelf 122 may be populated with data element Y, or vice versa).

Figure 2:
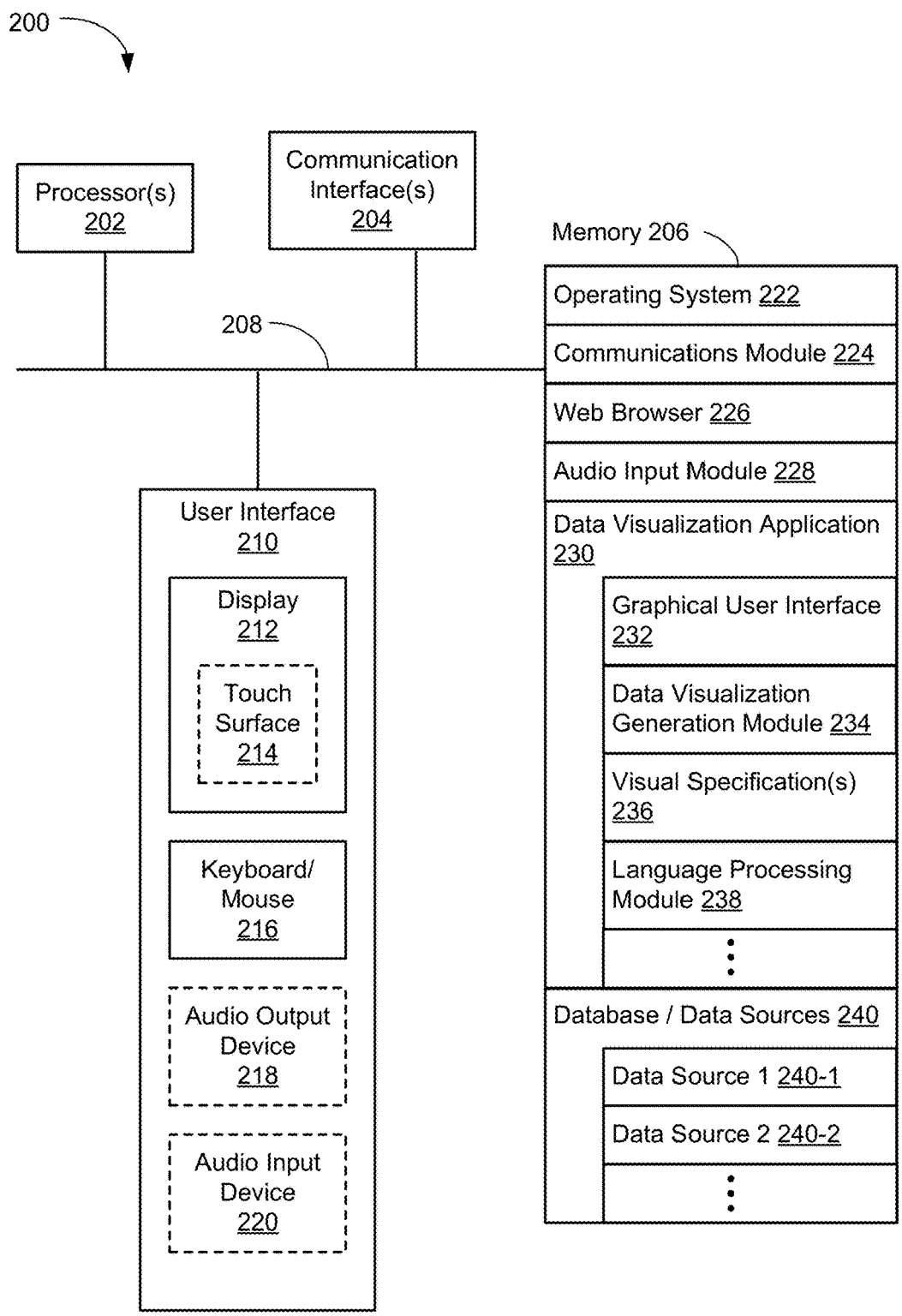
FIG. 2 is a block diagram of a computing device according to some implementations.

FIG. 2 is a block diagram illustrating a computing device 200, which can display the graphical user interface 100 in accordance with some implementations. Various examples of the computing device 200 include a desktop computer, a laptop computer, a tablet computer, and other computing devices that have a display and a processor capable of running a data visualization application 230. The computing device 200 typically includes one or more processing units (processors or cores) 202, one or more network or other communications interfaces 204, memory 206, and one or more communication buses 208 for interconnecting these components. The communication buses 208 optionally include circuitry (sometimes called a chipset) that interconnects and controls communications between system components. The computing device 200 includes a user interface 210. The user interface 210 typically includes a display device 212. In some implementations, the computing device 200 includes input devices such as a keyboard, mouse, and/or other input buttons 216. Alternatively or in addition, in some implementations, the display device 212 includes a touch-sensitive surface 214, in which case the display device 212 is a touch-sensitive display. In some implementations, the touch-sensitive surface 214 is configured to detect various swipe gestures (e.g., continuous gestures in vertical and/or horizontal directions) and/or other gestures (e.g., single/double tap). In computing devices that have a touch-sensitive display 214, a physical keyboard is optional (e.g., a soft keyboard may be displayed when keyboard entry is needed). The user interface 210 also includes an audio output device 218, such as speakers or an audio output connection connected to speakers, earphones, or headphones. Furthermore, some computing devices 200 use a microphone and voice recognition to supplement or replace the keyboard. Optionally, the computing device 200 includes an audio input device 220 (e.g., a microphone) to capture audio (e.g., speech from a user).

The memory 206 includes high-speed random-access memory, such as DRAM, SRAM, DDR RAM, or other random-access solid-state memory devices; and may include non-volatile memory, such as one or more magnetic disk storage devices, optical disk storage devices, flash memory devices, or other non-volatile solid-state storage devices. In some implementations, the memory 206 includes one or more storage devices remotely located from the processor(s) 202. The memory 206, or alternately the non-volatile memory device(s) within the memory 206, includes a non-transitory computer-readable storage medium. In some implementations, the memory 206 or the computer-readable storage medium of the memory 206 stores the following programs, modules, and data structures, or a subset or superset thereof:

- an operating system 222, which includes procedures for handling various basic system services and for performing hardware dependent tasks;
- a communications module 224, which is used for connecting the computing device 200 to other computers and devices via the one or more communication network interfaces 204 (wired or wireless), such as the Internet, other wide area networks, local area networks, metropolitan area networks, and so on;
- a web browser 226 (or other application capable of displaying web pages), which enables a user to communicate over a network with remote computers or devices;
- an audio input module 228 (e.g., a microphone module) for processing audio captured by the audio input device 220. The captured audio may be sent to a remote server and/or processed by an application executing on the computing device 200 (e.g., the data visualization application 230);
- a data visualization application 230 for generating data visualizations and related features. The application 230 includes a graphical user interface 232 (e.g., the graphical user interface 100 illustrated in FIG. 1) for a user to construct visual graphics. For example, a user selects one or more data sources 240 (which may be stored on the computing device 200 or stored remotely), selects data fields from the data source(s), and uses the selected fields to define a visual graphic; and
- zero or more databases or data sources 240 (e.g., a first data source 240-1 and a second data source 240-2), which are used by the data visualization application 230. In some implementations, the data sources are stored as spreadsheet files, CSV files, text files, JSON files, XML files, or flat files, or stored in a relational database.

In some implementations, the data visualization application 230 includes a data visualization generation module 234, which takes user input (e.g., a visual specification 236), and generates a corresponding visual graphic. The data visualization application 230 then displays the generated visual graphic in the user interface 232. In some implementations, the data visualization application 230 executes as a standalone application (e.g., a desktop application). In some implementations, the data visualization application 230 executes within the web browser 226 or another application using web pages provided by a web server (e.g., a server-based application).

In some implementations, the information the user provides (e.g., user input) is stored as a visual specification 236. In some implementations, the visual specification 236 includes previous natural language commands received from a user or properties specified by the user through natural language commands.

In some implementations, the data visualization application 230 includes a language processing module 238 for processing (e.g., interpreting) commands provided by a user of the computing device. In some implementations, the commands are natural language commands (e.g., captured by the audio input device 220). In some implementations, the language processing module 238 includes sub-modules such as an autocomplete module, a pragmatics module, and an ambiguity module, each of which is discussed in further detail below.

In some implementations, the memory 206 stores metrics and/or scores determined by the language processing module 238. In addition, the memory 206 may store thresholds and other criteria, which are compared against the metrics and/or scores determined by the language processing module 238. For example, the language processing module 238 may determine a relatedness metric (discussed in detail below) for an analytic word/phrase of a received command. Then, the language processing module 238 may compare the relatedness metric against a threshold stored in the memory 206.

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 206 stores a subset of the modules and data structures identified above. Furthermore, the memory 206 may store additional modules or data structures not described above.

Although FIG. 2 shows a computing device 200, FIG. 2 is intended more as a functional description of the various features that may be present rather than as a structural schematic of the implementations described herein. In practice, and as recognized by those of ordinary skill in the art, items shown separately could be combined and some items could be separated.

Figure 3A:
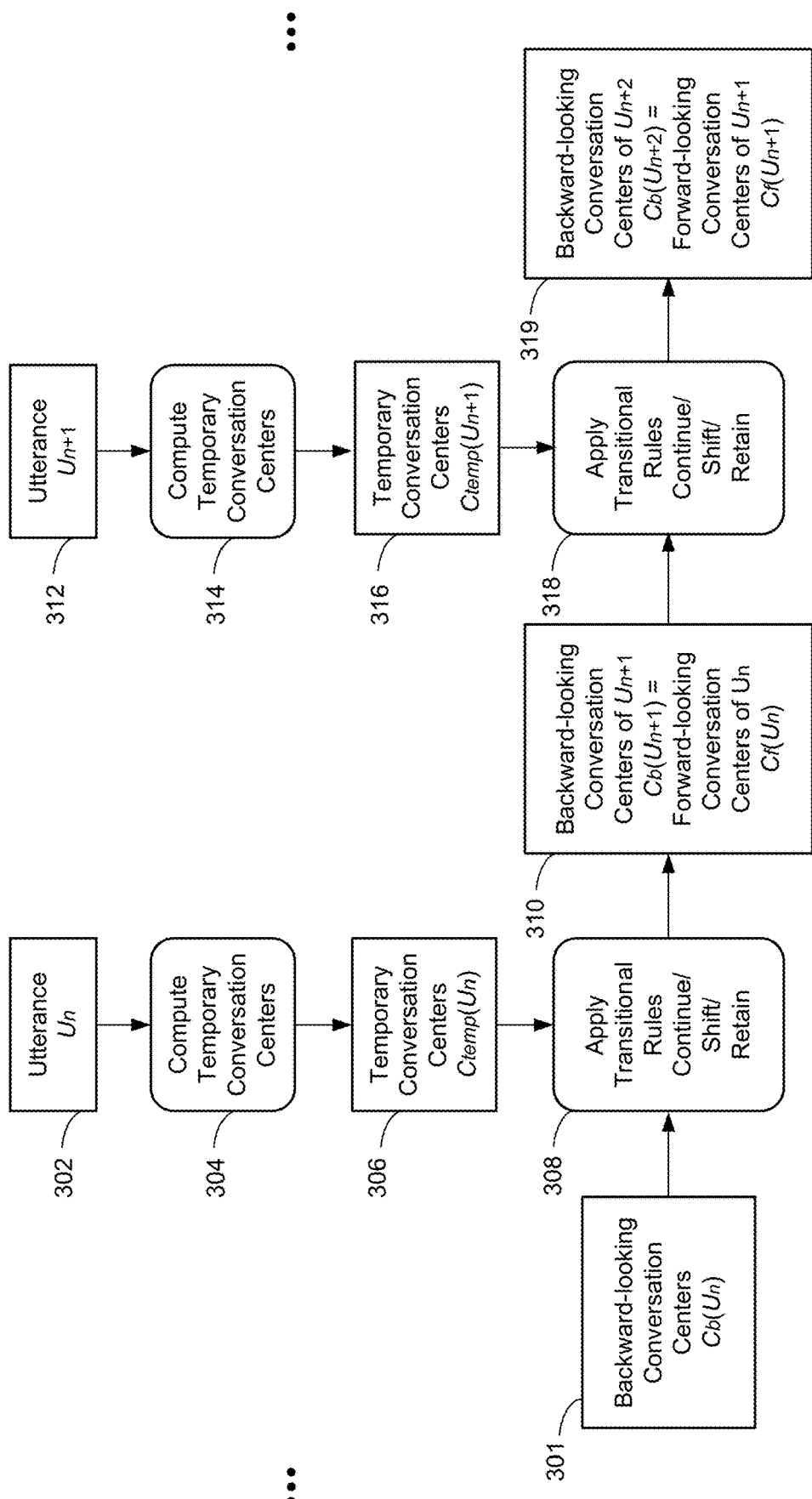
FIG. 3A is a process flow diagram illustrating a process for using natural language applying pragmatics principles for visual analysis of a dataset according to some implementations.

FIG. 3A is a process flow diagram illustrating a process or a framework for using natural language applying pragmatics principles for visual analysis of a dataset according to some implementations. The framework based on a conversational interaction model extends the centering approach employed in pragmatics theory to support inter-sentential transitional states of continuing, retaining, and shifting the context of the data attributes in play. The framework supports a "cycle of visual analysis," an interface that supports the fluid iterative exploration and refinement in visual analytics. Interaction with visual analysis is most effective when users can focus on answering the questions they have about their data, rather than focusing on how to operate the interface to the analysis tool. Pragmatics is particularly important for visual analysis flow, where questions and insights often emerge from previous questions and patterns of data that a person sees.

Sequences of utterances that exhibit coherence form a conversation. Coherence is a semantic property of conversation, based on the interpretation of each individual utterance relative to the interpretation of other utterances. As previously mentioned, in order to correctly interpret a set of utterances, the process framework utilizes and extends a model commonly used for discourse structure called conversational centering, in accordance with some implementations. In this model, utterances are divided into constituent discourse segments, embedding relationships that may hold between two segments. A center refers to those entities serving to link that utterance to other utterances in the discourse. Consider a discourse segment DS with utterances $U_1, \ldots, U_m$. Each utterance $U_n$ ($1 \leq n < m$) in DS is assigned a set of forward-looking centers, $C_f(U_n, DS)$ referring to the current focus of the conversation; each utterance other than the segment's initial utterance, is assigned a set of backward-looking centers, $C_b (U_n, DS)$. The set of backward-looking centers of a new utterance $U_{n+1}$ is $C_b (U_{n+1}, DS)$, which is equal to the forward-looking centers of $U_n$ (i.e., $C_f(U_n, DS)$). In the context of visual analytic conversations, forward and backward-looking centers include data attributes and values, visual properties, and analytical actions (e.g., filter, highlight).

Each discourse segment exhibits both global coherence i.e., the global context of the entire conversation, usually referring to a topic or subject of the conversation, and local coherence i.e., coherence amongst the utterances within that conversation. Local coherence refers to inferring a sequence of utterances within a local context through transitional states of continuing, retaining, and replacing between $C_f(U_n, DS)$ and $C_b (U_n, DS)$. The framework extends this conversational centering theory for visual analytical conversation by introducing a set of rules for each of these local coherence constructs, in accordance with some implementations.

Given an utterance $U_n$, a system implementing this framework responds by executing a series of analytical functions derived from the forward-looking centers $C_f(U_n, DS)$. An analytical function F(X, op, v) consists of a variable X (which can be an attribute or a visualization property), an operator op, and a value v (typically a constant), according to some implementations. For example, when the user says "measles in the uk," the system creates two functions namely F_CAT(diseases, ==, measles) and F_CAT(country, ==, uk). When the user provides a new utterance $U_{n+1}$, the system first creates a set of temporary centers $C_{temp}(U_{n+1}, DS)$ from $U_{n+1}$ without considering any previous context. The system then applies a set of rules to create a set of forward-looking centers, $C_f(U_{n+1}, DS)$ based on some set operations between $C_b (U_{n+1}, DS)$ and $C_{temp} (U_{n+1}, DS)$. The forward-looking centers are then used to respond to the user utterance according to some implementations.

FIG. 3A illustrates this process for two utterances $U_n$ (302) and $U_{n+1}$ (312) according to some implementations. The system creates (304) a set of temporary centers $C_{temp} (U_n)$ (306) from $U_n$ without considering any previous context. At the time of receiving utterance $U_n$, the system has either pre-computed a set of backward-looking conversation centers $C_b (U_n)$ (301) based on a previous utterance $U_{n-1}$, or, if $U_n$ is the first utterance, initialized $C_b (U_n)$ to a null set. The system then applies (308) one or more transitional rules (described below in reference to FIG. 3B) to derive a set of forward-looking centers $C_f(U_n)$ (310) from the backward-looking centers $C_b (U_n)$ (301) and the temporary conversation centers $C_{temp} (U_n)$ (306). The forward-looking conversation centers $C_f(U_n)$ (310) are also the backward-looking conversation centers $C_b$ ($U_{n+1}$) for the next utterance $U_{n+1}$ (312). The process described thus far is repeated for the next utterance $U_{n+1}$ (312). The system computes (314) a set of temporary centers $C_{temp}(U_n)$ (316) from $U_n$ without considering any previous context. The system then applies (318) the one or more transitional rules to derive a set of forward-looking centers $C_f(U_{n+1})$ (319) from the backward-looking centers $C_b$ ($U_{n+1}$) (310) and the temporary conversation centers $C_{temp}$ ($U_{n+1}$) (316). The system uses the forward-looking conversation centers $C_f(U_{n+1})$ (319) for updating one or more data visualization(s) according to some implementations. The system also uses the set of forward-looking centers $C_f$ ($U_{n+1}$) (319) as the backward-looking conversation centers $C_b$ ($U_{n+2}$) for the next utterance $U_{n+2}$, and so on. When the user either moves to a different dataset or resets the visualization, the system updates the global coherence of the analytical conversation, and clears all previous states (including the forward-looking conversation centers, the backward-looking conversation centers, and the temporary conversation centers), in accordance with some implementations.

Figure 3B:
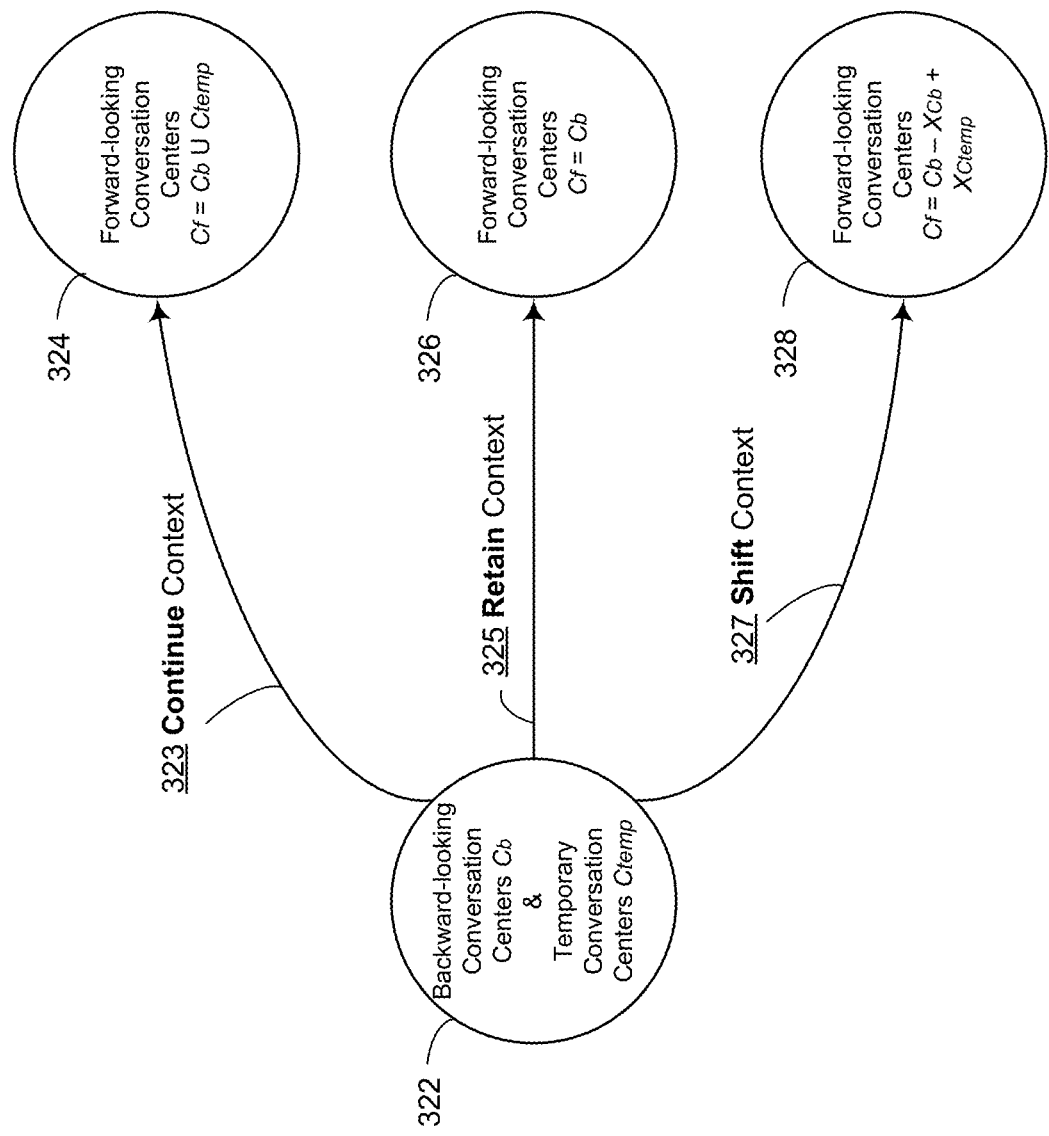
FIG. 3B is a state machine diagram that illustrates conversation center states and the transition between the states when particular transitional rules are triggered, in accordance with some implementations.

FIG. 3B is a state machine diagram that illustrates conversation center states and the transition between the states, in accordance with some implementations. State 322 encapsulates backward-looking conversation centers $C_b$ and temporary conversation centers $C_{temp}$, and each of the states 324, 326 and 328 represent different states of forward-looking conversation centers $C_f$. The conversation centers correspond to an utterance $U_{n+1}$ (not shown). The following is a description of each of the transitional rules, i.e., when each transition occurs and how the end states are computed.

The transition Continue 323 continues the context from the backward-looking centers $C_b$ to the forward-looking centers $C_f$, in accordance with some implementations. In other words, each of the conversation centers in the backward-looking conversation centers $C_b$ is included (324) in the forward-looking conversation centers $C_f$. Using set notation, for a given utterance $U_{n+1}$, in a discourse segment DS, as a result of this transition, $$C_b(U_{n+1},DS) \subset C_f(U_{n+1},DS).$$

This transition occurs when a variable X is in $C_{temp}$ ($U_{n+1}$) but not in $C_b$ ($U_{n+1}$, DS), in accordance with some implementations. In this case, the system performs the following union operation:

$$C_f(U_{n+1},DS)=C_b(U_{n+1},DS) \cup C_{temp}(U_{n+1},DS).$$

The transition Retain 325 retains (326) the context from the backward-looking centers $C_b$ (322) in the forward-looking centers $C_f$ without adding additional entities to the forward-looking centers, in accordance with some implementations. In other words, $$C_f(U_{n+1},DS)=C_b(U_{n+1},DS).$$

The transition Retain 325 triggers when the variable X is in $C_b$ ($U_{n+1}$, DS) but not in $C_{temp}$ ($U_{n+1}$, DS), in accordance with some implementations.

In some implementations, with the Shift transition 327, the context shifts from the backward-looking conversation centers 322 to the forward-looking conversation centers 328. That is, $$C_f(U_{n+1},DS) \neq C_b(U_{n+1},DS)$$

In some implementations, the Shift transition 327 occurs when the variable X is in both $C_b$ ($U_{n+1}$, DS) and $C_{temp}$ ($U_{n+1}$, DS), but the corresponding values are different. In this case, the system replaces all the backward-centers $C_b$ ($U_{n+1}$, DS) containing X with $C_{temp}$ ($U_{n+1}$, DS). As FIG. 3B illustrates, this replacement can be represented using the equation:

$$C_f(U_{n+1},DS)=C_b(U_{n+1},DS)-X_{Cb}+X_{Ctemp}$$

In some implementations, the Shift transition 327 also occurs when a filter constraint is removed (e.g., removing a widget for measles shifts the disease variable from measles to all diseases).

Figure 4A:
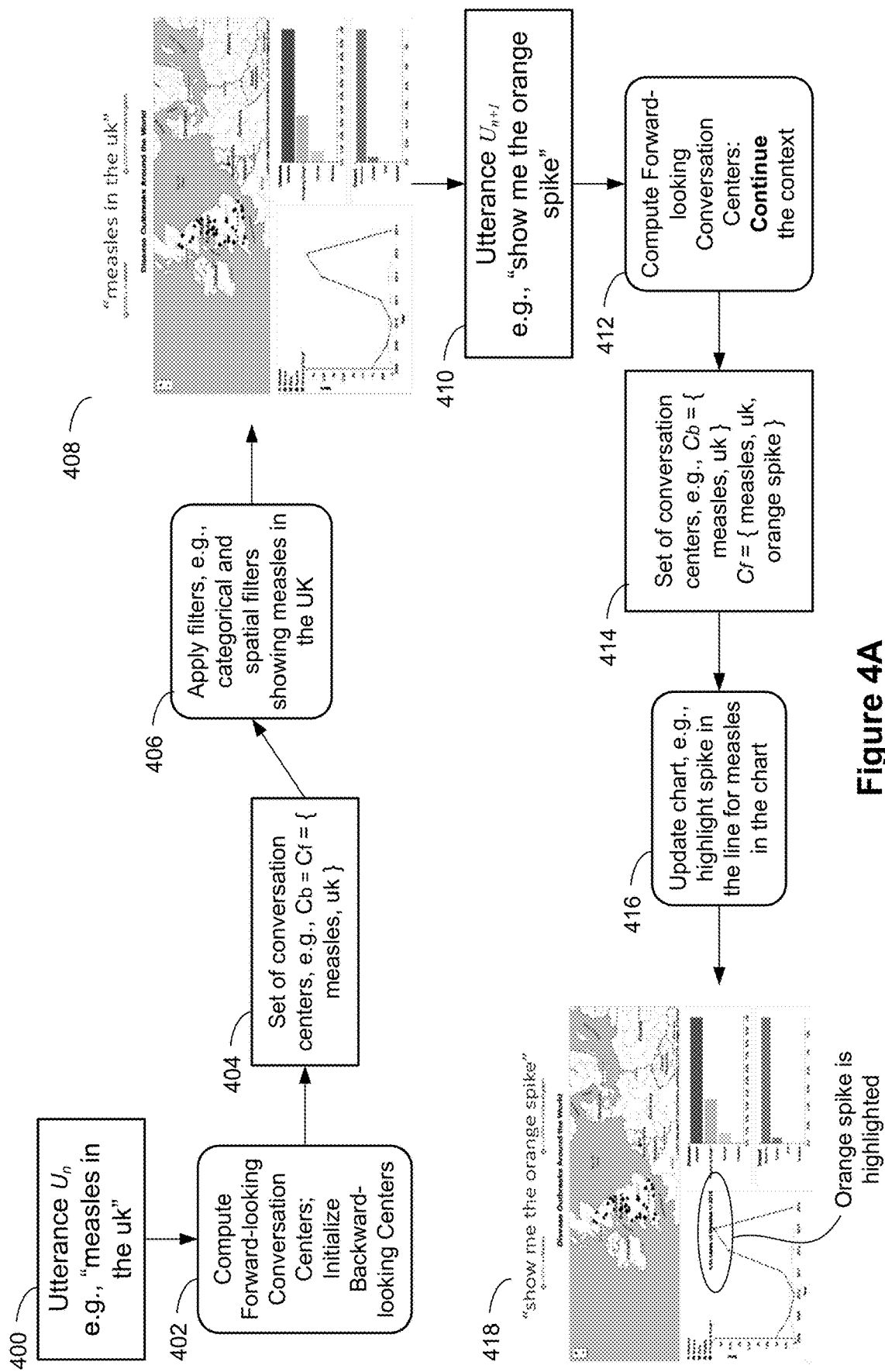
FIGS. 4A-4B are diagrams illustrating the use of different transition rules in handling analytical conversations according to some implementations.

FIG. 4A is a diagram illustrating the use of different transition rules in handling analytical conversations according to some implementations. Suppose a system implements the framework described above in reference to FIGS. 3A and 3B. When the system receives an utterance 400 (e.g., "measles in the uk"), the system computes (402) forward-looking conversation centers (404) corresponding to the utterance, and initializes backward-looking centers, in accordance with some implementations. The conversation centers for the example utterance are 'measles' and 'uk.' Based on the computed conversation centers, the system applies (406) filters to update the visualization (e.g., applies categorical and spatial filters showing measles in the UK in the visualization 408). FIG. 4D shows an enlarged version of the visualization 408. As shown in FIG. 4D, the utterance "measles in the UK" results in the system showing a visualization of "Disease Outbreaks Around the World" with the focus on (DISEASES==Measles (442) and COUNTRY==United Kingdom (444)). Referring back to FIG. 4A, supposing the user responds to the visualization 408 with a new utterance 410 (e.g., "show me the orange spike"), the system computes (412) the forward-looking conversation centers by applying the Continue rule (described above in reference to 323, FIG. 3B). This is because the temporary conversation center (not shown) for the example utterance includes "orange spike" that corresponds to visualization characteristics (a type of variable), viz. variable shape (with the value 'spike') and variable color (with the value 'orange'), and these variables are absent in the backward-looking conversation centers (404). Moreover, since utterance 410 does not refer to the other variables (DISEASES or COUNTRY) in the backward-looking conversation centers (404), the system does not apply the Retain rule or the Shift rule. The forward-looking conversation centers (414) for utterance 410 are thus computed to be {measles, uk, orange spike}. Based on these forward-looking centers, the system updates the corresponding charts in the data visualization (e.g., by highlighting the orange spike in the line for measles in the chart in the visualization 418). FIG. 4E shows an enlarged version of the visualization 418. As the example shows, the system highlights and annotates (446) the spike with the words "4.4 cases of Measles in 2013" in response to the utterance "show me the orange spike," in accordance with some implementations.

Figure 4B:
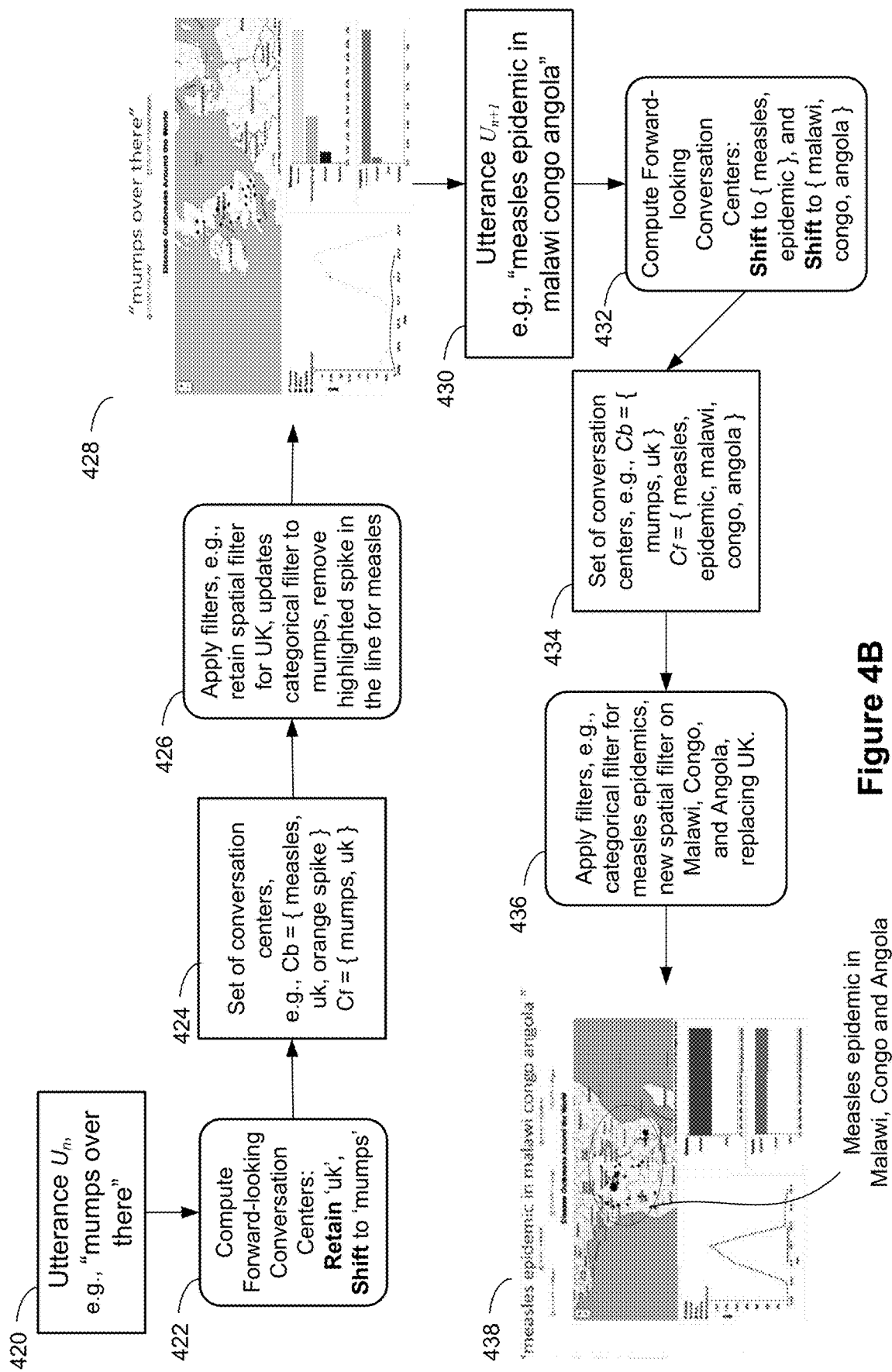

FIG. 4B is another diagram further illustrating the application of different transitional rules for example utterances. This example follows the user response to visualization 438 in FIG. 4A. Referring to FIG. 4B, when the system receives an utterance 420 (e.g., "mumps over there"), the system computes (422) forward-looking conversation centers corresponding to the utterance, in accordance with some implementations. The backward-looking conversation centers (424) (e.g., {measles, uk, orange spike}) correspond to the forward-looking conversation centers (414) computed in the previous step (in response to utterance 410) shown in FIG. 4A. The temporary conversation centers (not shown) for the utterance 420 (e.g., "mumps over there") does not include a conversation center (e.g., "orange spike") derived for the prior utterance. This triggers the system to apply the Retain rule (described above in reference to 325, FIG. 3B). For example, the temporary conversation centers include the DISEASES variable but the value of that variable is changed from measles to mumps. This causes the system to apply the Shift rule (described above in reference to 327, FIG. 3B). As a result, the system computes the forward-looking conversation centers (424) (e.g., {mumps, uk}). Based on these forward-looking conversation centers, the system responds (426) by applying necessary filters (e.g., retaining spatial filter for UK, updating categorical filter to mumps), and updating visualization (e.g., removing highlighted spike in the line for measles), as shown in the visualization 428. FIG. 4F shows an enlarged version of the visualization 428. As shown in FIG. 4F, the utterance "mumps over there" results in the system showing a visualization of "Disease Outbreaks Around the World" with the focus on (DISEASES==Mumps (448) and COUNTRY==United Kingdom (450)).

Referring back to FIG. 4B, to continue the example, supposing the user queries with another utterance (430) (e.g., "measles epidemic in Malawi Congo Angola"), the system computes (432) the forward-looking centers corresponding to this utterance by applying the Shift rule described above. For the example shown, the reason for applying the Shift rule is that the values of the variable DISEASES are now different ('measles' and 'epidemic'). In addition, the geographic region has changed from UK to Malawi, Congo and Angola. Based on applying the Shift rule, the system computes the forward-looking conversation centers (434) (for this example, the centers are {measles, epidemic, malawi, congo, angola}). Based on the forward-looking conversation centers (434), the system responds (436) to the utterance further by applying appropriate filters (e.g., a categorical filter for measles epidemics, and a new spatial filter on Malawi, Congo, and Angola, replacing UK), thereby generating the visualization 438 (e.g., showing Measles epidemics in Malawi, Congo, and Angola). FIG. 4G shows an enlarged version of the visualization 438. As shown in FIG. 4G, the utterance "measles epidemic in malawi congo angola" results in the system showing a visualization of "Disease Outbreaks Around the World" with the focus on (DISEASES==Measles (452), IMPACT==Epidemic (454), COUNTRY==Malawi (456), COUNTRY==Congo (458), and COUNTRY==Angola (460)).

Figure 4C:
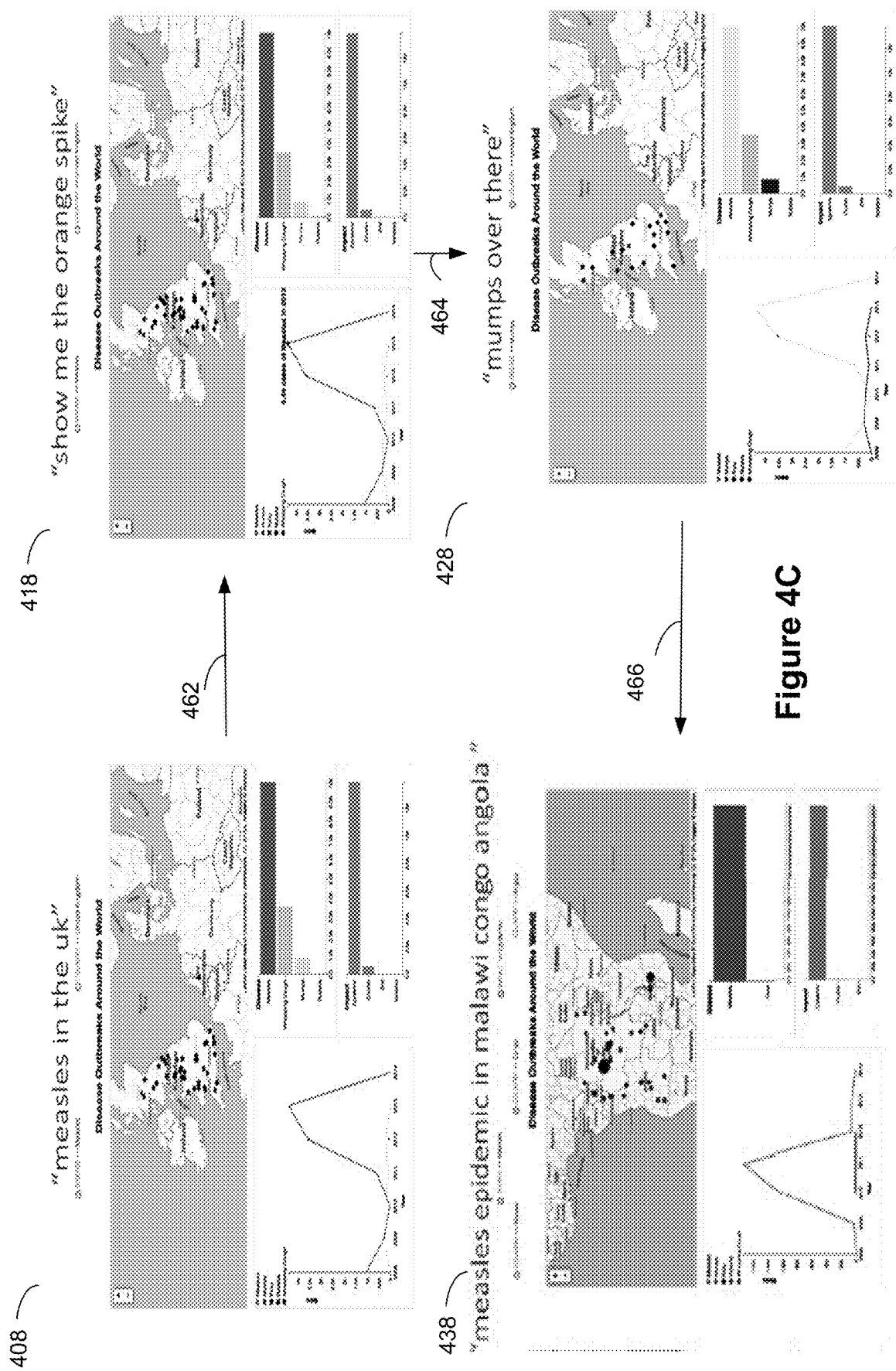
FIGS. 4C-4G illustrate graphical user interfaces (that relate to FIGS. 4A-4B) for interactive data analysis using natural language processing in a data visualization application according to some implementations.
Figure 4D:
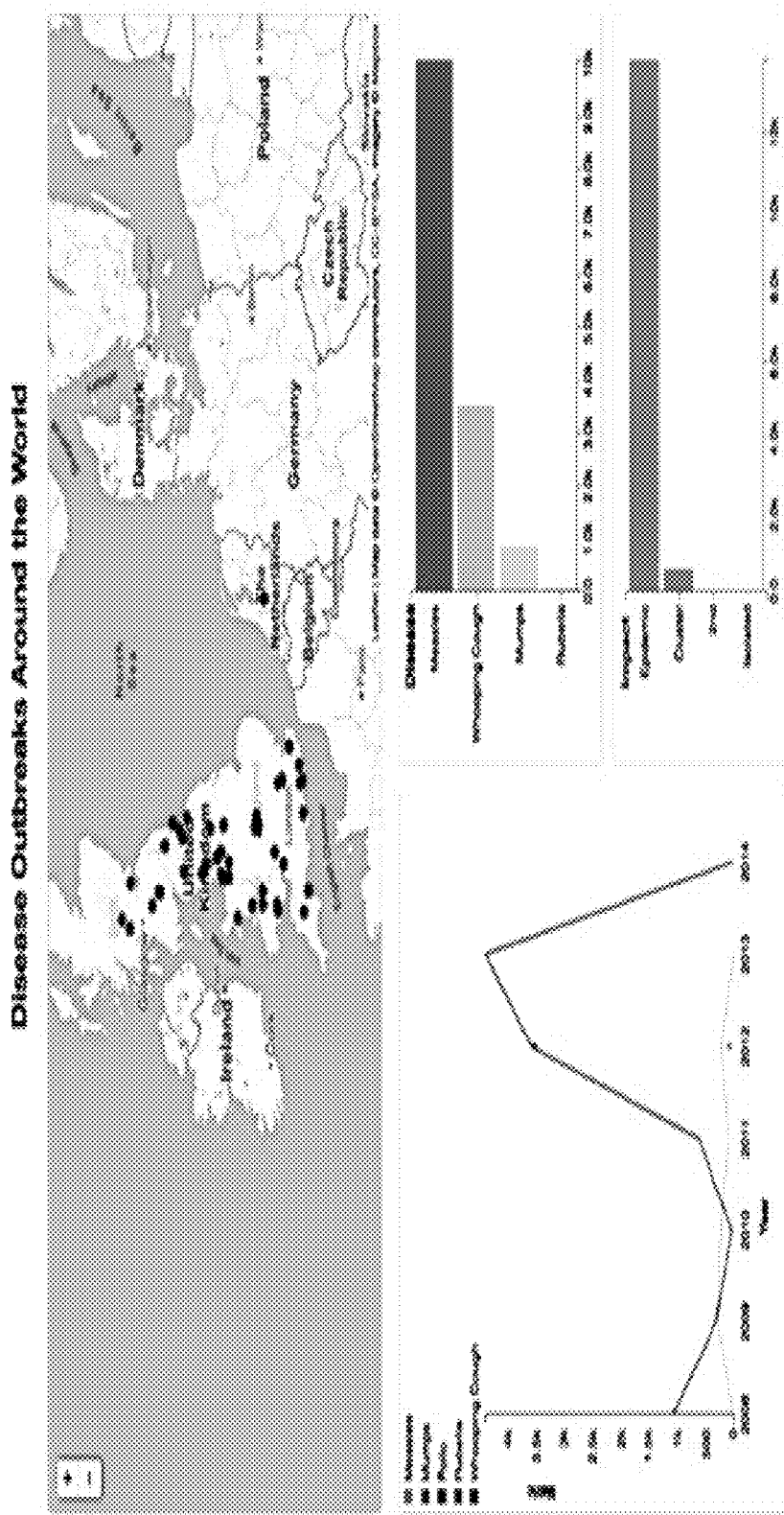
Figure 4E:
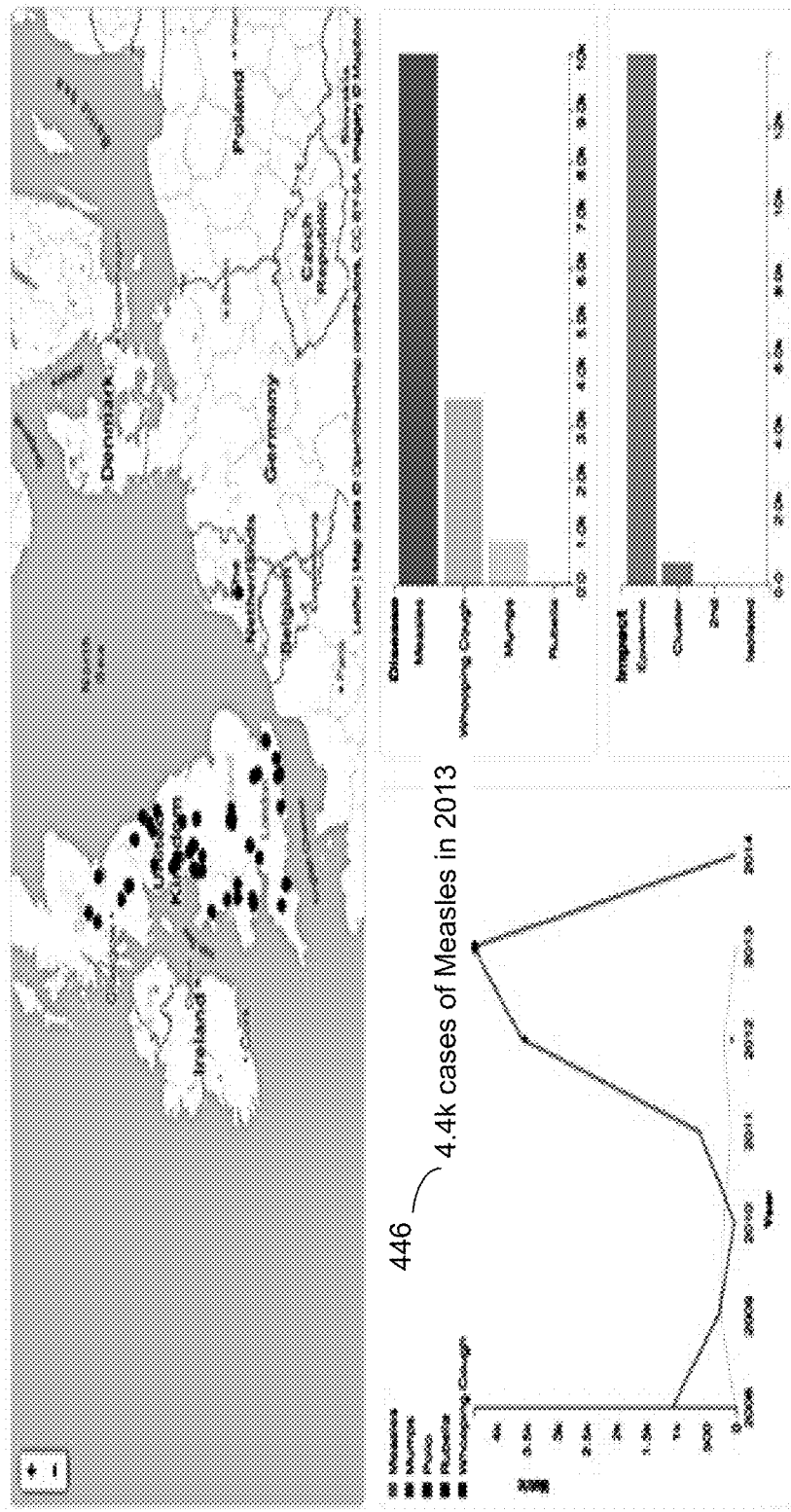
Figure 4F:
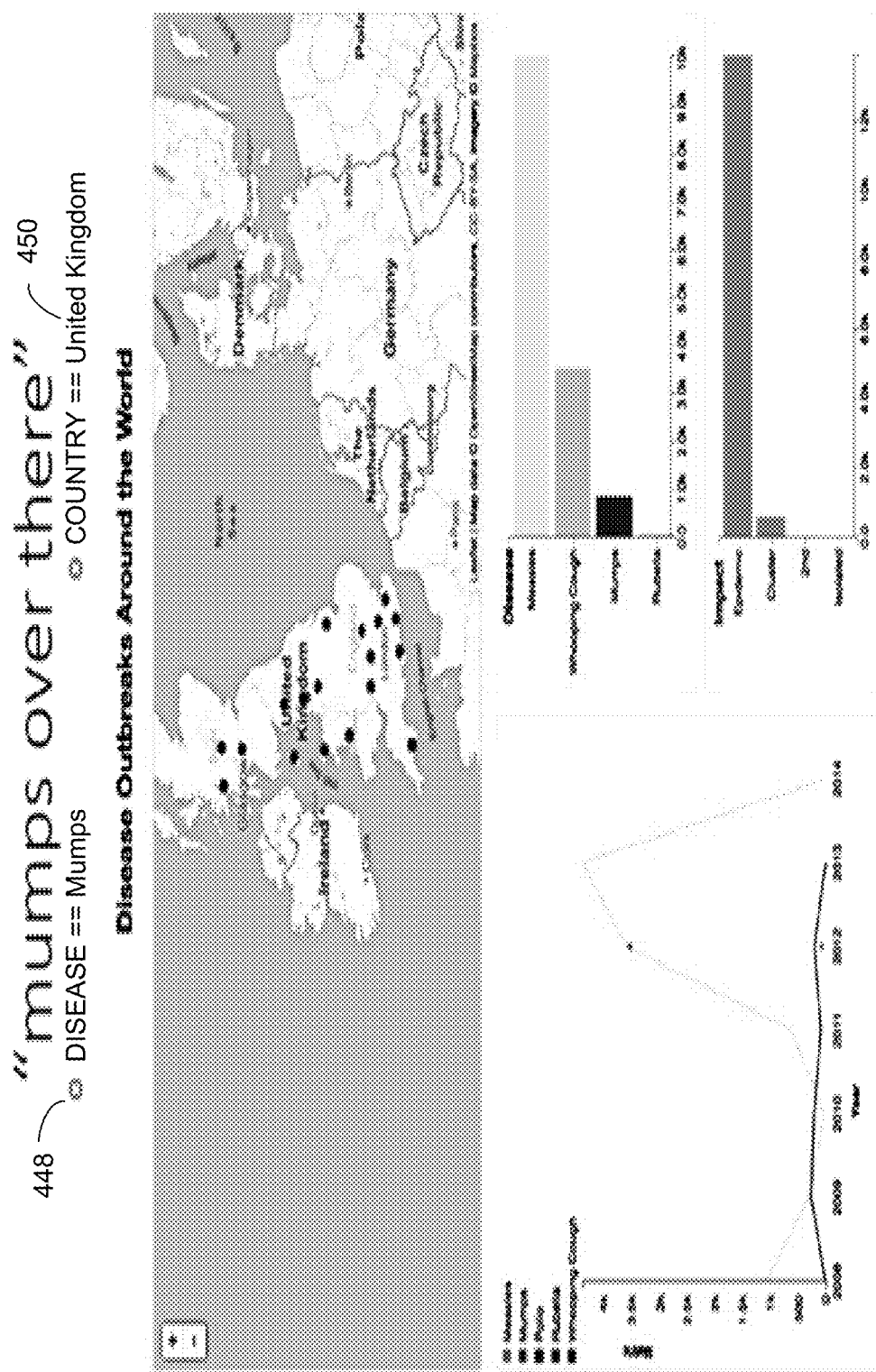
Figure 4G:
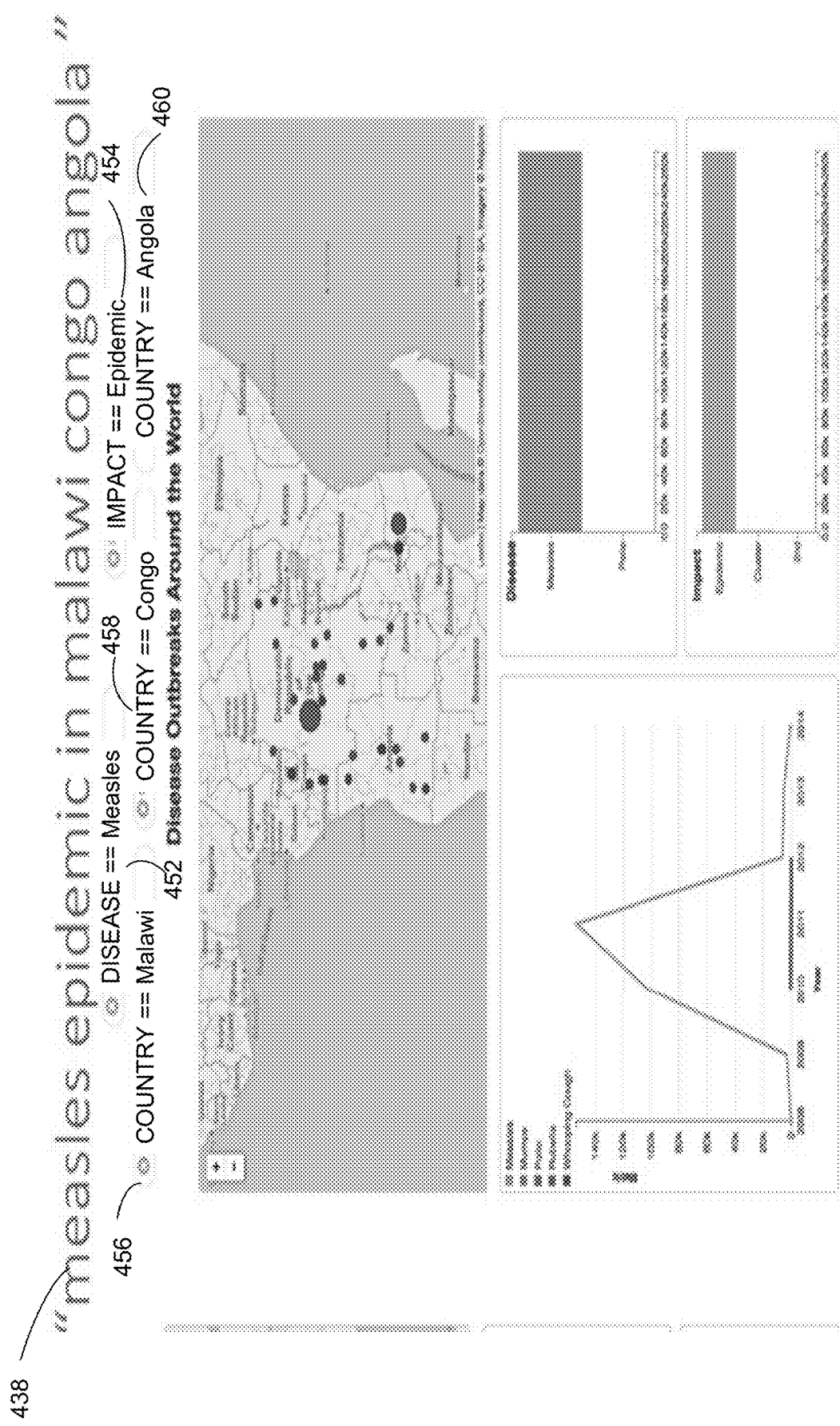

FIG. 4C illustrates the updates to the data visualizations in response to user utterances described above in reference to FIGS. 4A and 4B, in accordance with some implementations. The visualizations 408, 418, 428, and 438 were described above in reference to the enlarged FIGS. 4D, 4E, 4F, and 4G, respectively.

Figure 5:
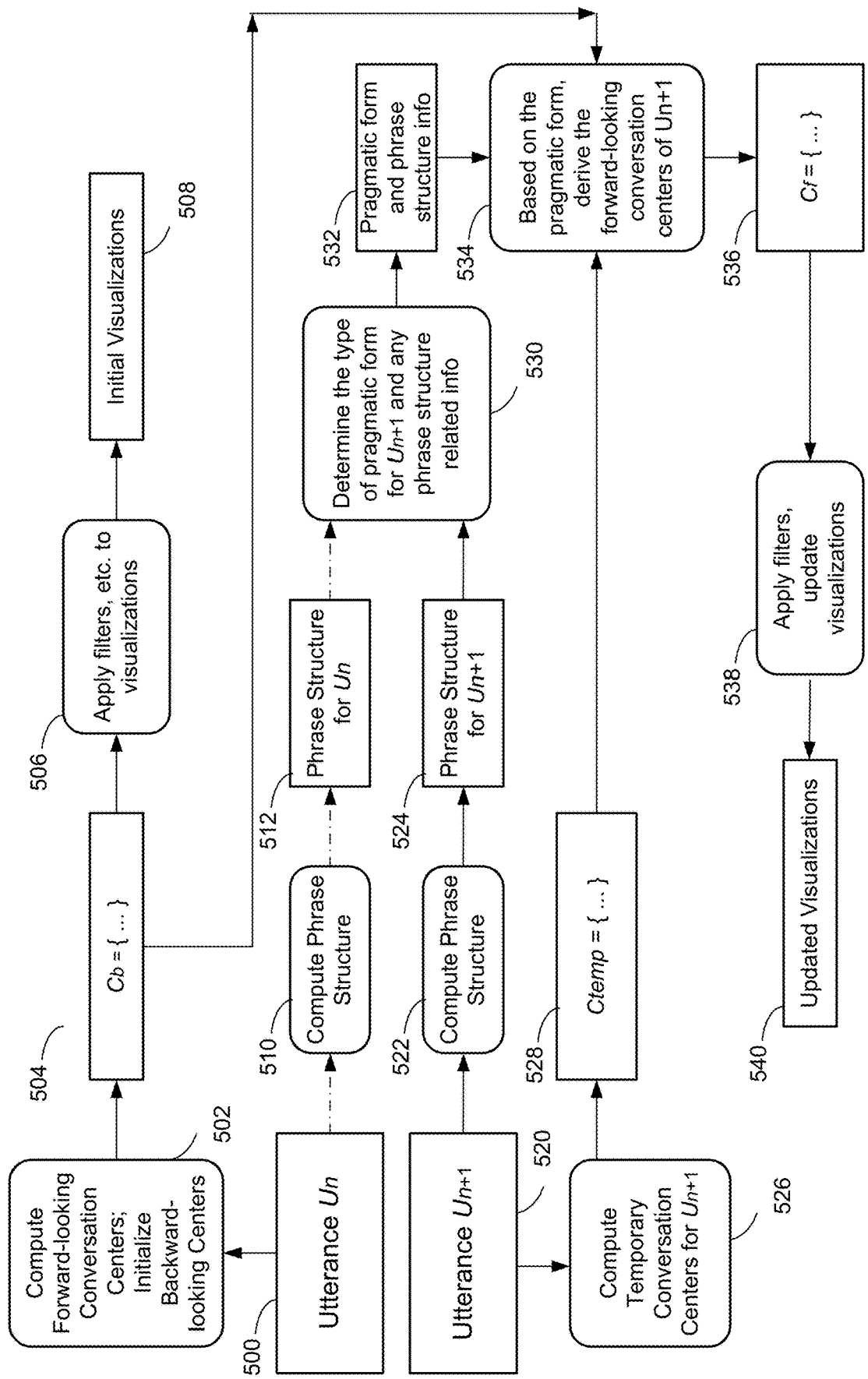
FIG. 5 is a diagram illustrating a general framework for the application of principles of pragmatics for visual analytics according to some implementations.

FIG. 5 is a diagram illustrating a general framework for the application of principles of pragmatics for visual analytics according to some implementations. The framework utilizes and extends a model commonly used for discourse structure called conversational centering, in accordance with some implementations. In this model, utterances are divided into constituent discourse segments, embedding relationships that may hold between two segments. A center refers to those entities serving to link that utterance to other utterances in the discourse. Consider a discourse segment DS with utterances $U_1, \ldots, U_m$. Each utterance $U_n$ ($1 \le n < m$) in DS is assigned a set of forward-looking centers, $C_f(U_n, DS)$ referring to the current focus of the conversation; each utterance other than the segment's initial utterance, is assigned a set of backward-looking centers, $C_b(U_n, DS)$.

The set of backward-looking centers of a new utterance $U_{n+1}$ is $C_b(U_{n+1}, DS)$, which is equal to the forward-looking centers of $U_n$ (i.e., $C_f(U_n, DS)$). In the context of visual analytic conversations, forward and backward-looking centers include data attributes and values, visual properties, and analytical actions (e.g., filter, highlight).

Given an utterance $U_n$, a system implementing this framework responds by executing a series of analytical functions derived from the forward-looking centers $C_f(U_n, DS)$. An analytical function F(X, op, v) consists of a variable X (which can be an attribute or a visualization property), an operator op, and a value v (typically a constant). For example, when the user says "measles in the uk," the system creates two functions, such as the function F_CAT(diseases, ==, measles) and the function F_CAT (country, ==, uk). When the user provides a new utterance $U_{n+1}$, the system first creates a set of temporary centers $C_{temp}(U_{n+1}, DS)$ from $U_{n+1}$ without considering any previous context. The system then applies a set of rules to create a set of forward-looking centers, $C_f(U_{n+1}, DS)$ based on some set operations between $C_b(U_{n+1}, DS)$ and $C_{temp}(U_{n+1}, DS)$. The forward-looking centers are then used to respond to the user utterance according to some implementations.

FIG. 5 illustrates this process for two utterances $U_n$ (500) and $U_{n+1}$ (520) according to some implementations. The system computes (526) a set of temporary centers $C_{temp}(U_{n+1})$ (528) from $U_{n+1}$ without considering any previous context. At the time of receiving utterance $U_{n+1}$, the system has either pre-computed a set of backward-looking conversation centers $C_b(U_{n+1})$ (504) based on the previous utterance $U_n$, or, if $U_n$ was the first utterance, initialized $C_b(U_{n+1})$ (504) to a null set.

Conversation centering posits that utterances display connectedness between them. The manner in which these utterances link up with each other to form a conversation is cohesion. Cohesion comes about as a result of the combination of both lexical and grammatical structures in the constituent phrases. Identifying phrase structure is thus a logical starting point to resolve that utterance into one or more analytical functions applied to the visualization. Phrase structure includes both lexical and grammatical structure. In FIG. 5, a system implementing this framework computes phrase structure for utterance $U_{n+1}$ (520) in step 522. Typically, a parser is used to compute the phrase structure. A parser accepts an input sentence (sometimes called a query or a natural language command) and breaks the input sentence into a sequence of tokens (linguistic elements) by applying a set of grammar rules specific to a particular natural language, such as English. In some implementations, the grammar rules can be modified to suit the environment. In some implementations, a probabilistic grammar is applied to provide a structural description of the input queries. Probabilistic grammars are useful in resolving ambiguities in sentence parsing. The probability distributions (for grammar production rules) can be estimated from a corpus of hand-parsed sentences, for instance. Some implementations deduce additional syntactic structure by employing a Part-Of-Speech (POS) Tagger that assigns parts of speech, such as noun, verb, adjective, to each word (sometimes called a token). Some implementations resolve the parsed output to corresponding categorical and ordered data attributes. As the dashed lines that connects the blocks 500 and 510 show, in some implementations, the system also computes (510) phrase structure for the utterance $U_n$ (500).

With the phrase structure(s), the system proceeds to determine (530) the type of pragmatic forms (examples of which are described below with reference to FIGS. 6A through 10C) and any other phrase structure related info (e.g., linguistic elements present in one utterance but absent in another). Based on the pragmatic form and phrase structure information (532), the system then derives (534) forward-looking conversation centers $C_f$ (536) of utterance $U_{n+1}$ (520) using the temporary conversation centers (528) and the backward-looking conversation centers $C_b$ (504), in accordance with some implementations. As shown in FIG. 5, even before receiving utterance $U_{n+1}$ (520), the system derives and/or displays one or more initial visualizations (508) based on the backward-looking conversation centers $C_b$ (504) by applying (506) a first set of operations (e.g., applying filters) to existing visualizations. In some implementations, based on the forward-looking conversation centers $C_f$ (536), the system applies (538) a second set of operations (e.g., applying filters) to update existing visualizations or generate new visualizations (540).

Figure 6A:
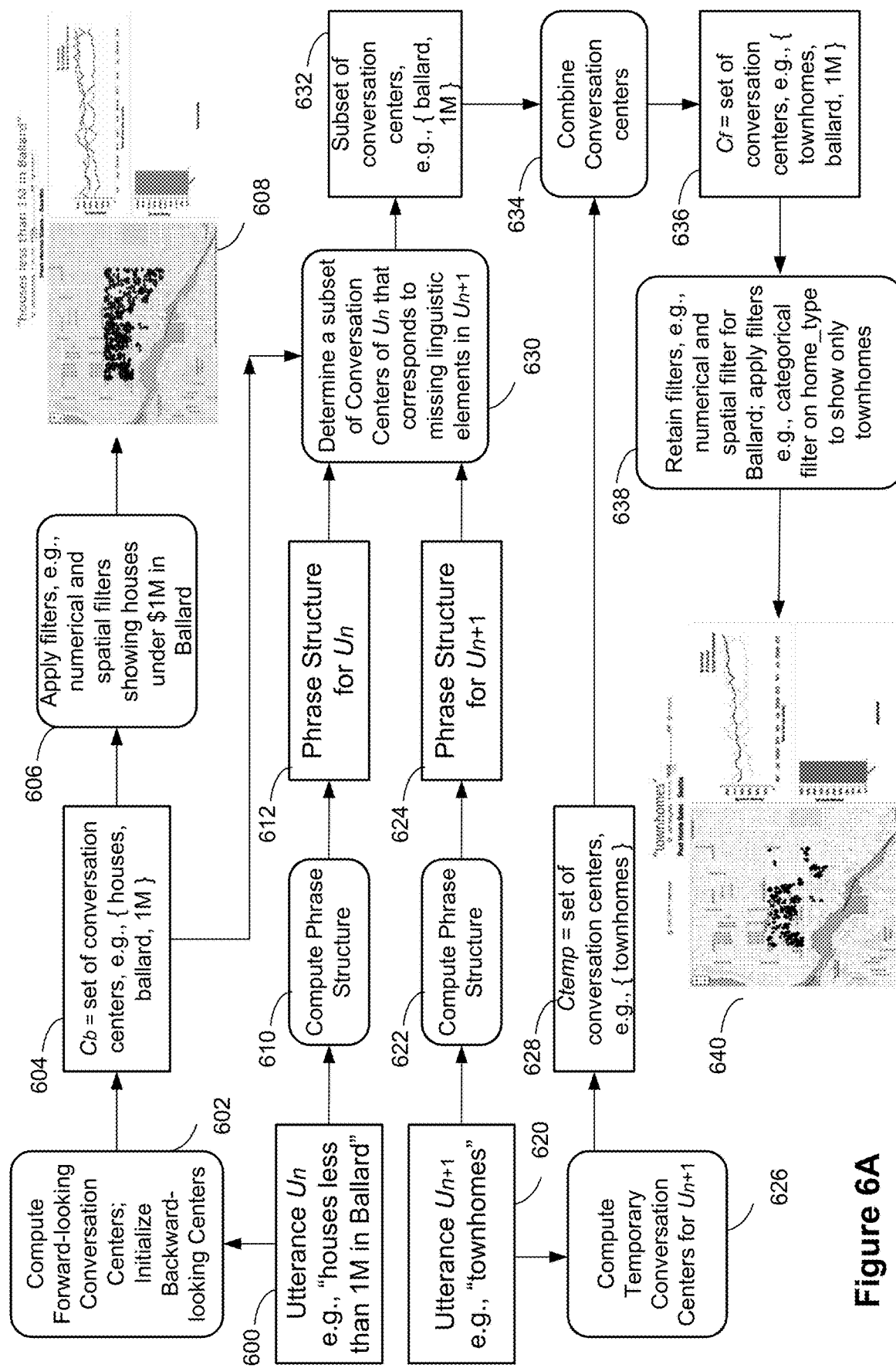
FIG. 6A is a diagram illustrating the application of pragmatics principles for incomplete utterances (sometimes herein called Ellipsis) according to some implementations.
Figure 6C:
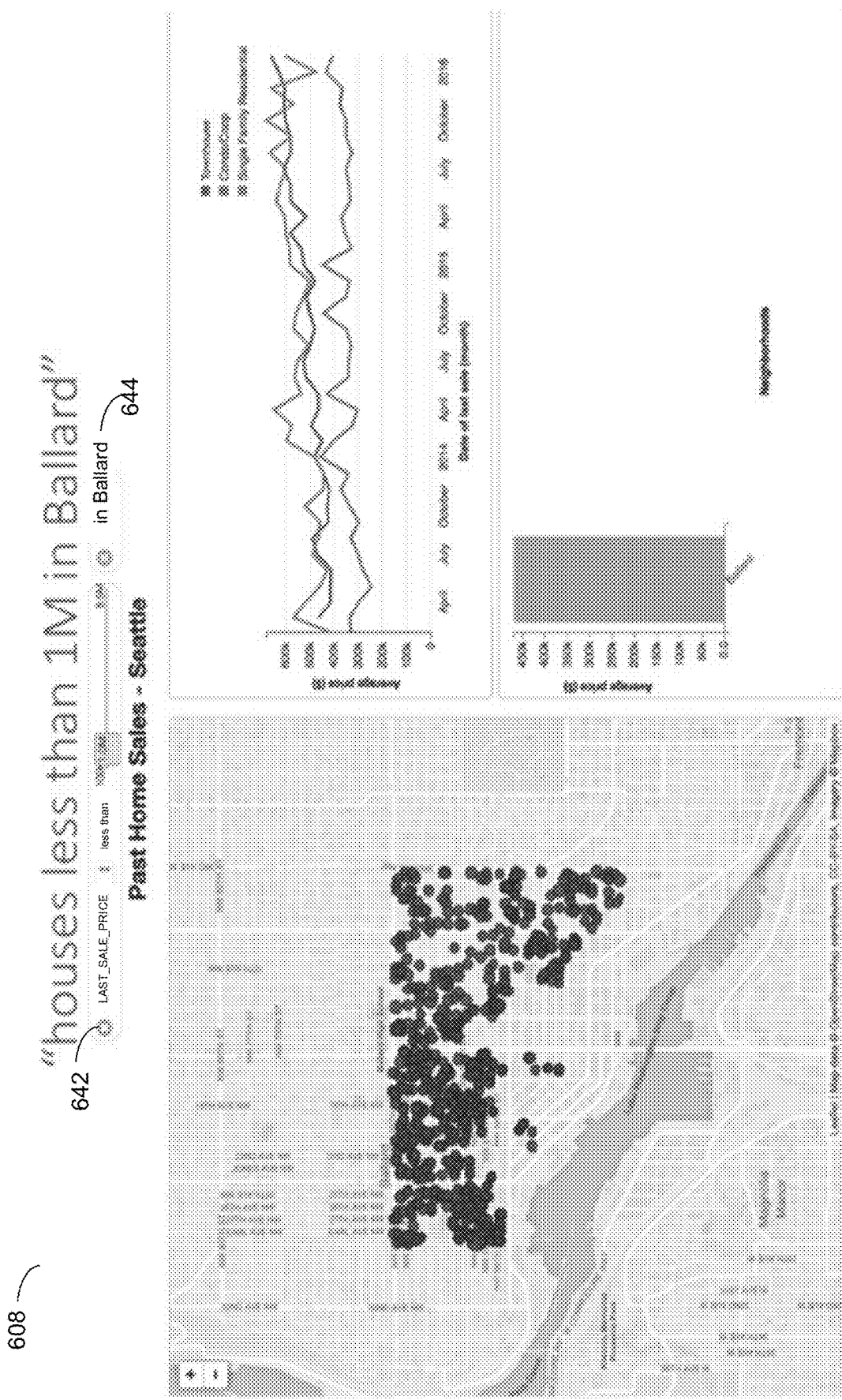
Figure 6D:
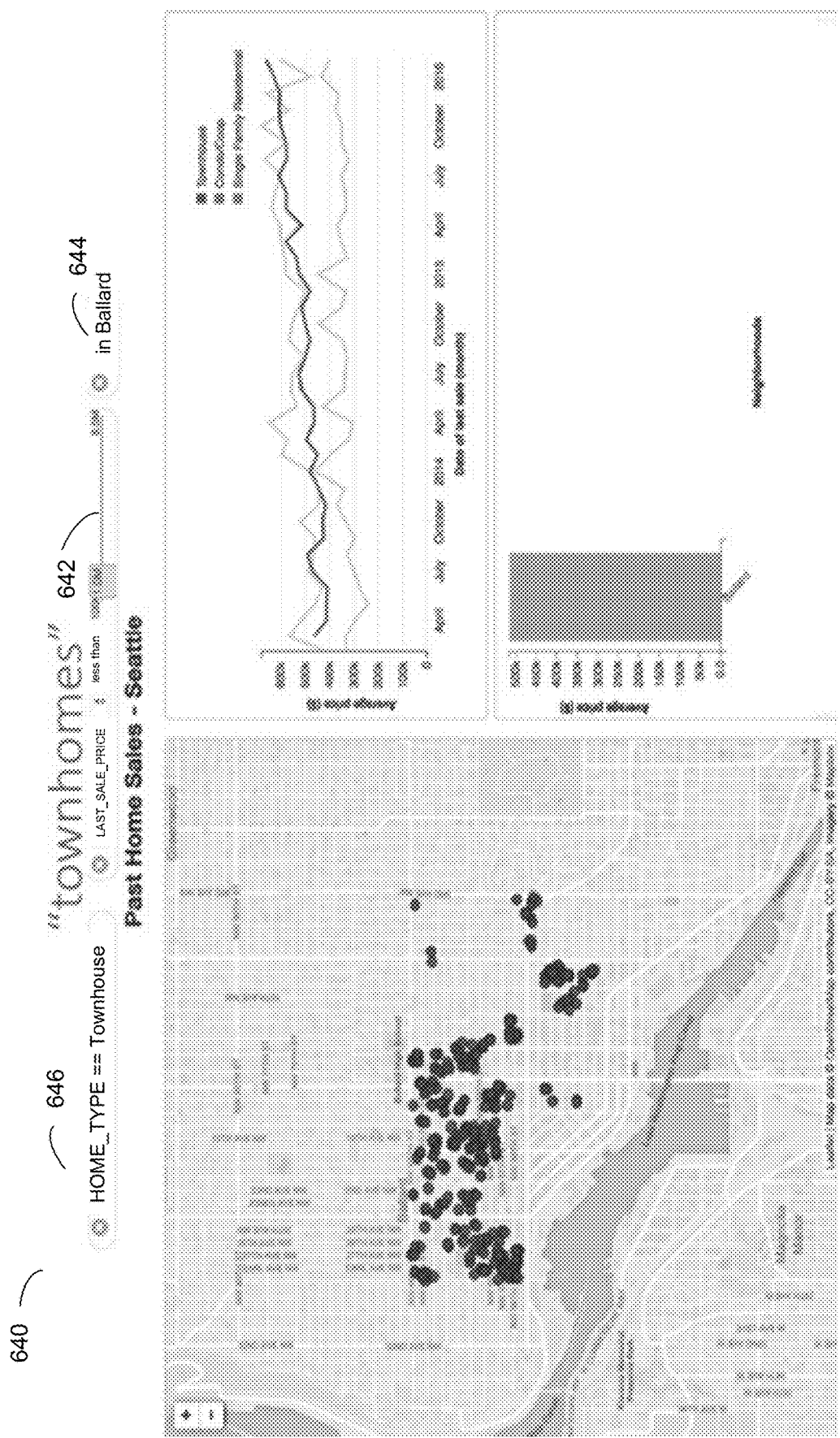

FIG. 6A is a diagram illustrating the application of pragmatics principles for incomplete utterances (sometimes called ellipsis) according to some implementations. Ellipses are syntactically incomplete sentence fragments that exclude one or more linguistic elements. These utterances can be understood better with previously established context. FIG. 6A illustrates how an incomplete utterance "townhomes" is understood in the context of the previous utterance "houses in less than 1M in Ballard." When the system receives an utterance $U_n$ (600), which in this example is the utterance "houses in less than 1M in Ballard," the system computes forward-looking centers and initializes backward-looking centers (for utterance $U_{n+1}$) in step 602, using the methodology described above in reference to FIG. 5 (step 502), in accordance with some implementations. For the example utterance, the system computes the set of conversation centers to be {houses, ballard, and 1M}. In some implementations, the system applies (606) filters to the dataset based on the set of conversation centers (604) and displays a data visualization (608). In this example, the system applies numerical and spatial filters showing houses under $1M in Ballard. FIG. 6D shows an enlarged version of the visualization 608. As shown in FIG. 6C, the utterance "houses less than 1M in Ballard" results in the system showing a visualization of "Past Home Sales—Seattle" with the focus on (LAST_SALE_PRICE less than 1.0M (642) in Ballard (644)). Referring back to FIG. 6A, in some implementations, the system also computes phrase structure (610) for the utterance $U_n$ in step 610 using one or more techniques described above in reference to step 510 of FIG. 5.

In some implementations, when the system receives an utterance $U_{n+1}$ (620), which in this example is the utterance "townhomes," the system computes (626) temporary conversation centers for $U_{n+1}$ (620). For this example, the system computes the conversation centers (628) to be the set {townhomes}. Additionally, the system computes (622) phrase structure for the utterance $U_{n+1}$ (620) using techniques described above in reference to step 522 (FIG. 5), in accordance with some implementations.

As mentioned above, ellipses exclude one or more linguistic elements. With the aid of the phrase structures (612 and 624), the system determines a subset of conversation centers of utterance $U_n$ (600) that corresponds to missing linguistic elements in utterance $U_{n+1}$ (620), in accordance with some implementations. In this example, the system computes the subset to be the set {ballard, 1M}, because the linguistic elements, viz., a noun phrase that refers to a place following a prepositional phrase (corresponding to "ballard") and a noun phrase that refers to a price value following another prepositional phrase (corresponding to "1M" or, more precisely, "under 1M"), are missing in utterance $U_{n+1}$ (620) but were present in utterance $U_n$ (600). On the other hand, the phrase "houses" in the utterance $U_n$ (600) and the phrase "townhomes" in the utterance $U_{n+1}$ (620) correspond to similar linguistic elements (e.g., both phrases are noun phrases and refer to types of houses).

In step 634, the system combines the temporary set of conversation centers, which in this example is the set {townhomes}, with the subset of conversation centers (632) to arrive at a set of forward-looking conversation centers (638) for utterance $U_{n+1}$, in accordance with some implementations. Based on the computed set of forward-looking conversation centers (636), the system determines the type of filters to apply to the dataset and applies the appropriate filters in step 638 to display an appropriate data visualization (640), in accordance with some implementations. In this example, because the conversation centers "ballard" and "1M" were retained from the backward-looking conversation centers (604), the system retains the numerical filter (corresponding to 1M) and spatial filter (corresponding to Ballard). Also, since the value of the conversation center (corresponding to home_type variable) changed from townhomes to houses, the system applies categorical filter on home_type to show the townhomes (instead of houses). FIG. 6D shows an enlarged version of the visualization 640. As shown in FIG. 6D, the utterance "townhomes" results in the system showing a visualization of "Past Home Sales—Seattle" retaining the LAST_SALE_PRICE widget or filter (642) and the spatial filter 644 from the previous visualization 608 and replacing the HOME_TYPE with townhouses (646).

FIG. 6B illustrates the updates to the data visualizations in response to user utterances described above in reference to FIG. 6A, in accordance with some implementations. The visualizations 608 and 640 were described above in reference to the enlarged FIGS. 6C and 6D respectively.

Figure 7A:
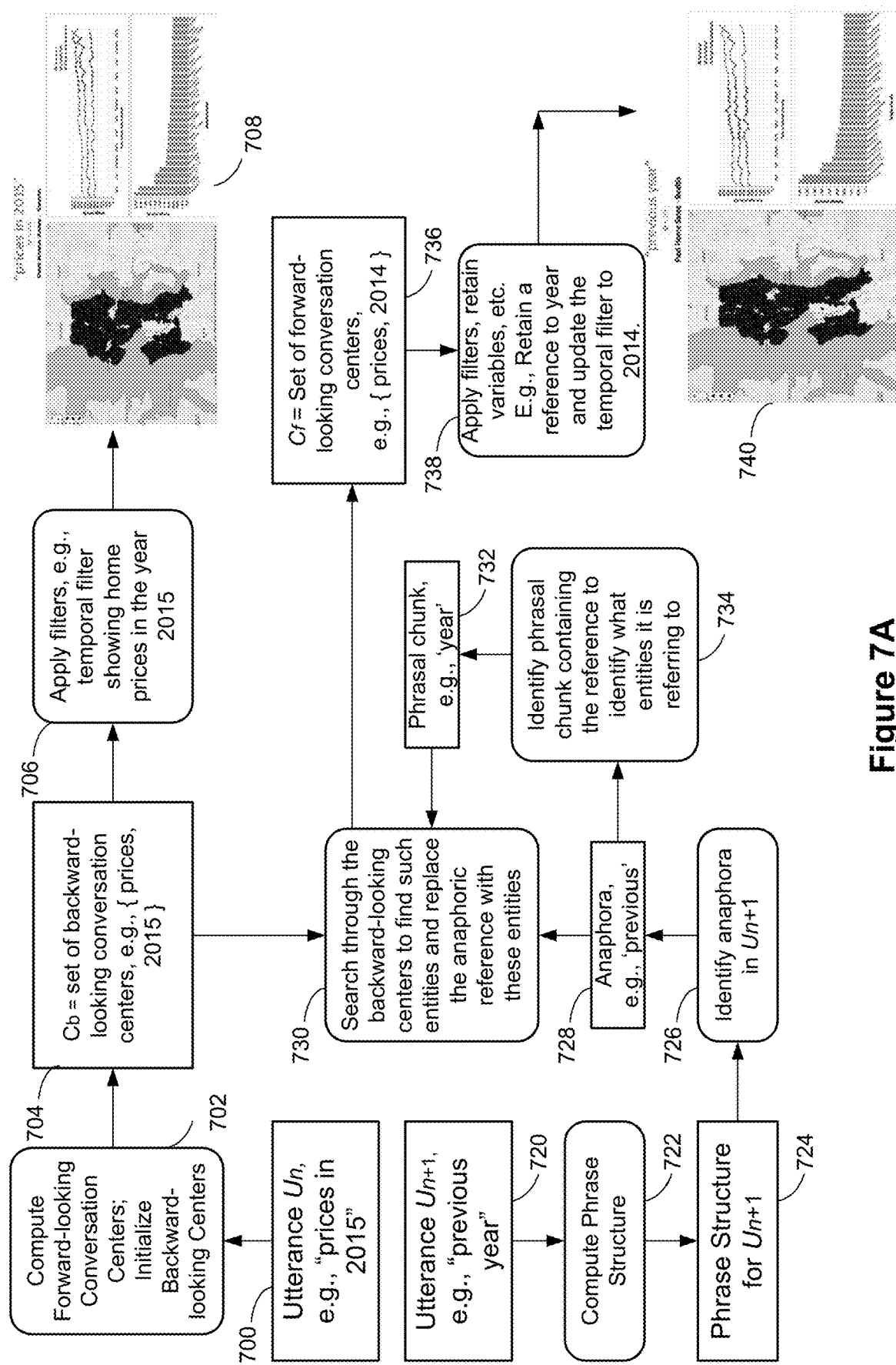
FIG. 7A is a diagram illustrating the application of pragmatics principles for utterances with referring expressions (sometimes herein called anaphoric references) according to some implementations.

FIG. 7A is a diagram illustrating the application of pragmatics principles for utterances with referring expressions (sometimes herein called anaphoric references) according to some implementations. Referring expressions help to unify the text and create economy, preventing unnecessary repetition. Referencing is a conversation form, which instead of being interpreted semantically in its own right, makes reference to something else for its interpretation. When the interpretation is within the text, this is known as anaphoric referencing. In visual analytics interaction, the reference pertains to data attributes and analytical functions. FIG. 7A illustrates how an utterance "previous year" is understood in the context of the previous utterance "prices in 2015." When the system receives an utterance $U_n$ (700), which in this example is the utterance "prices in 2015," the system computes forward-looking centers and initializes backward-looking centers (for utterance $U_{n+1}$) in step 702, using the methodology described above in reference to FIG. 5 (step 502), in accordance with some implementations. For the example utterance, the system computes the set of conversation centers to be {prices, 2015}. In some implementations, the system applies (706) filters to the dataset based on the set of conversation centers (704) and displays a data visualization (708). In this example, the system applies temporal filters showing home prices in the year 2015. FIG. 7C shows an enlarged version of the visualization 708. As shown in FIG. 7C, the utterance "prices in 2015" results in the system showing a visualization of "Past Home Sales—Seattle" in 2015. Although not shown, a previous visualization (e.g., in response to a previous utterance), caused the system to check prices in Seattle. Referring back to FIG. 7A, when the system receives an utterance $U_{n+1}$ (720), which in this example is the utterance "previous year," the system computes (722) phrase structure for the utterance $U_{n+1}$ (720) using techniques described above in reference to step 522 (FIG. 5), in accordance with some implementations.

As mentioned above, referring expressions with anaphoric references make references to something else within the text. Based on the phrase structure (724), the system identifies (726) anaphora in the utterance $U_{n+1}$ (720), in accordance with some implementations. In this example, the system identifies the anaphora (728) "previous." Using the identified anaphora, the system next identifies (734) phrasal chunk (732) containing the reference to identify the entities the reference is referring to, in accordance with some implementations. For the example shown, the system identifies the phrasal chunk "year" that corresponds to the anaphora "previous." Based on the identified anaphora and the phrasal chunk, in step 730, the system searches through the backward-looking centers to find such entities and replaces the anaphoric reference with these entities, in accordance with some implementations. Additionally, in some implementations, as is the case in this example, the system also detects and applies appropriate functions to the value of the entity. For the example shown, the system also detects that the user is referring to the "previous" year, and therefore the value of 2015 is decremented by 1 before arriving at the right value for the year variable. The system computes the date for 'previous' using a temporal function (e.g., DATECALC), in accordance with some implementations. The system arrives at a set of forward-looking conversation centers (736), which for this example is the set {prices, 2014}. Based on this set, the system takes necessary steps to update the visualization in step 738, in accordance with some implementations. For this example, the system retains a reference to year and updates the temporal filter to 2014, to show the visualization in 740. FIG. 7D shows an enlarged version of the visualization 740. As shown in FIG. 7D, the utterance "previous year" results in the system showing a visualization of "Past Home Sales—Seattle" in 2014, the year before 2015 (from the previous visualization).

Figure 7B:
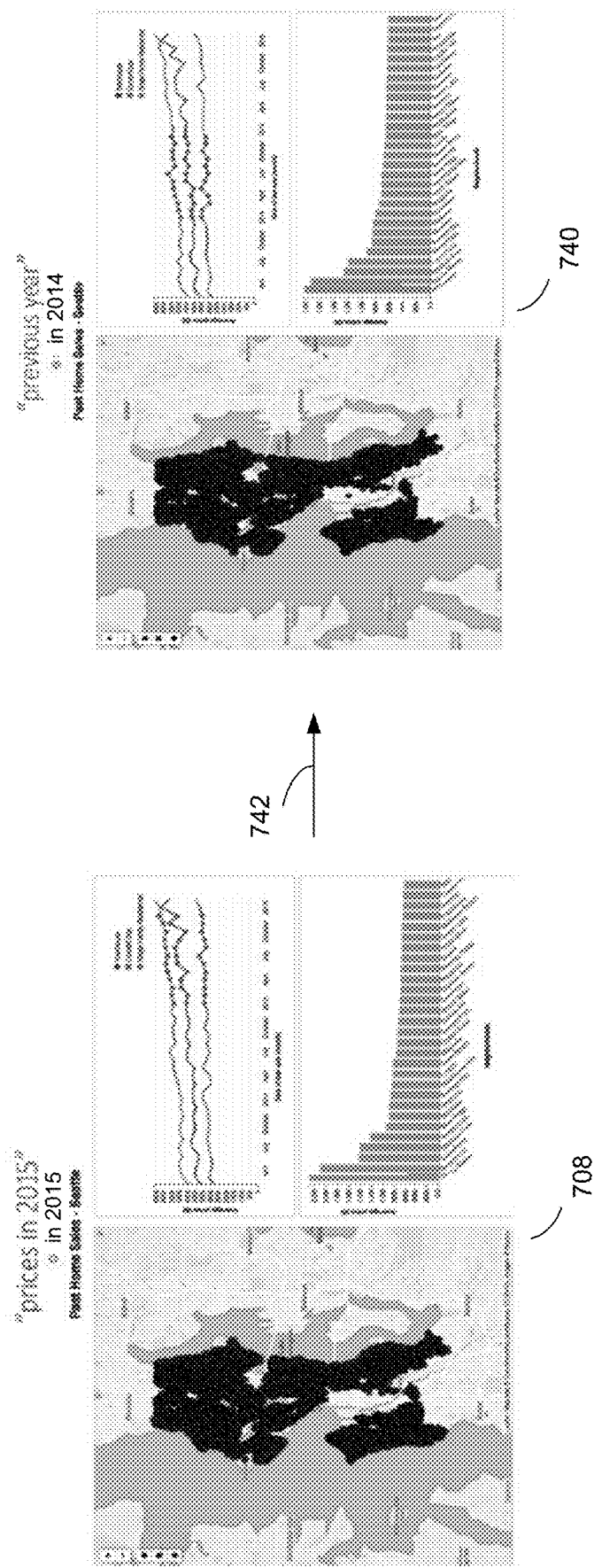
FIGS. 7B-7F illustrate graphical user interfaces (that relate to FIG. 7A) for interactive data analysis using natural language processing in a data visualization application according to some implementations.
Figure 7C:
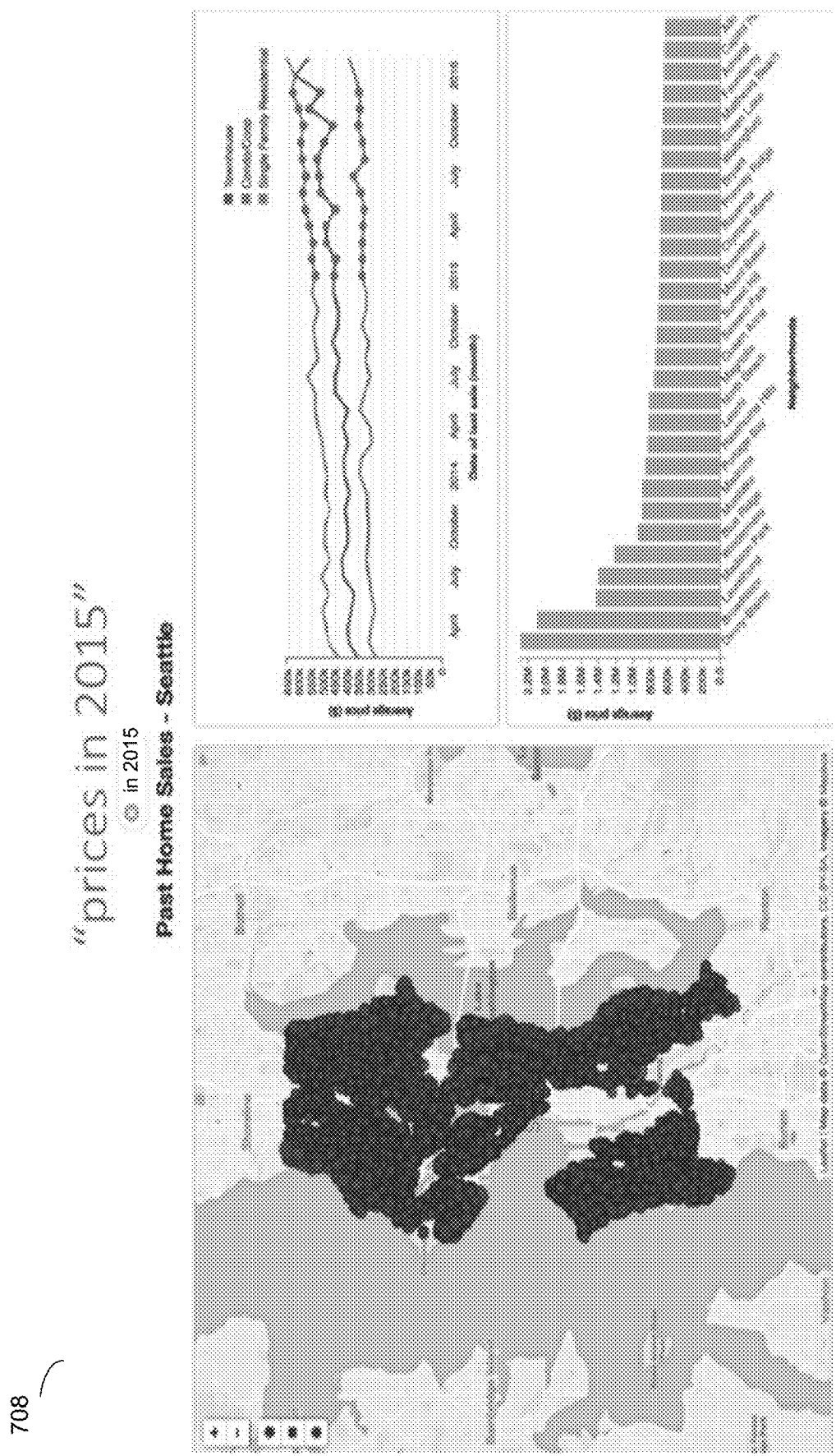
Figure 7D:
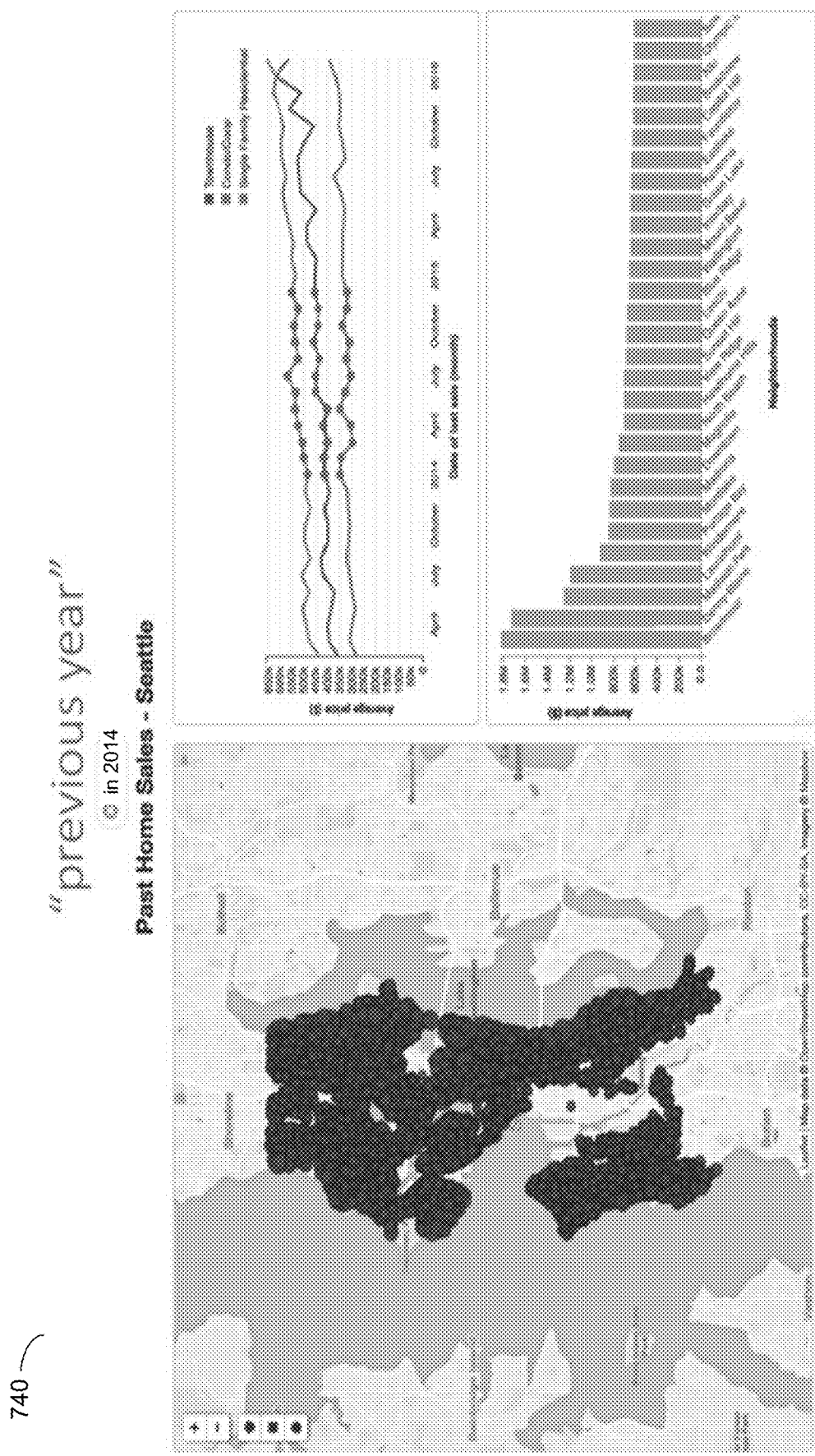

FIGS. 7B-7D illustrate graphical user interfaces (that relate to FIG. 7A) for interactive data analysis using natural language processing in a data visualization application according to some implementations. FIG. 7B illustrates the updates to the data visualizations in response to user utterances described above in reference to FIG. 7A, in accordance with some implementations. The visualizations 708 and 740 were described above in reference to the enlarged FIGS. 7C and 7D respectively.

Although not shown in FIG. 7A, in some implementations, a system repeats the steps to recognize multiple anaphoric references in a single expression. Additionally, in some implementations, the system identifies many types of anaphoric references in the given utterance, such as 'that,' 'those,' 'them,' 'ones,' 'previous,' 'next.' As another illustrative example, consider the utterance "Show fremont, queen anne, and ballard" followed by the utterance "condos in those districts." In this example, those is referring to some values (i.e., fremont, queen anne, and ballard) of the attribute neighborhood as indicated by the word districts.

In some implementations, the references refer to values of a data attribute. In some implementations, the references refer to actions that need to be executed by the system. For instance, consider the utterance "filter out ballard" followed by "do that to fremont." Here, the word that is not immediately followed by any noun, but immediately preceded by a verb word 'do.' In such cases, the system determines one or more actions mentioned in the previous utterance, which for this example is the action 'filter out'.

Figure 7E:
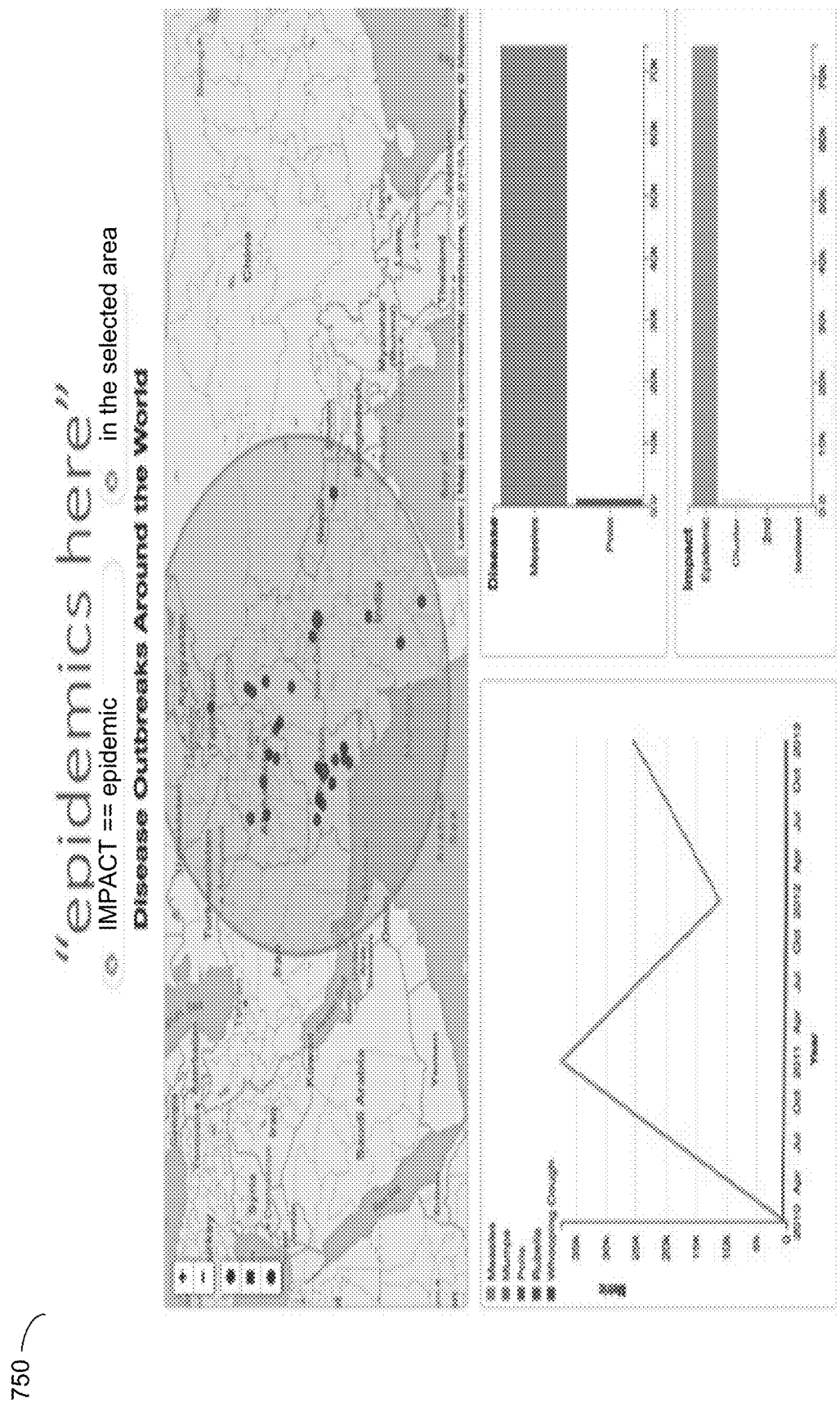
Figure 7F:
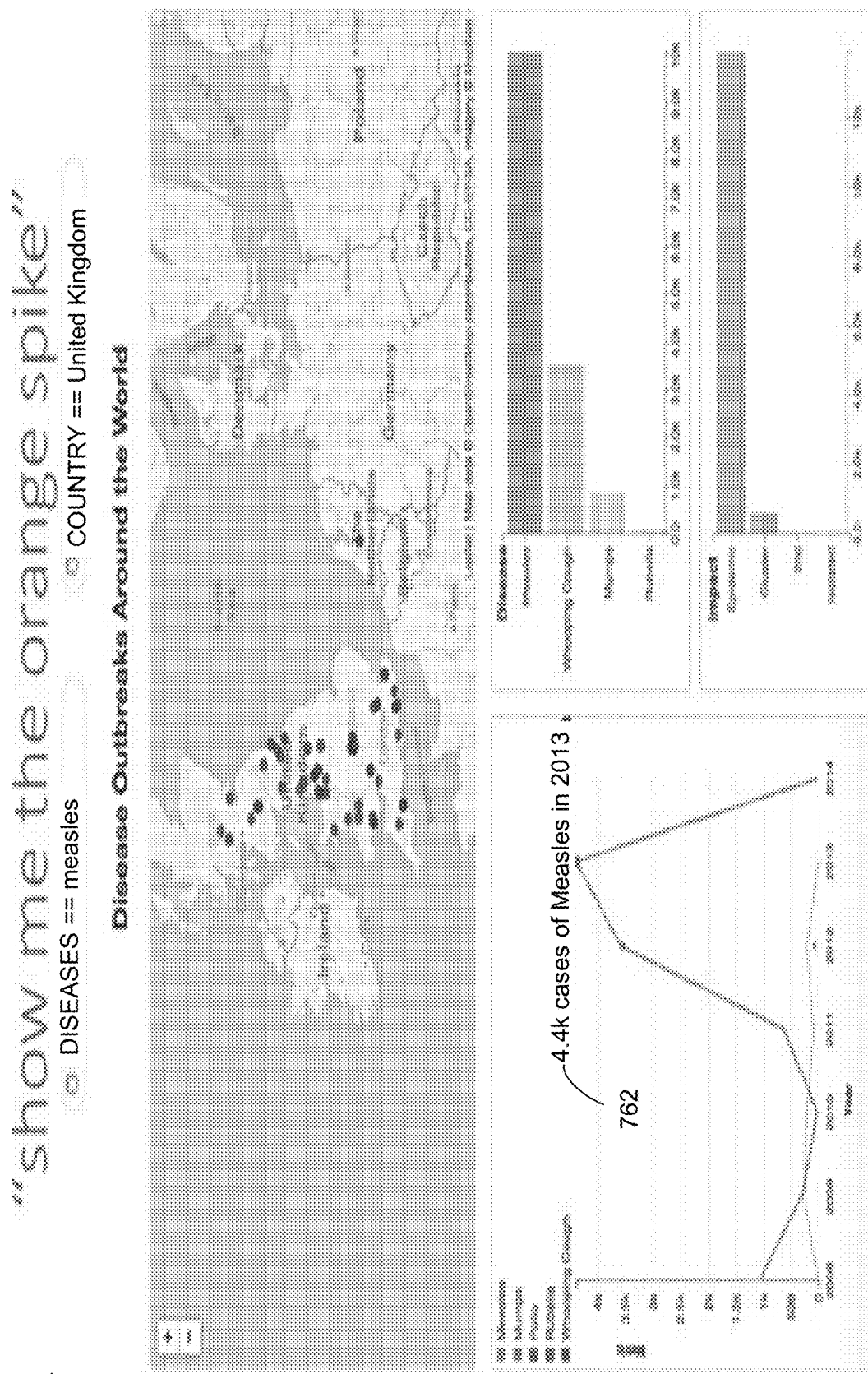

In some implementations, the system supports references that lie outside the text, and in the context of the visualization. In some such implementations, the forward-looking center $C_f$ references context within the visualization as opposed to text in the backward-looking center $C_b$. In some implementations, this form of indirect referencing includes a deictic reference that refers to some object in the environment, usually by pointing. In some such implementations, the system supports deictic references by enabling multi-modal interaction (mouse+speech/text). FIG. 7E shows an example visualization in response to a deictic reference. In some implementations, this form of indirect referencing includes a visualization property reference uses properties in the visualization such as mark properties, text in labels, axes and titles. FIG. 7F shows an example visualization in response to a reference to a visualization property.

Figure 8A:
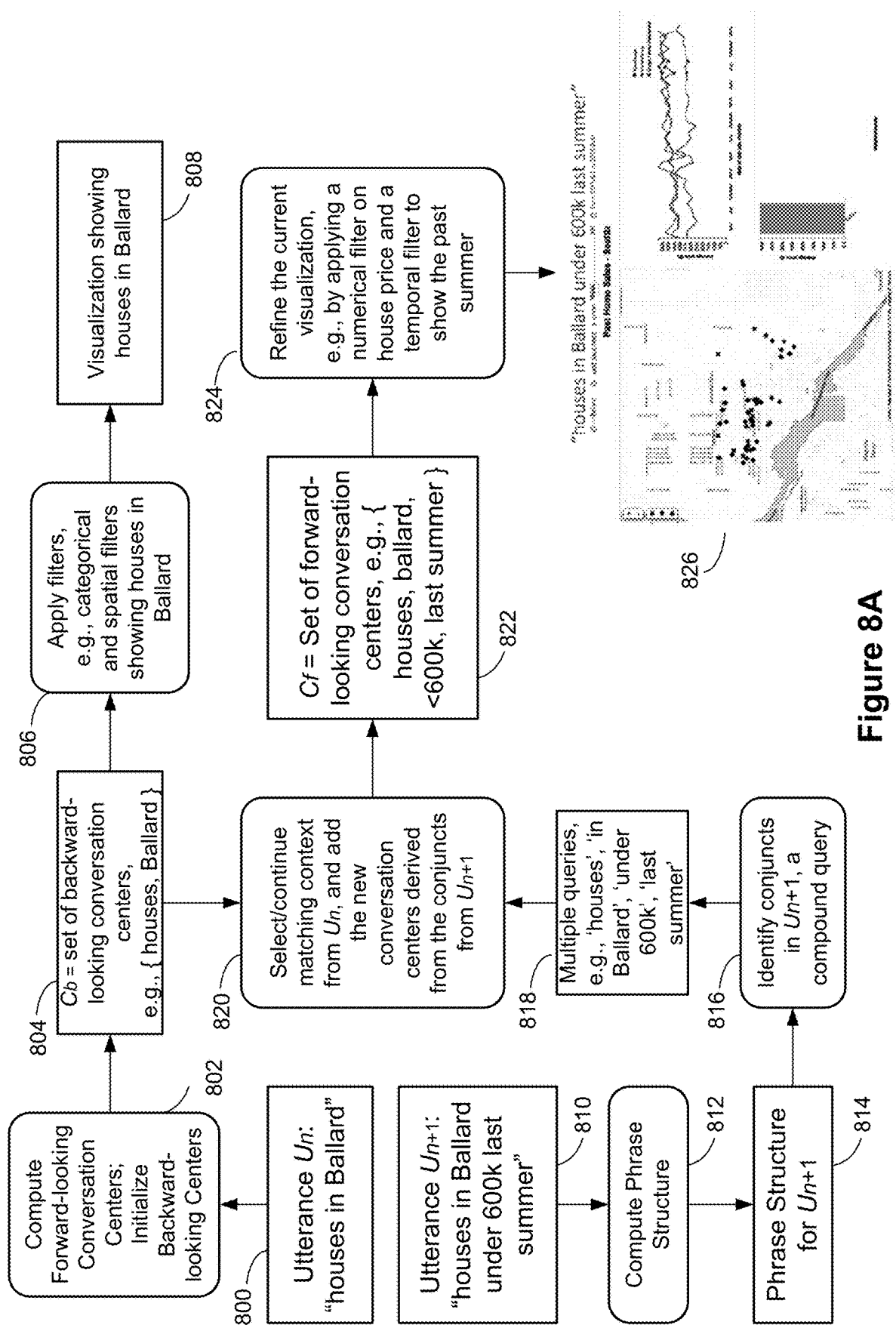
FIG. 8A is a diagram illustrating the application of pragmatics principles for utterances with conjunctions according to some implementations.

FIG. 8A is a diagram illustrating the application of pragmatics principles for utterances with conjunctions according to some implementations. Conjunctions in utterances communicate a range of relations between phrase fragments called conjuncts. In a conversation, users tend to iteratively build a compound query by adding multiple conjuncts, often avoiding explicit use of conjunctions and connectors, such as 'and,' 'or,' 'also' between the phrases. FIG. 8A illustrates how an utterance "houses in Ballard under 600 k last summer" is understood in the context of the previous utterance "houses in Ballard." When the system receives an utterance $U_n$ (800), which in this example is the utterance "houses in Ballard," the system computes forward-looking centers and initializes backward-looking centers (for utterance $U_{n+1}$) in step 802, using the methodology described above in reference to FIG. 5 (step 502), in accordance with some implementations. For the example utterance, the system computes the set of conversation centers to be {houses, ballard}. In some implementations, the system applies (806) filters to the dataset based on the set of conversation centers (804) and displays a data visualization (808). In this example, the system applies categorical and spatial filters showing houses in Ballard.

Figure 8B:
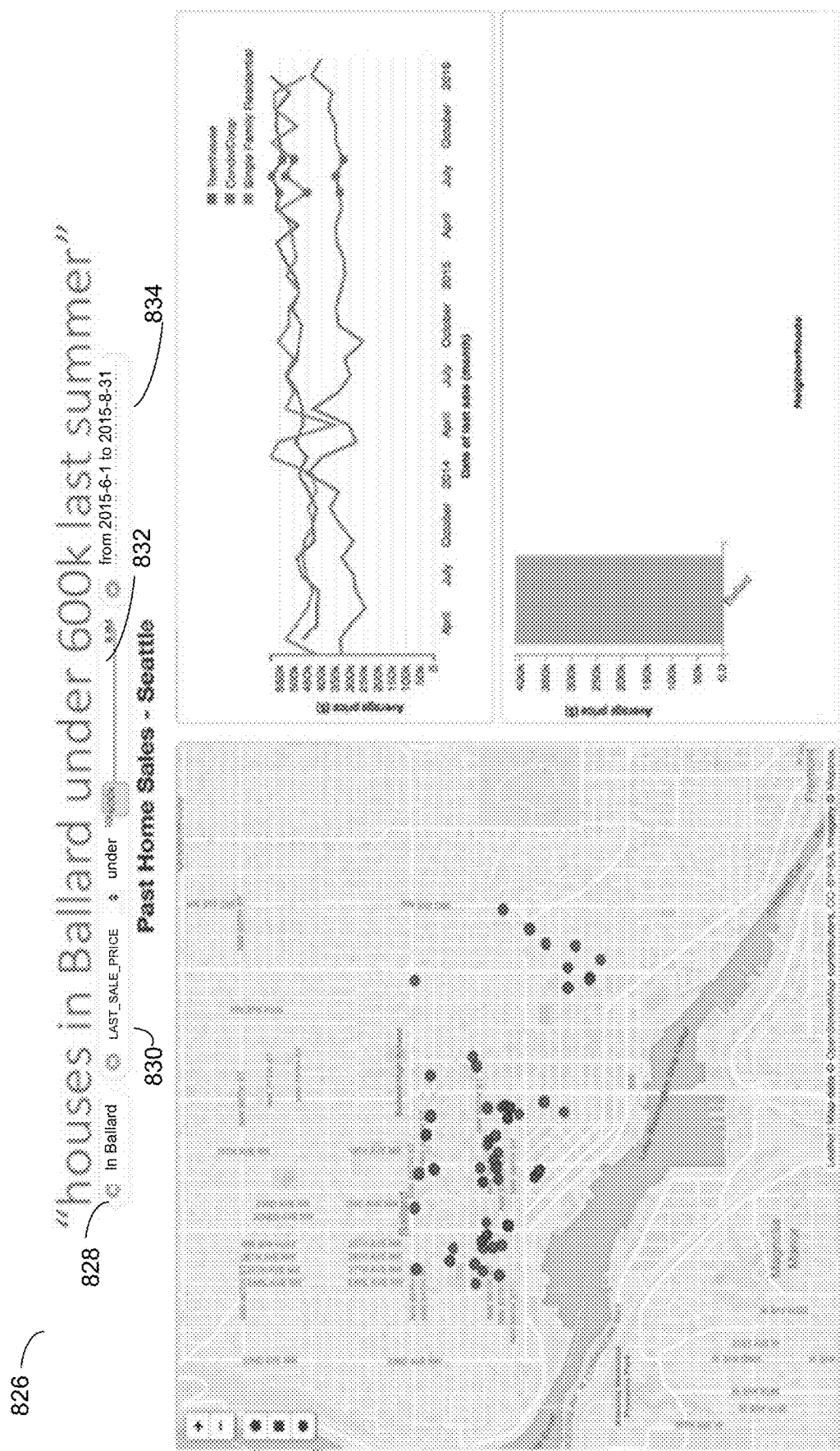
FIG. 8B illustrates a graphical user interface (that relates to FIG. 8A) for interactive data analysis using natural language processing in a data visualization application according to some implementations.

When the system receives an utterance $U_{n+1}$ (810), which in this example is the utterance "houses in Ballard under 600 k last summer," the system computes (812) phrase structure for the utterance $U_{n+1}$ (810) using techniques described above in reference to step 522 (FIG. 5), in accordance with some implementations. As mentioned above, a compound query consists of multiple (sometimes implicit) conjuncts between constituent phrases. Based on the phrase structure (814), the system identifies (816) conjuncts in the utterance $U_{n+1}$ (810), in accordance with some implementations. In this example, the system identifies multiple queries (818) viz., "houses," "in Ballard," "under 600 k," and "last summer." Based on these queries (818) and the set of backward-looking conversation centers (804), the system computes (820) a set of forward-looking conversation centers (822), in accordance with some implementations. For example, the system selects matching context from utterance $U_n$ (800) and adds the new conversation centers derived from the conjuncts from utterance $U_{n+1}$ (810). The set of forward-looking conversation centers (822) for this example is the set {houses, ballard, <600 k, last summer}. Based on this set, the system takes necessary steps to refine the current visualization in step 824, in accordance with some implementations. For this example, the system applies a numerical filter on house price and a temporal filter to show the past summer, to show the visualization in 826. FIG. 8B shows an enlarged version of the visualization 826. As shown in FIG. 8B, the utterance "houses in Ballard under 600 k last summer" results in the system showing a visualization of "Past Home Sales—Seattle" in Ballard (828), with LAST_SALE_PRICE (830), under 600 k (832), last summer. For this example, the system further resolves the period (for "last summer"), based on the previous visualization, as the time period 2015-6 to 2015-8-31 (834), in accordance with some implementations.

Figure 8C:
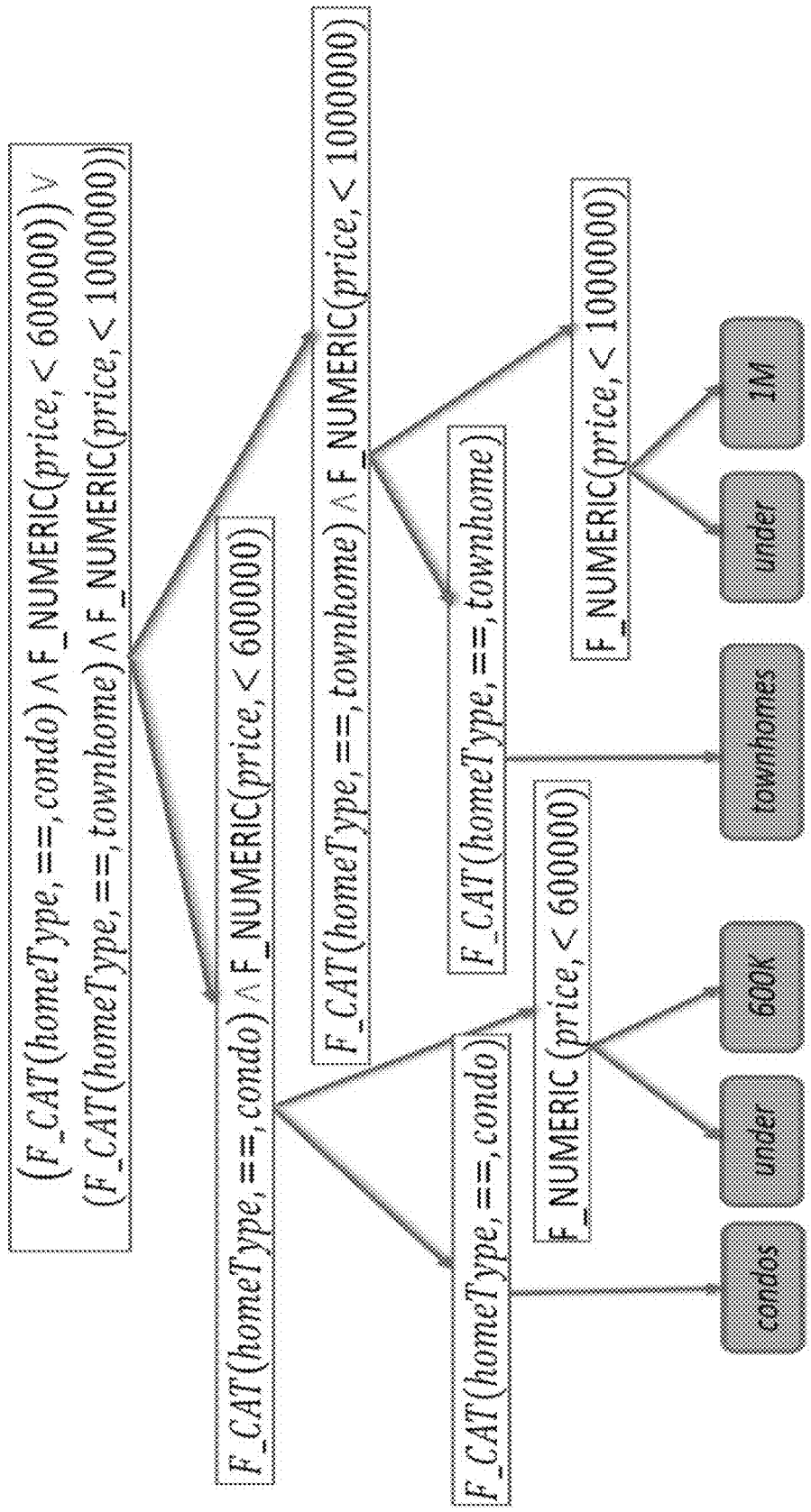
FIG. 8C illustrates how a system iteratively connects the analytical functions of adjacent nodes in a parse tree by linearization, in accordance with some implementations.

FIG. 8C illustrates how a system iteratively connects the analytical functions of adjacent nodes in a parse tree by linearization, in accordance with some implementations. Finding implicit data coherence among conjuncts is sometimes a challenging task. In the example shown in FIG. 8B, all the conjuncts refer to the same entity "houses in Ballard." However, there are cases where conjuncts map to different entities. An example utterance is "houses in Ballard under 600 k condos in South Lake Union." The system determines whether individual conjuncts resolve to the same or different entities, in accordance with some implementations. In some such implementations, the system employs a rule-based technique that takes a potentially long utterance with possibly implicit conjunctions, translating the utterance into a set of analytical functions chained together by logical operators. The system then executes these analytical functions in response to the user utterance, in accordance with some implementations.

In some implementations, the system resolves multiple conjuncts within compound utterances to invoke one or more corresponding analytical functions through a process of linearization. In some such implementations, an analytical function F(X, op, v) consists of a variable X (e.g., an attribute), an operator op, and a value v. Each attribute is either categorical or ordered. The ordered data type is further categorized into ordinal and quantitative. The linearization process considers the types of attributes and operators to combine analytical functions using the logical operator AND (represented as "$\wedge$") and the logical operator OR (represented as "$\vee$").

Applying the $\wedge$ operator: When two or more adjacent conjuncts share an attribute and that attribute's data type is categorical, the system connects these conjuncts by $\wedge$, in accordance with some implementations. Similarly, when the shared attribute is ordered and the function's operator is ==, the system applies $\vee$, in accordance with some implementations. In such cases, $\vee$ is logically more appropriate as a choice because applying $\wedge$ would not match to any item in the data table. For example, if the utterance is "show me condos and townhomes," then the system generates the following combination of analytical functions: (F_CAT(homeType, ==, condo) $\vee$ F_CAT(homeType, ==, townhome)), in accordance with some implementations. In this example, both 'condo' and 'town-home' belong to the same categorical attribute (e.g., homeType). Because a particular house (item) cannot be both 'condo' and 'townhome' at the same time, applying the $\vee$ operator is logically more appropriate than applying the $\wedge$ operator. Similarly, if the user utters "2 3 bedroom houses," the system generates (F_ORDINAL(bed, ==, 2) $\vee$ F_ORDINAL(bed, ==, 3)), in accordance with some implementations. The $\vee$ operator is also appropriate if the attribute type is ordered and involves the condition $X<_{v1}$ and $X>_{v2}$, where $_{v1}<_{v2}$. For instance, if the utterance is "before 2013 and after 2014," then the V operator will be used between the two conjuncts, in accordance with some implementations. Again, in this instance, applying the $\wedge$ operator would result in matching no item in the data table.

Applying the $\wedge$ operator: The $\wedge$ operator is appropriate if attribute type is ordered and involves the condition $X>v_1$ and $X<v_2$, where $v_1<v_2$. For example, "houses over 400 k and under 700 k" resolves to (F_NUMERIC(price, >, 4000000)$\wedge$F NUMERIC(price, <, 700000)). "Beds between 2 to 4" resolves to (F_ORDINAL(beds, >=, 2)$\wedge$F NUMERIC(beds, <=, 4)). Notice that applying $\vee$ operator would result in matching to all items in the data table. In some implementations, the $\wedge$ operator is also applied when there is no common attribute between two conjuncts. For example, the utterance "price under 600 k with 2 beds" resolves to (F_ORDINAL(beds, ==, 2)$\wedge$ F_NUMERIC (price, <=, 600000)).

In order to generate the analytical function representation of the whole utterance, the system traverses a corresponding parse tree for the utterance generated by a parser (e.g., the parser described above in reference to FIG. 5) in post-order and applies the above two rules iteratively on the phrases as illustrated in FIG. 8C. For the example shown in FIG. 8C, the system takes the utterance "condos under 600K townhomes under 1M" as input, and iteratively applies the above rules to generate the chain of analytical functions.

Figure 9A:
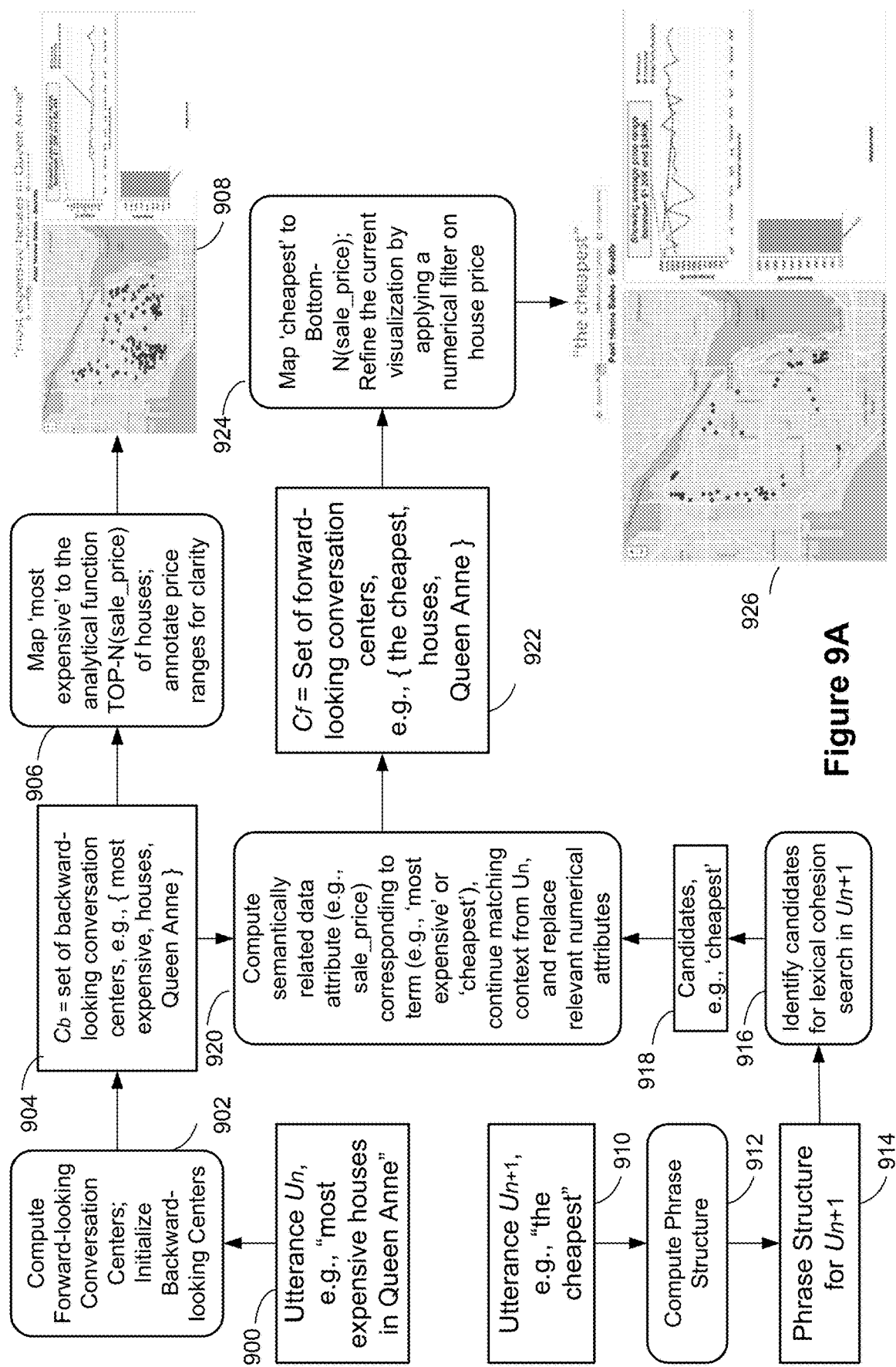
FIG. 9A is a diagram illustrating the application of pragmatics principles for handling lexical cohesion according to some implementations.

FIG. 9A is a diagram illustrating the application of pragmatics principles for handling lexical cohesion according to some implementations. The previous three types of pragmatics—ellipsis, referencing, and conjunction, provide grammatical cohesion to the conversation. In addition to these grammatical constructs, users often find ways for expressing concepts through related word meanings (e.g., senses in conversation), a term called lexical cohesion. These word senses can be as simple as spelling, stemming and plurality variations (e.g., 'profit' and 'profits'), synonyms (e.g., 'country' and 'nation'), to related or co-occurring terms (e.g., 'violence' and 'crime'). Often word senses are related to each other within a semantic context.

Figure 9B:
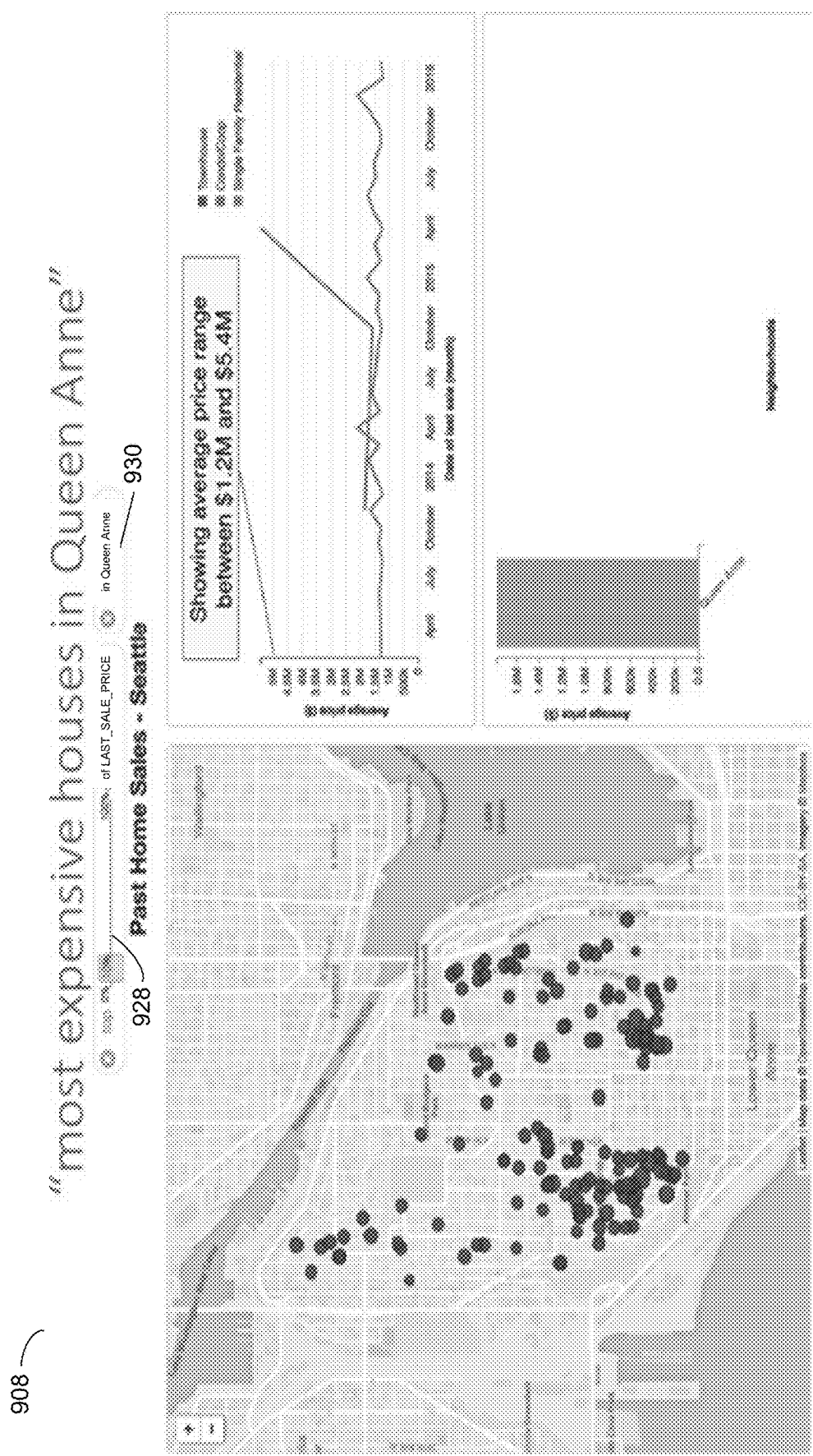
FIGS. 9B-9D illustrate graphical user interfaces (that relate to FIG. 9A) for interactive data analysis using natural language processing in a data visualization application according to some implementations.

FIG. 9A illustrates how an utterance "the cheapest" is understood in the context of the previous utterance "most expensive houses in Queen Anne." When the system receives an utterance $U_n$ (900), which in this example is the utterance "most expensive houses in Queen Anne," the system computes forward-looking centers and initializes backward-looking centers (for utterance $U_{n+1}$) in step 902, using the methodology described above in reference to FIG. 5 (step 502), in accordance with some implementations. For the example utterance, the system computes the set of conversation centers to be {most expensive, houses, Queen Anne}. In some implementations, the system maps (906) one or more conversation centers to a corresponding analytical function for generating a data visualization (908), in accordance with some implementations. In the example shown, the system maps "most expensive" to the analytical function TOP_N(sale_price) of houses. Some implementations also annotate price range for clarity. In this example, the system applies categorical and spatial filters showing houses in Ballard. FIG. 9B shows an enlarged version of the visualization 908. As shown in FIG. 9B, the utterance "most expensive houses in Queen Anne" results in the system showing a visualization of "Past Home Sales—Seattle" that comprises the top 10% of LAST_SALE_PRICE (928) in Queen Anne (930), in accordance with some implementations.

When the system receives an utterance $U_{n+1}$ (910), which in this example is the utterance "the cheapest," the system computes (912) phrase structure for the utterance $U_{n+1}$ (914)

using techniques described above in reference to step 522 (FIG. 5), in accordance with some implementations. As mentioned above, a user utterance sometimes has word senses that are better understood in the context of previous utterances. Based on the phrase structure (914), the system identifies (916) candidates for lexical cohesion in the utterance $U_{n+1}$ (910), in accordance with some implementations. In this example, the system identifies a candidate "cheapest" (918) for cohesion analysis. Based on the identified one or more cohesion candidates (918) and the set of backward-looking conversation centers (904), the system computes (920) a set of forward-looking conversation centers (922), in accordance with some implementations. For the example shown, the system computes semantically related data attribute (e.g., sale_price) corresponding to the lexical cohesion candidates (e.g., 'most expensive' or 'cheapest'), replacing relevant numerical attributes, while continuing the rest of the context from utterance $U_n$ (904), in accordance with some implementations.

In some implementations, the system identifies attribute word senses by employing the Word2vec™ model containing learned vector representations of large text corpora, computing word vectors using a recurrent neural network. In some implementations, the semantic relatedness $S_{rel}$ between a word $w_i$ in a given utterance and a data attribute $d_j$, is the maximum value of a score computed as follows:

$$S_{rel}(w_i, d_j) = \max_{m,n} \lambda \cos(v_{w_i}, v_{d_l}) + (1-\lambda)\frac{1}{\text{dist}(S_{i,m}, S_{j,n})} \quad (1)$$

In formula (1), $\text{dist}(S_{i,m}, S_{j,n})$ is the Wu-Palmer distance between the two senses $S_{i,m}$ and $S_{j,n}$. $v_{wi}$ and $v_{dj}$ are the vector representations of $w_i$ and $d_j$, respectively. $\lambda$ is a weighting factor applied to a pairwise cosine distance between the vectors.

The Word2vec™ model is used here only as an example. A number of other neural network models can be used to identify word senses, such as Stanford University's GloVe™. Some libraries, such as GenSim™ and Deeplearning4j™, provide a choice of different word embedding models in a single package.

Figure 9C:
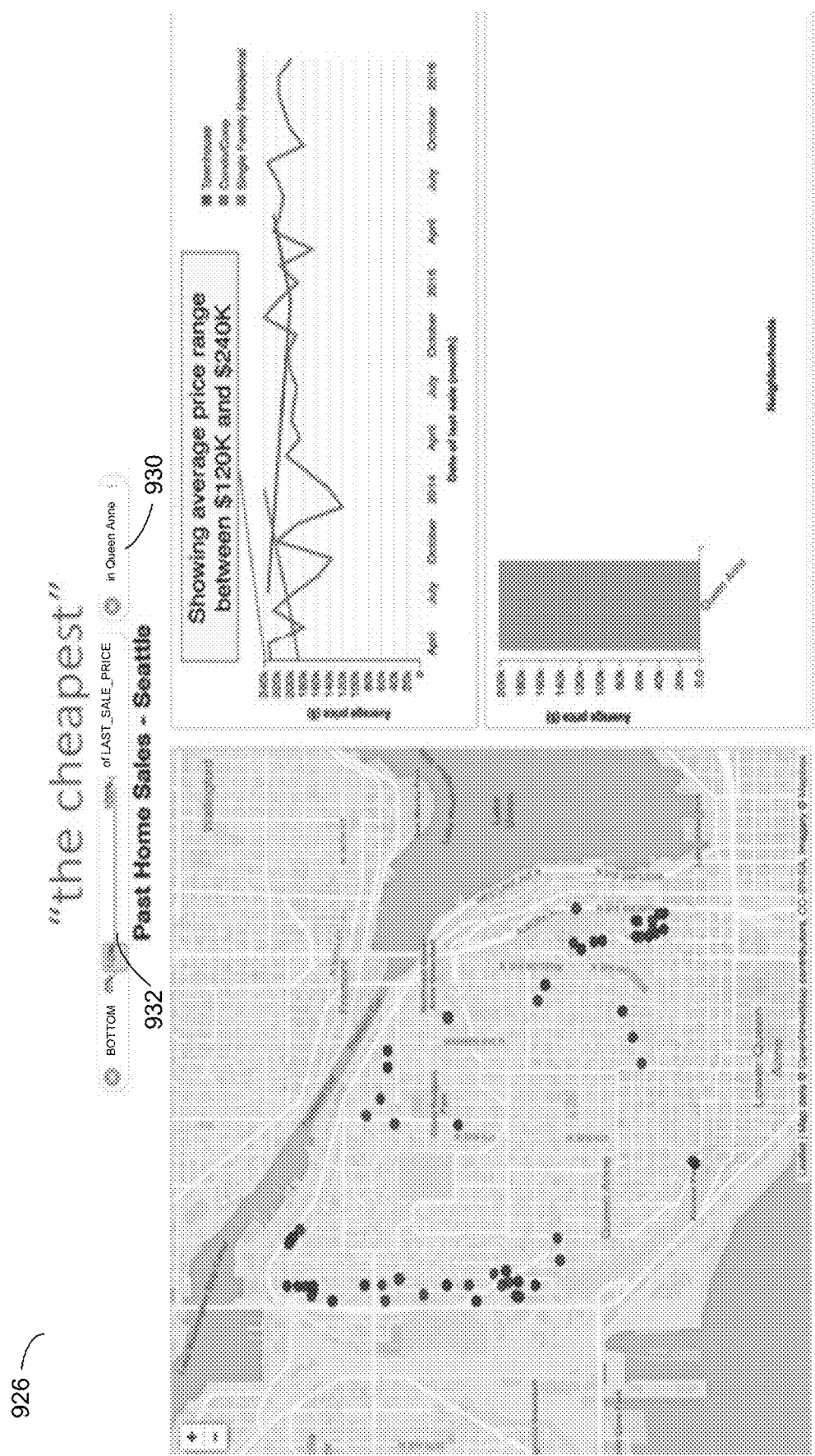
Figure 9D:
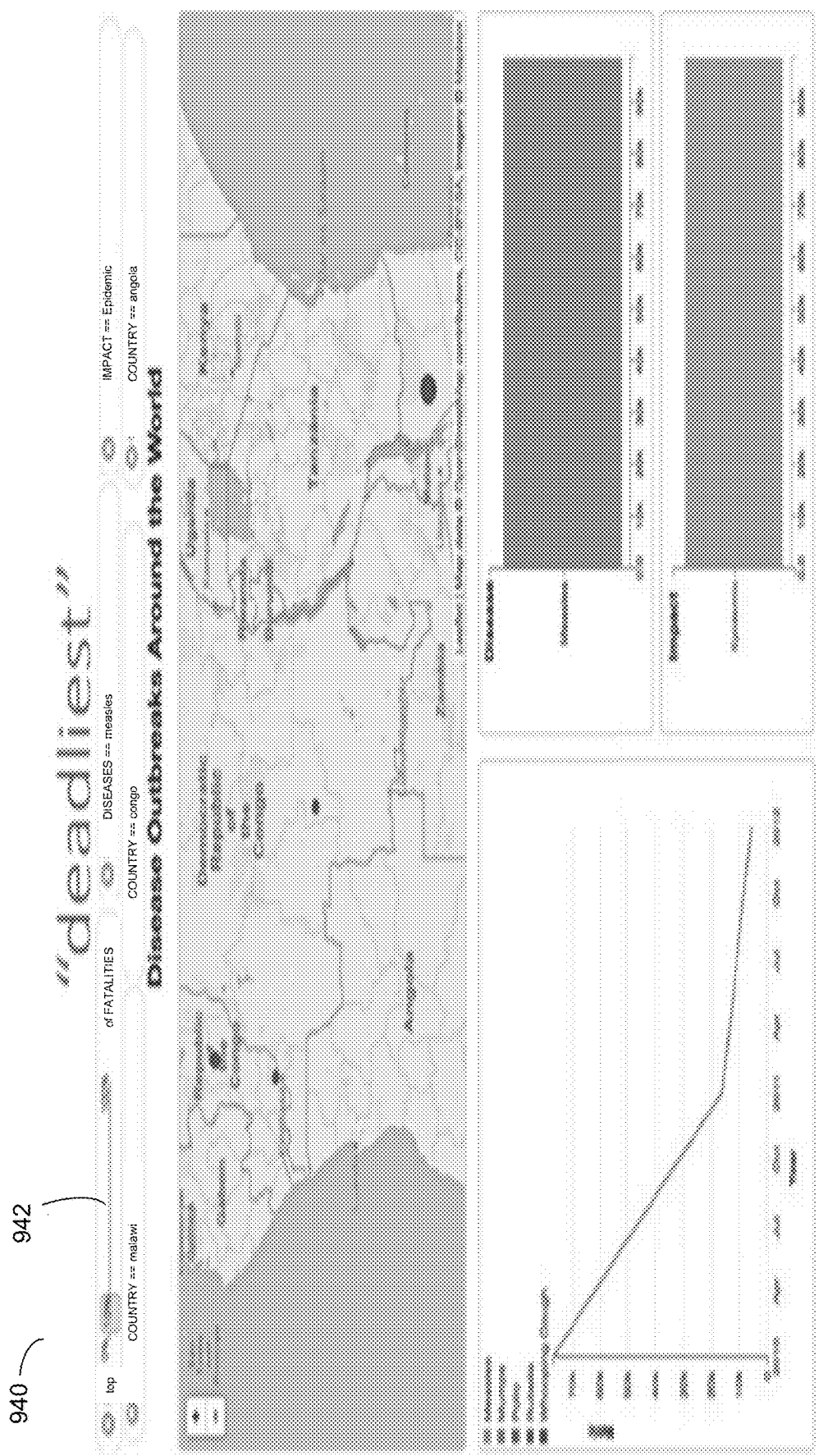

In some implementations, the system not only computes semantic relatedness between terms and data attributes, but also computes the type of analytical function associated with each term. For example, the system performs the additional steps for queries "show me the cheapest houses near Ballard" or "where are the mansions in South Lake Union?" The system considers the corresponding dictionary definitions as additional features to these word vectors and checks if the definitions contain quantitative adjectives such as 'less,' 'more,' 'low,' 'high' using a POS tagger, in accordance with some implementations. The system then maps appropriate analytical functions to these adjectives, in accordance with some implementations. FIG. 9B illustrates an example where the phrase "most expensive" is mapped to Top-N(sale price). FIG. 9C illustrates another example where the term "cheapest" is mapped to Bottom-N(sale price). FIG. 9D, similarly, illustrates a visualization (940) wherein the term "deadliest" is mapped to the Top-N values of the attribute "fatalities" (942).

Referring back to FIG. 9A, for the running example, the system computes the set of forward-looking conversation centers (922) to be {the cheapest, houses, Queen Anne}, in accordance with some implementations. Based on this set, the system takes necessary steps to refine the current visualization in step 924 to generate an update visualization (926), in accordance with some implementations. For this example, the system maps "cheapest" to Bottom-N(sale_price), refines the current visualization by applying a numerical filter on house price. FIG. 9C shows an enlarged version of the visualization 926. As shown in FIG. 9C, the utterance "the cheapest" results in the system showing a visualization of "Past Home Sales—Seattle" (926), with bottom 10% of LAST_SALE_PRICE (932), in Queen Anne (930), in accordance with some implementations.

Figure 10A:
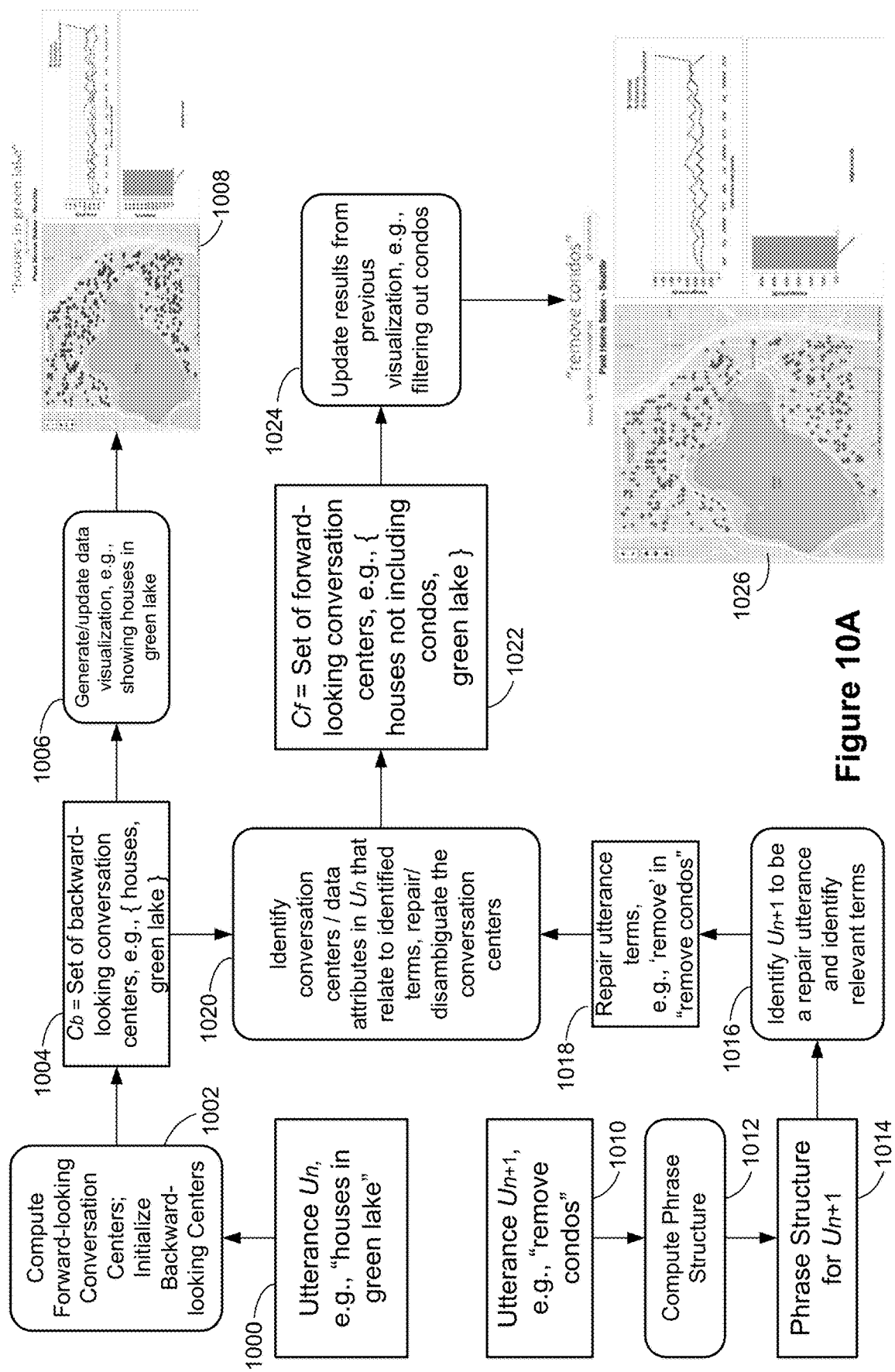
FIG. 10A is a diagram illustrating the application of pragmatics principles for repair utterances according to some implementations.

FIG. 10A is a diagram illustrating the application of pragmatics principles for repair utterances according to some implementations. In the course of a conversation, it is typical for users to correct or clarify a previous utterance. In some implementations, the system supports the use of follow-up repair utterances to modify or 'repair' a potentially ambiguous utterance or to change the default behavior of how the results are presented to the user. For instance, to update the default behavior of the system, such as highlighting for selection, a user can use utterances like "no, filter instead." As another example, to update data attributes, a user can use utterances like "get rid of condo" or "change from condo to townhomes" as shown in FIG. 7.

Figure 10B:
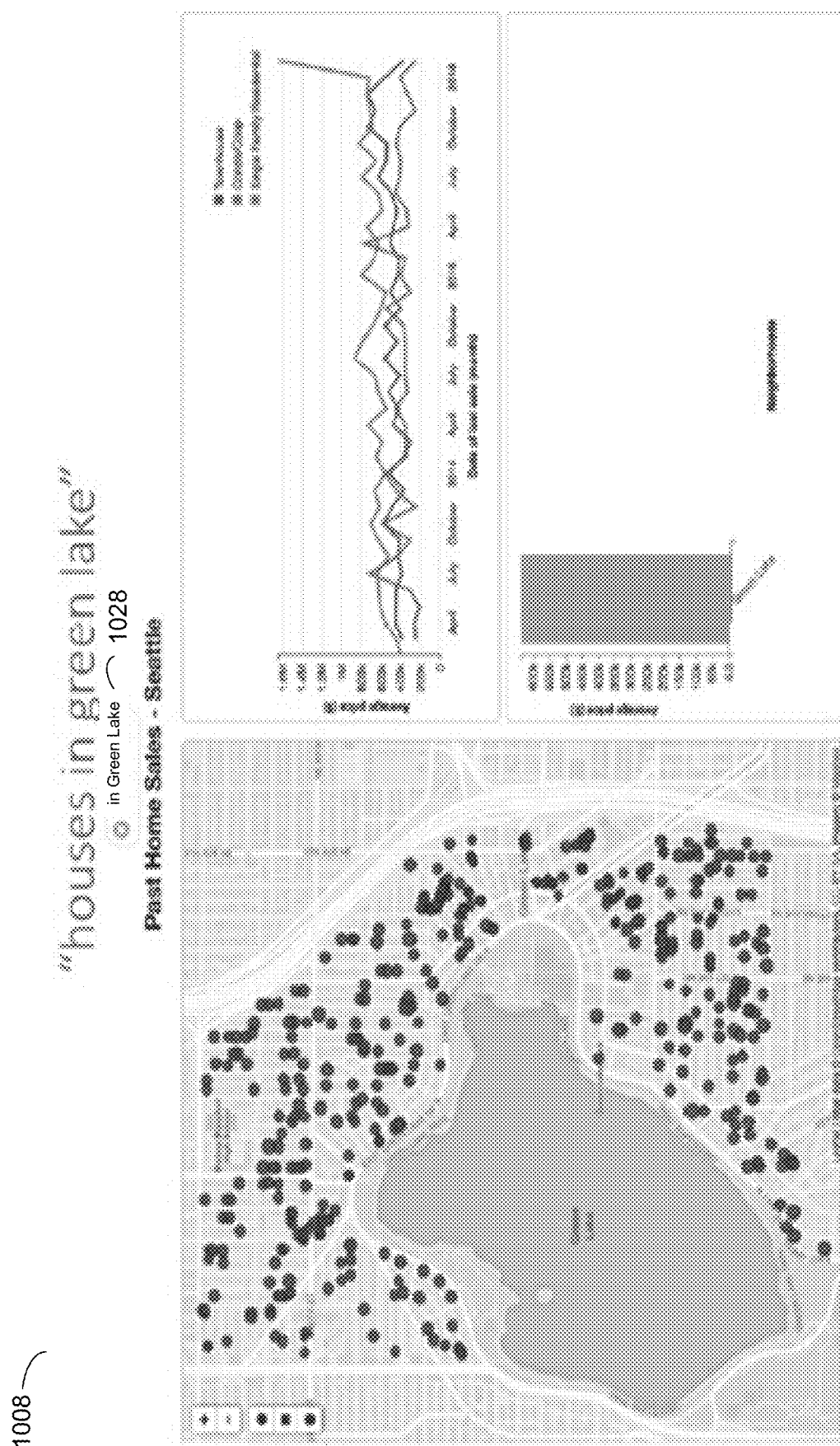
FIGS. 10B-10C illustrate graphical user interfaces (that relate to FIG. 10A) for interactive data analysis using natural language processing in a data visualization application according to some implementations.
Figure 10C:

FIG. 10A illustrates how an utterance "remove condos" is understood in the context of the previous utterance "houses in green lake." When the system receives an utterance $U_n$ (1000), which in this example is the utterance "houses in green lake," the system computes forward-looking centers and initializes backward-looking centers (for utterance $U_{n+1}$) in step 1002, using the methodology described above in reference to FIG. 5 (step 502), in accordance with some implementations. For the example utterance, the system computes the set of conversation centers to be {houses, green lake}. The system generates or updates (1006) a data visualization (1008) based on the computed set of conversation centers (1004), in accordance with some implementations. In some implementations, the system applies filters to the dataset based on the set of conversation centers (1004) and displays a data visualization (1008). In this example, the system applies categorical and spatial filters showing houses in Green Lake. FIG. 10B shows an enlarged version of the visualization 1008. As shown in FIG. 10B, the utterance "houses in green lake" results in the system showing a visualization of "Past Home Sales—Seattle" in Green Lake (1028), When the system receives an utterance $U_{n+1}$ (1010), which in this example is the utterance "remove condos," the system computes (1012) phrase structure for the utterance $U_{n+1}$ (1010) using techniques described above in reference to step 522 (FIG. 5), in accordance with some implementations. As mentioned above, a repair utterance corrects or clarifies a previous utterance. Based on the phrase structure (1014), the system identifies (1016) utterance $U_{n+1}$ (1010) to be a repair utterance and then identifies the relevant repair terms (1018) within the utterance, in accordance with some implementations. In this example, the system identifies a repair term "remove" within the utterance "remove condos." Based on the set of one or more repair utterances and repair terms (1018), the system computes (1020) a set of forward-looking conversation centers (1022), in accordance with some implementations. For example, the system identifies conversation centers and/or data attributes in the previous utterance that related to the identified one or more repair terms, in accordance with some implementations. In some implementations, as illustrated in FIG. 10A, the system repairs or disambiguates the conversation centers based on the repair terms (1018). The set of forward-looking conversation centers (1022) for this example is the set {houses not including condos, green lake}. Based on this set, the system takes necessary steps (1024) to update results from previous visualization, in accordance with some implementations. For this example, the system filters out condos to show the visualization in 1026. FIG. 10C shows an enlarged version of the visualization 1026. As shown in FIG. 10C, the utterance "remove condos" results in the system showing a visualization of "Past Home Sales—Seattle" in Green Lake (1028), filtering out HOME_TYPE=Condo/Coop (1030).

Figure 11A:
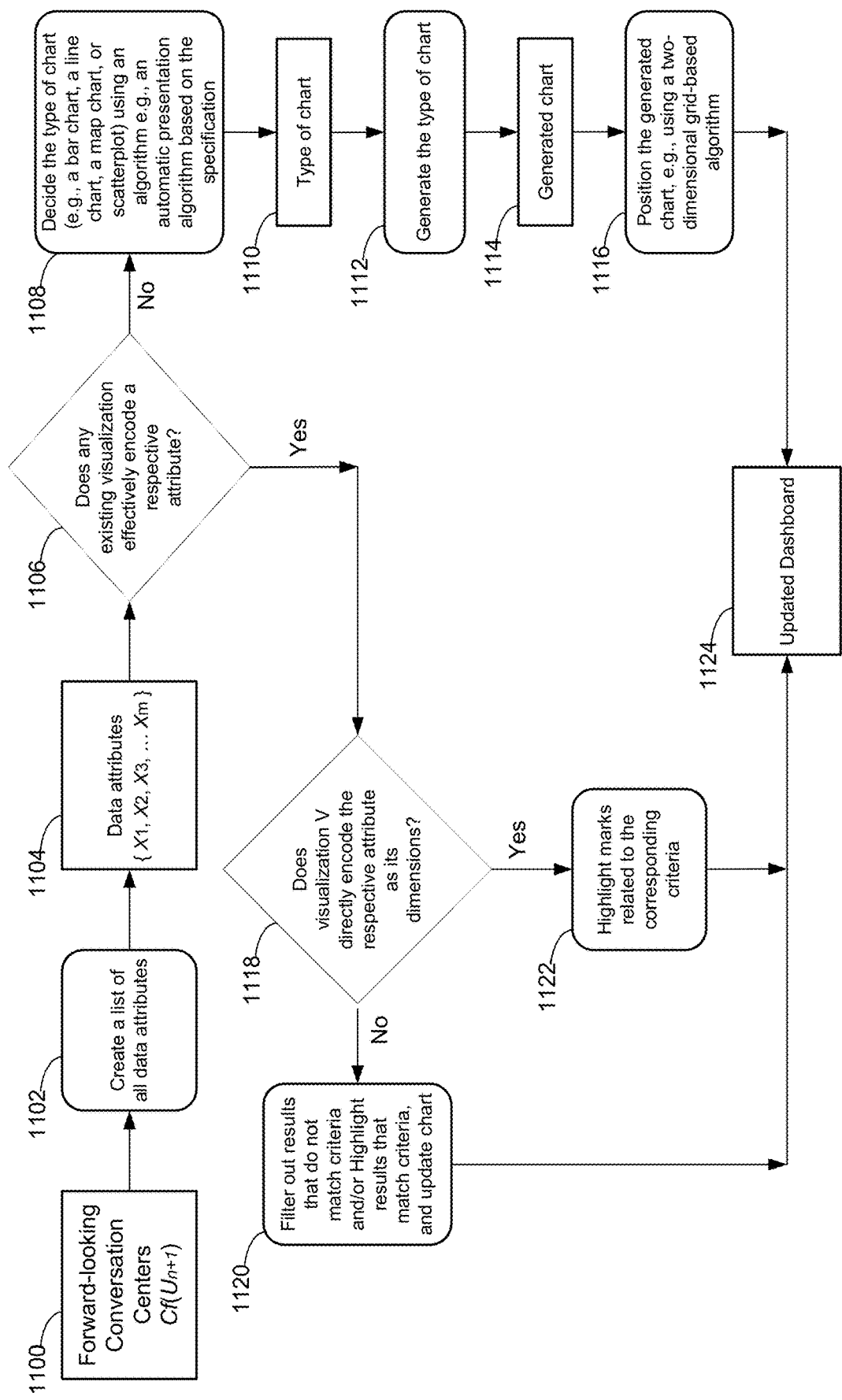
FIG. 11A is a diagram illustrating the application of pragmatics principles for handling responses and feedback according to some implementations.

FIG. 11A is a diagram illustrating the application of pragmatics principles for handling responses and feedback according to some implementations. A general framework for the application of principles of pragmatics for visual analytics is first described herein to provide context. The framework utilizes and extends a model commonly used for discourse structure called conversational centering, in accordance with some implementations. In this model, utterances are divided into constituent discourse segments, embedding relationships that may hold between two segments. A center refers to those entities serving to link that utterance to other utterances in the discourse. Consider a discourse segment DS with utterances $U_1, \ldots, U_m$. Each utterance $U_n$ ($1 \leq n < m$) in DS is assigned a set of forward-looking centers, $C_f(U_n, DS)$ referring to the current focus of the conversation; each utterance other than the segment's initial utterance, is assigned a set of backward-looking centers, $C_b(U_n, DS)$. The set of backward-looking centers of a new utterance $U_{n+1}$ is $C_b(U_{n+1}, DS)$, which is equal to the forward-looking centers of $U_n$ (i.e., $C_f(U_n, DS)$). In the context of visual analytic conversations, forward and backward-looking centers include data attributes and values, visual properties, and analytical actions (e.g., filter, highlight).

Given an utterance $U_n$, a system implementing this framework responds by executing a series of analytical functions derived from the forward-looking centers $C_f(U_n, DS)$. An analytical function F(X, op, v) consists of a variable X (which can be an attribute or a visualization property), an operator op, and a value v (typically a constant). For example, when the user says "measles in the uk," the system creates two functions namely F_CAT(diseases, ==, measles) and F_CAT(country, ==, uk). When the user provides a new utterance $U_{n+1}$, the system first creates a set of temporary centers $C_{temp}(U_{n+1}, DS)$ from $U_{n+1}$ without considering any previous context. The system then applies a set of rules to create a set of forward-looking centers, $C_f(U_{n+1}, DS)$ based on some set operations between $C_b(U_{n+1}, DS)$ and $C_{temp}(U_{n+1}, DS)$. The forward-looking centers are then used to respond to the user utterance according to some implementations.

To support a conversation, the visualizations shown by the system provide cohesive and relevant responses to various utterances. Sometimes, the system responds by changing the visual encoding of existing visualizations, while in other cases the system creates a new chart to support the visual analytical conversation more effectively. In addition to appropriate visualization responses, the system helps the user understand how the system has interpreted an utterance by producing appropriate feedback and allows the user to rectify the interpretation through some interface controls as necessary. In a traditional dashboard, users interact by selecting items or attributes in a visualization that are highlighted to provide immediate visual feedback. Simultaneously, other charts are updated by highlighting or filtering out items. In a natural language interface, however, instead of making explicit selection by mouse/keyboard, the user mentions different attributes and values, making it a non-trivial task of deciding how each view within a dashboard should respond to the utterance. Another complication arises when the system has to support multiple visualizations.

FIG. 11A shows a methodology for generating responses according to some implementations. To decide how the views (V) in a dashboard should respond to the utterance, a system according to some implementations proceeds as follows. The system computes a set of forward-looking conversation centers (1100) $C_f(U_{n+1})$ corresponding to the utterance $U_{n+1}$ based on conversation centers of a previous utterance $U_{n+1}$ and a set of temporary conversation centers computed using just the current context/utterance. The system creates (1102) a list of all data attributes (1104). Then the system determines (1106), for example by invoking a visualization manager, if any of the existing visualizations encode a respective attribute in the list of data attributes (1104). Next, the system determines (1118), if a visualization (sometimes herein called a view) directly encodes (e.g., without using any aggregate functions, such as count or average) the respective attribute as its dimensions (e.g., as a feature of the visualization). If it turns out that the attribute is encoded by an existing visualization V (i.e., the condition checked in 1118 is true/yes), the system highlights (1122) marks related to criteria corresponding to the respective attribute for an updated dashboard (1124). If the system on the other hand determines that a selected visualization (shown as visualization V) does not directly encode the respective attribute, the system filters (1120) results that do not match criteria for an updated dashboard (1124), in accordance with some implementations. This is typically the case when a secondary chart applies further data transformations on the result set (e.g., using a line chart or bar chart). In some such implementations, the system further highlights one or more results that match criteria corresponding to the respective attribute for the updated dashboard (1124).

Figure 11B:
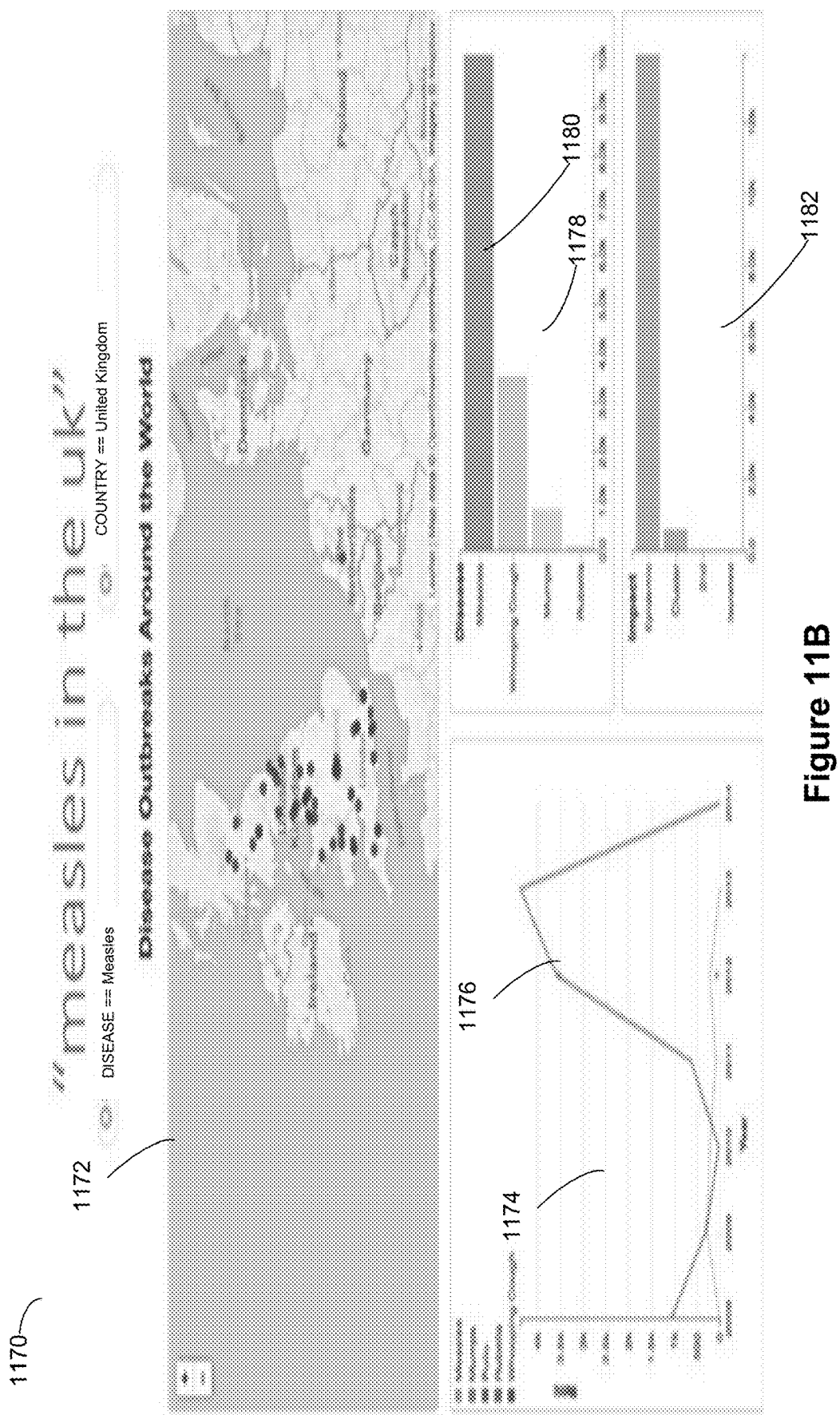
FIG. 11B is a data visualization that further illustrates the methodology shown in FIG. 11A.

FIG. 11B is an example visualization (1170) that further illustrates the methodology shown in FIG. 11A, in accordance with some implementations. The system highlights the items that match the criteria "measles in the uk" in the map chart (1172). The system also highlights the series (1176) in the line chart (1174) and highlights the bar (1180) in the bar chart (1178) representing 'measles.' However, the bar chart (1182) on impact cannot highlight any mark because it does not encode any attribute in the list of attributes (e.g., list $\{X_1, X_2, \ldots X_m\}$ (1104)). Therefore, the system filters out the results that do not match the criteria "measles in the uk" and updates the chart accordingly. It is noted that users can change the default behavior by explicitly expressing the choice about whether to filter vs. highlight (e.g., 'exclude,' 'remove,' 'filter only').

During visual analysis flow, there may be situations where the existing visualization cannot meet the evolving information needs of the user. This scenario could arise, for example, when a particular data attribute cannot be encoded effectively in the existing visualization (e.g., time values in a map), warranting the need for creating a new visualization as a response. Drawing inspiration from work that connects visualization with language specification, the system supports the creation of different types of visualizations (e.g., bar chart, line chart, map chart, and scatterplot), in accordance with some implementations.

Figure 11C:
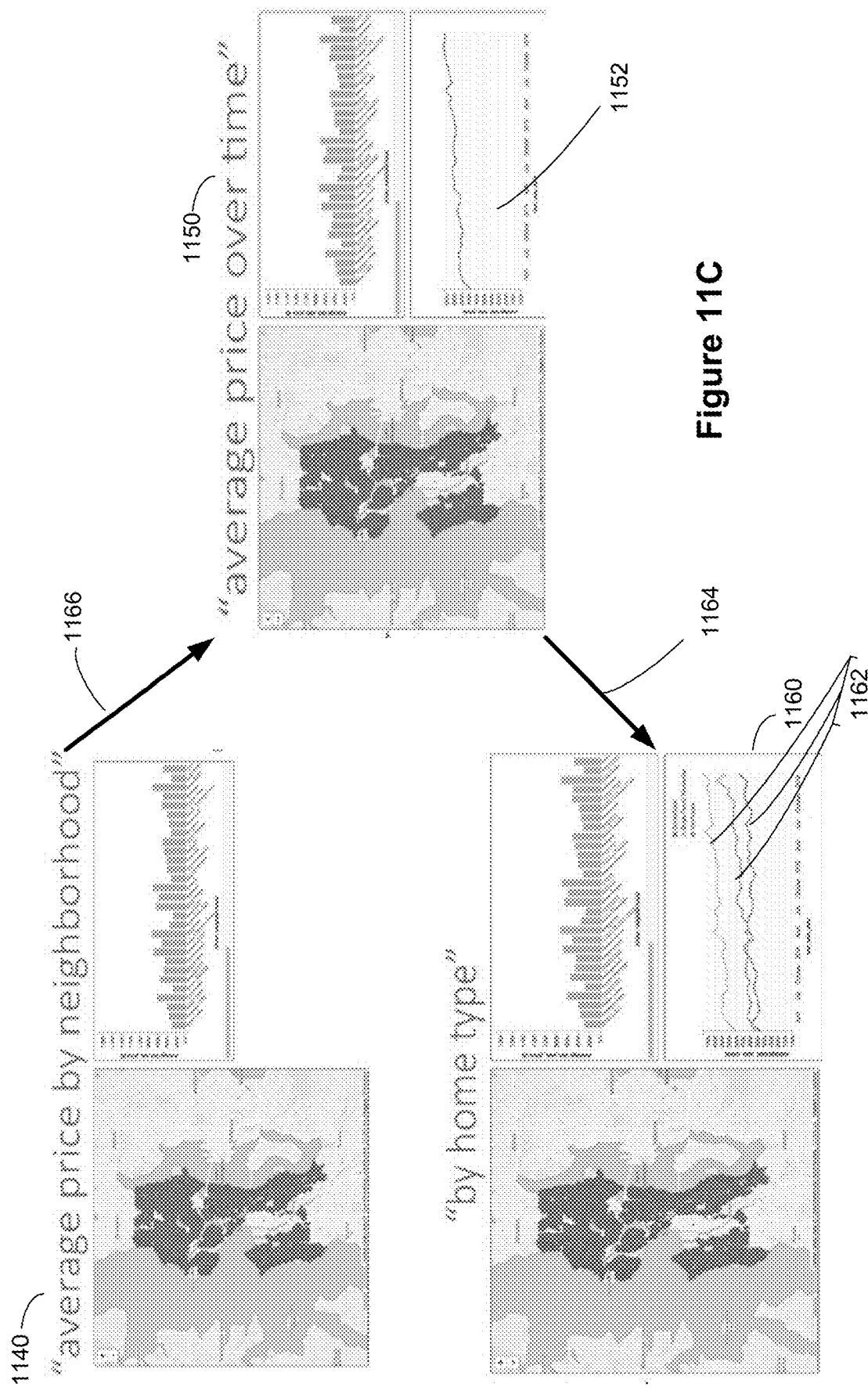
FIG. 11C shows how a dashboard is progressively constructed based on the input utterances, in accordance with some implementations.

FIG. 11C shows how a dashboard is progressively constructed based on the input utterances. The system generates visualization 1140 in response to the utterance "average price by neighborhood." When the user provides a next utterance "average price over time," the system responds by generating a line chart (1152) in the visualization (1150) that shows the time progression of the average price. Now, if the user next provides an utterance "by home type," the system enhances the line chart (1152) with lines (1162) corresponding to the different home types in the visualization (1160).

Referring back to FIG. 11A, the underlying algorithm for creating or changing an existing visualization works as follows. First, the system determines (1106) if the creation of a new visualization or change of an existing one is necessary. The system analyzes the attributes specified in the forward-looking centers $C_f(U_{n+1})$ (1100), and searches for any current visualization that encodes these data properties. If there is no match with the specification of existing visualizations, shown as the arrow 'No' next to the decision block 1106, the system generates a corresponding new specification consisting of attributes and aggregation types. In FIG. 11A, this is illustrated by the step 1108 that decides the type of chart (e.g., a bar chart, a map chart, or scatterplot) using an algorithm, in accordance with some implementations. In some such implementations, the system employs an automatic presentation algorithm to decide the type of chart generated based on this specification. In some such implementations, the system uses a simplified version of the automatic presentation algorithm described in *Show me: Automatic presentation for visual analysis*, by J. Mackinlay, P. Hanrahan, and C. Stole, which is incorporated herein by reference in its entirety. Once the type of chart (1110) is decided, the system generates (1112) the type of chart to obtain a generated chart (1114). The system then positions the new chart (1114), in accordance with some implementations. In some such implementations, the system uses a two-dimensional grid-based layout algorithm, automatically coordinating the presentation of the new chart (1114) with other views of the visualization. The updated dashboard (1124) responds to subsequent utterances through actions like highlighting or filtering.

It is further noted that, although not shown in FIG. 11A, the system repeats at least the steps 1106, 1118, 1120, 1122, 1108, 1112, and 1116 for each data attribute in the list of data attributes (1104), in accordance with some implementations.

FIG. 12A illustrates a set of widgets generated for handling ambiguity in a user query according to some implementations. A challenge for natural language understanding systems that support interactive dialog is determining the intent of the utterance. In some implementations, the system automatically resolves various forms of syntactic, lexical and semantic ambiguities. These resolutions are expressed in the form of widgets and feedback to help the user understand the system's intent and the provenance of how the utterance was interpreted. By manipulating these widgets and viewing the feedback of what results are shown in the visualization, the user can, for instance, instantiate a follow-up repair utterance to override or clarify the system decisions made.

In some implementations, the system identifies one or more widgets from the analytical functions derived from an utterance. In some such implementations, the system organizes and presents the widgets in an intuitive way so that the user can understand how the system interprets her utterance and subsequently modify the interpretation using these widgets. For this purpose, the system takes the original utterance and orders the widgets in the same sequence as the corresponding query terms. In some such implementations, the system achieves this by using a library, such as Sparklificator™, that facilitates the placement of small word-scale visualization within text in a compact way. In addition, some implementations provide a set of interfaces to users including the ability to manipulate and/or remove a widget, to modify the query, and to resolve ambiguous queries.

FIG. 12A shows how the system presents the widgets for the utterance "condo near Ballard under 1.2M," according to some implementations. In this example, the first term 'condo' was resolved to the widget representing the criteria 'HOME_TYPE equals Condo/coop' (1202). Then, the second widget conveys the fuzzy distance represented by 'near Ballard' (1204). Since 'under 1.2M' does not explicitly mention any attribute, the system determines whether the value 1200000 is within the range of minimum and maximum values of any numeric attribute in the data. If such an attribute exists (LAST_SALE_PRICE in this case), the system conveys that to the user (through the widget 1206), and then allows her to change the attribute using the drop-down menu (1208).

In addition to ambiguity handling, in some implementations, the system also provides feedback and meaningful hints to modify the text, when the system fails to completely understand the query. For instance, if the system cannot successfully parse the given utterance, the system first attempts to automatically correct the misspelled terms by comparing the tokens with the attributes, cell values, and related keywords in the current dataset using fuzzy string matching. When the user forms a query that is partially recognized, the system prunes the unrecognized terms from the corresponding parse tree and then shows the results based on the tokens that are understood. FIG. 12B shows different example situations and the corresponding feedback generated by the system, in accordance with some implementations.

FIGS. 13A-13J provide a flow diagram illustrating a method 1300 of using (1302) natural language for visual analysis of a dataset applying principles of pragmatics. The steps of the method 1300 may be performed by a computer (e.g., a computing device 200). In some implementations, the computer includes (1304) a display, one or more processors, and memory. FIGS. 13A-13J correspond to instructions stored in a computer memory or computer-readable storage medium (e.g., the memory 206 of the computing device 200). The memory stores (1306) one or more programs configured for execution by the one or more processors (e.g., the processor(s) 202). For example, the operations of the method 1300 are performed, at least in part, by a data visualization generation module 234 and/or a language processing module 238.

In some implementations, the computer displays (1308) a data visualization based on a dataset retrieved from a database using a first set of one or more queries. For example, referring to FIG. 1, a user may associate one or more data fields from a schema information region 110 with one or more shelves (e.g., the column shelf 120 and the row shelf 122, FIG. 1) in the data visualization region 112. In response to receiving the user associations, in some implementations, the computer retrieves data for the data fields from the dataset using a set of one or more queries and then displays a data visualization (e.g., the data visualization 408) in the data visualization region 112 that corresponds to the received user inputs. Displaying data visualizations is discussed in further detail above with reference to FIG. 1.

The computer receives (1310) a first user input to specify a first natural language command related to the displayed data visualization. In some implementations, the user input is received as text input (e.g., a via keyboard 216 or via touch sensitive display 214) from a user in a data-entry region on the display in proximity to the displayed data visualization. In some implementations, the user input is received as a voice command using a microphone (e.g., an audio input device 220) coupled to the computer. For example, referring to FIG. 4A, the displayed data visualization 408 concerns measles in the uk. Receiving inputs (e.g., commands/queries) from a user is discussed in further detail above with reference to FIG. 1.

Based on the displayed data visualization, the computer extracts (1312) a first set of one or more independent analytic phrases from the first natural language command. For example, referring to FIG. 4A, the first natural language command received by the computer reads, "measles in the uk." The data visualization displayed prior to receiving the first natural language command concerns disease outbreaks around the world. In some implementations, the computer extracts "measles" and "in the uk" from the first natural language command because these analytic phrases relate to the displayed data visualization. When the phrases have direct reference to data fields in the displayed data visualization, extraction (1312) is straight forward: collect all phrases that are direct references to data fields. In some implementations, the computer stems or removes stop words, filler words, or any predefined set of words from the incoming query, and extracts (1312) all other phrases from the first natural language command because they may be related to the displayed data visualization. Some implementations use this approach when the phrases in the natural language command have some indirect reference to the data fields in the displayed visualization.

The language processing module 238 computes (1314) a first set of one or more conversation centers associated with the first natural language command based on the first set of one or more analytic phrases, in accordance with some implementations. A framework based on a conversational interaction model is described above in reference to FIGS. 3A, 5, and 11. A center refers to those entities serving to link that utterance (sometimes herein called a natural language command) to other utterances in a discourse (a series of utterances). Conversation centers include data attributes and values, visual properties, and analytical actions. Computing conversation centers based on the analytic phrases includes mapping the analytic phrases to one or more conversation centers after necessary transformations and analysis. For the example utterance "measles in the uk," the language processing module 238 processes the phrase "measles" and analyzes the phrase to infer that it refers to the data attribute DISEASE as shown in FIG. 4D described above.

Subsequently, the language processing module 238 computes (1316) a first set of analytic functions associated with the first set of one or more conversation centers, thereby creating a first set of one or more functional phrases, in accordance with some implementations. As described above in reference to FIGS. 3A, 5, and 11, analytical functions each consist of a variable, an operator, and a value, according to some implementations. In some implementations, for the example utterance "measles in the uk," the language processing module 238 creates two functions, namely F_CAT (diseases, ==, measles) and F_CAT(country, ==, uk). In some implementations, as another example, for an utterance "condos under 600K," the language processing module 238 creates two functions F_CAT(homeType, ==condo) and F_NUMERIC(price, <, 600000). In both these examples, the language processing module 238 searches one or more data attributes related to the displayed data visualization that correspond to the first set of one or more conversation centers to identify a first set of data attributes, according to some implementations. The language processing module 238 also identifies, by examining the first set of one or more conversation centers, a first set of operators (e.g., operator ==, operator <) and a first set of values corresponding to the first set of data attributes, according to some implementations. With the first set of variables (attributes), and the corresponding first set of operators and first set of values, the language processing module 238 constructs the first set of one or more analytical functions, thereby creating the first set of one or more functional phrases.

In some implementations, the computer updates (1318) the data visualization based on the first set of one or more functional phrases computed in step 1316. As shown in FIG. 13I, in some implementations, the computer requeries (1372) the database using a second set of one or more queries based on the first set of one or more functional phrases, thereby retrieving a second dataset. In some instances, requerying the database is performed locally at the computing device using cached or stored data at the computing device. For example, requerying is commonly performed locally when the natural language command specifies one or more filters. In some such implementations, the computer updates (1374) the data visualization based on the second dataset. In some implementations, the computer further creates and displays (1376) a new data visualization (e.g., without updating the existing one or more data visualizations) using the second dataset.

Figure 13A:
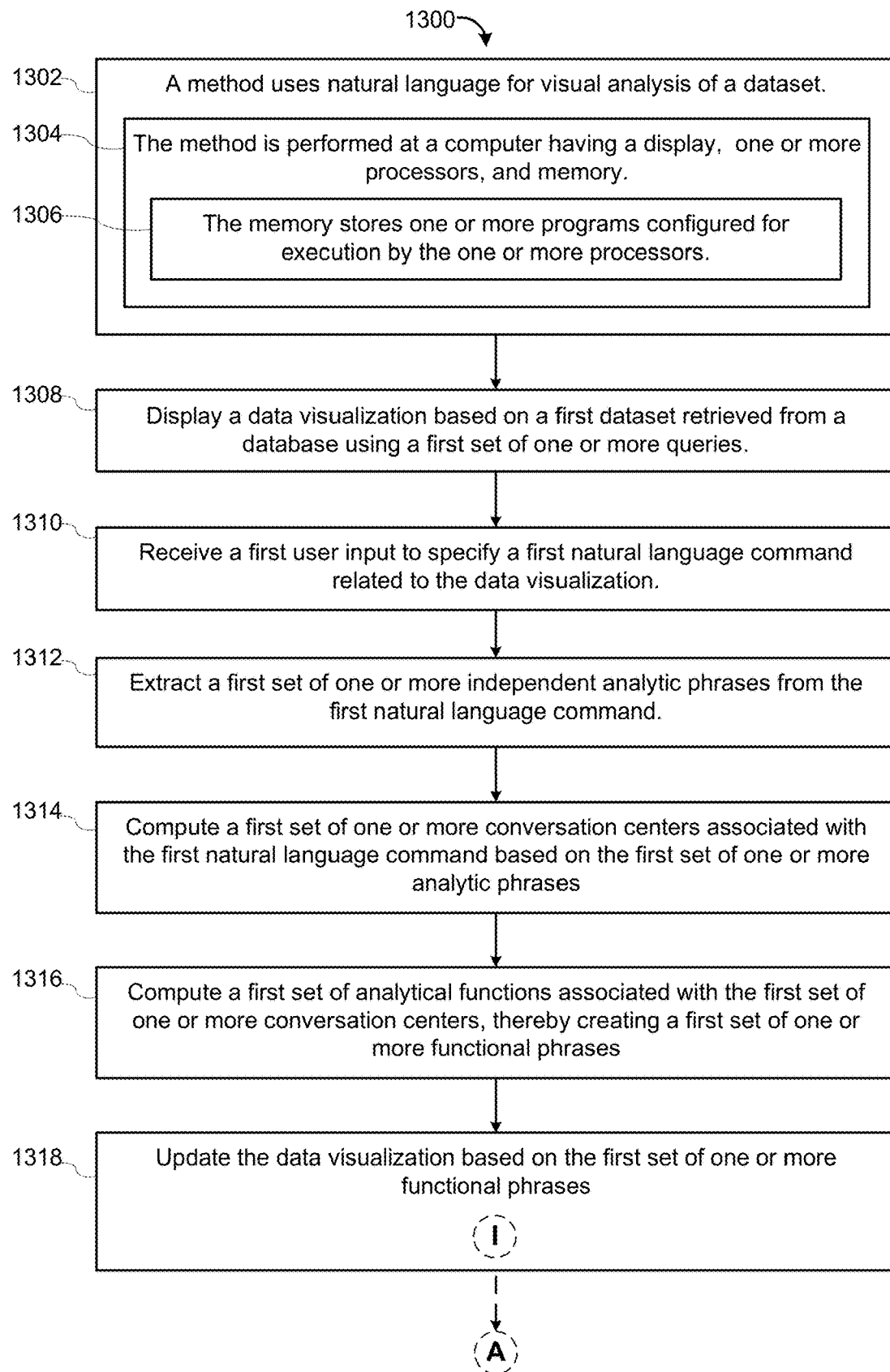
FIGS. 13A-13J provide a flowchart of a process that uses natural language for visual analysis of a dataset applying pragmatics principles, according to some implementations.
Figure 13B:
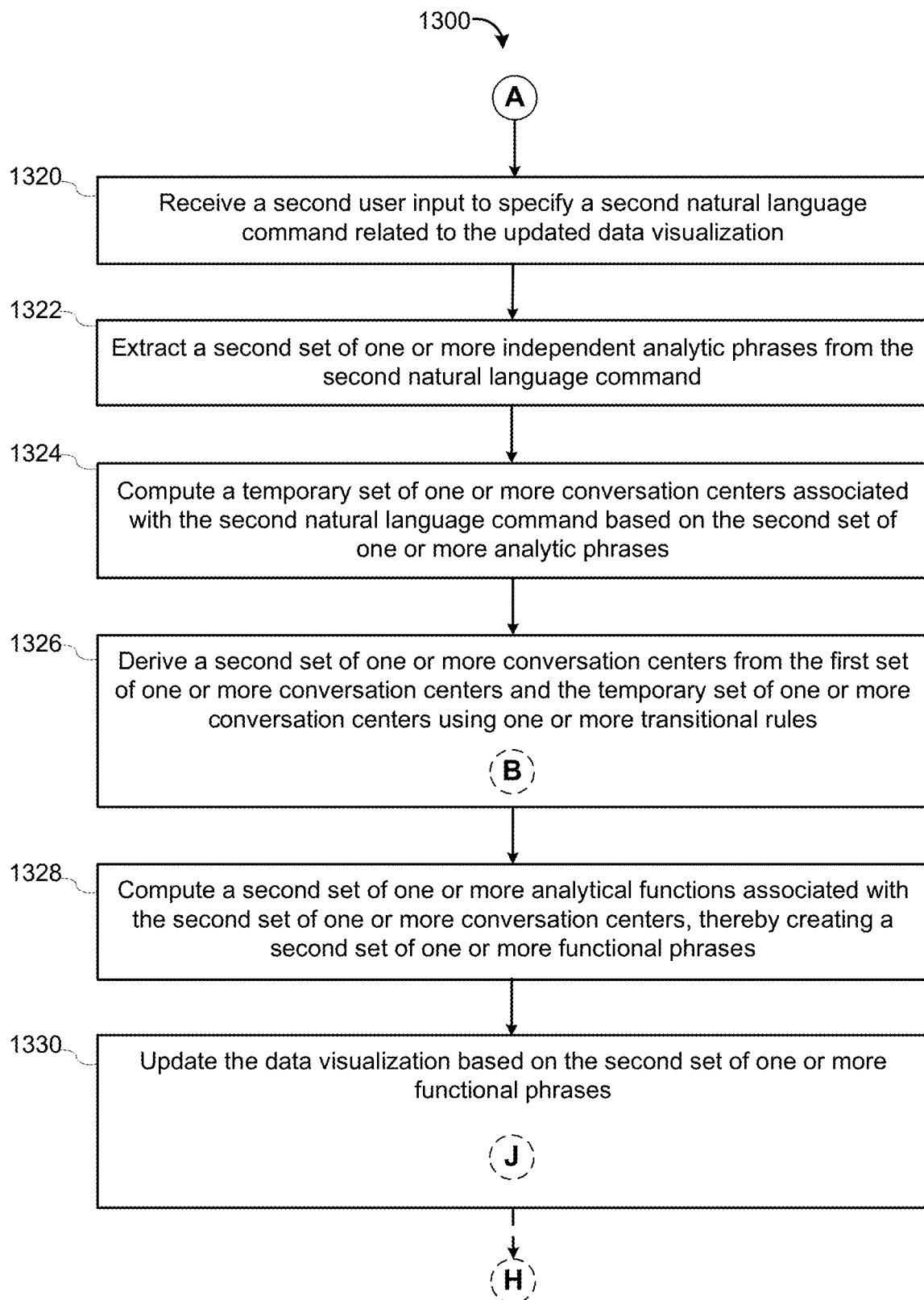

Referring now back to FIG. 13B, the computer receives (1320) a second user input to specify a second natural language command related to the displayed data visualization. In some implementations, the user input is received as text input (e.g., a via keyboard 216 or via touch sensitive display 214) from a user in a data-entry region on the display in proximity to the displayed data visualization. In some implementations, the user input is received as a voice command using a microphone (e.g., an audio input device 220) coupled to the computer. For example, referring to FIG. 4A, the displayed data visualization 408 concerns measles in the uk, when the computer receives the second user input "show me the orange spike." Receiving inputs (e.g., commands/queries) from a user is discussed in further detail above with reference to FIG. 1.

Based on the displayed data visualization, the computer extracts (1322) a second set of one or more independent analytic phrases from the second natural language command. For example, referring to FIG. 4A, the second natural language command (410) received by the computer reads, "show me the orange spike." In some implementations, for this example, the computer extracts "the orange spike" from the second natural language command because these analytic phrases relate to the displayed data visualization (that concerns measles in the uk, and has an orange spike, a visualization property). When the phrases have direct reference to data fields in the displayed data visualization, extraction (1322) is straight forward: collect all phrases that are direct references to data fields. In some implementations, the computer stems or removes stop words, filler words, or any predefined set of words from the incoming query, and extracts (1322) all other phrases from the second natural language command because they may be related to the displayed data visualization. Some implementations use this approach when the phrases in the natural language command have some indirect reference to the data fields in the displayed visualization.

The language processing module computes (1324) a temporary set of one or more conversation centers associated with the second natural language command based on the second set of one or more analytic phrases, in accordance with some implementations.

Figure 13C:
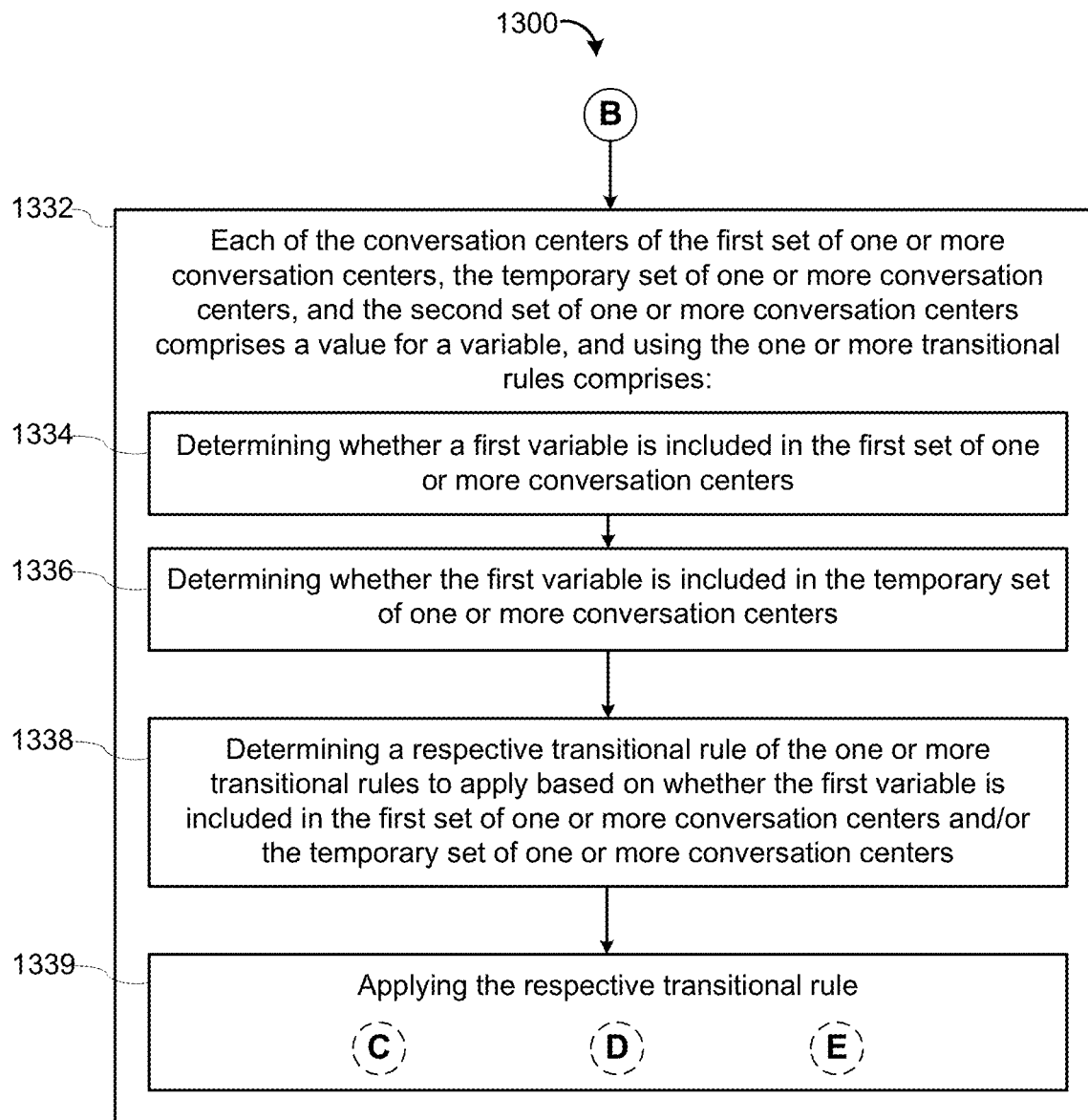

The language processing module derives (1326) a second set of one or more conversation centers from the first set of one or more conversation centers and the temporary set of one or more conversation centers using one or more transitional rules, in accordance with some implementations. In some such implementations (1332), each of the conversation centers of the first set of one or more conversation centers, the temporary set of one or more conversation centers, and the second set of one or more conversation centers comprises a value for a variable (e.g., a data attribute or a visualization property). In some such implementations, the language processing module uses the transitional rules by performing a sequence of operations (as shown in FIG. 13C) comprising: determining (1334) if a first variable is included in the first set of one or more conversation centers; determining (1336) if the first variable is included in the temporary set of one or more conversation centers; determining (1338) a respective transitional rule of the one or more transitional rules to apply based on whether the first variable is included in the first set of one or more conversation centers and/or the temporary set of one or more conversation centers; and applying (1339) the respective transitional rule.

Figure 13D:
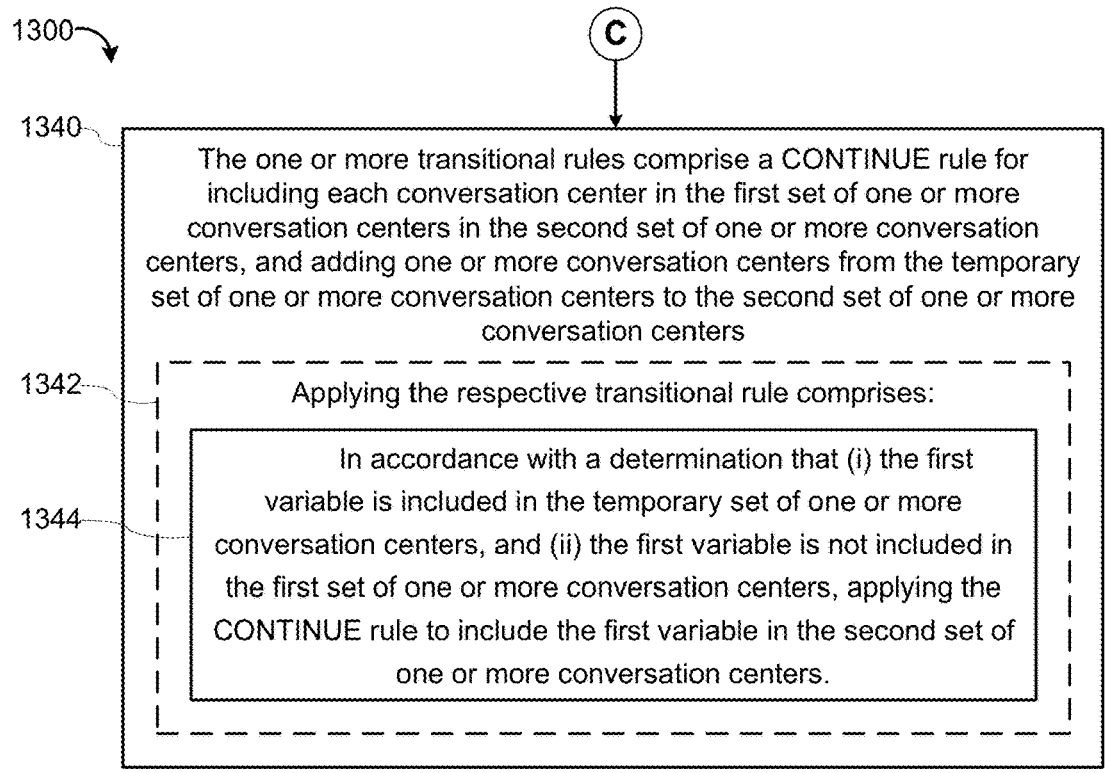

In some implementations, as shown in FIG. 13D, the one or more transitional rules used by the language processing module 238 comprise (1340) a CONTINUE rule for including each conversation center in the first set of one or more conversation centers in the second set of one or more conversation centers and adding one or more conversation centers from the temporary set of one or more conversation centers to the second set of one or more conversation centers. In some such implementations, applying (1342) the respective transitional rule comprises: when (i) the first variable is included in the temporary set of one or more conversation centers, and (ii) the first variable is not included in the first set of one or more conversation centers, apply (1344) the CONTINUE rule to include the first variable in the second set of one or more conversation centers.

Figure 13E:
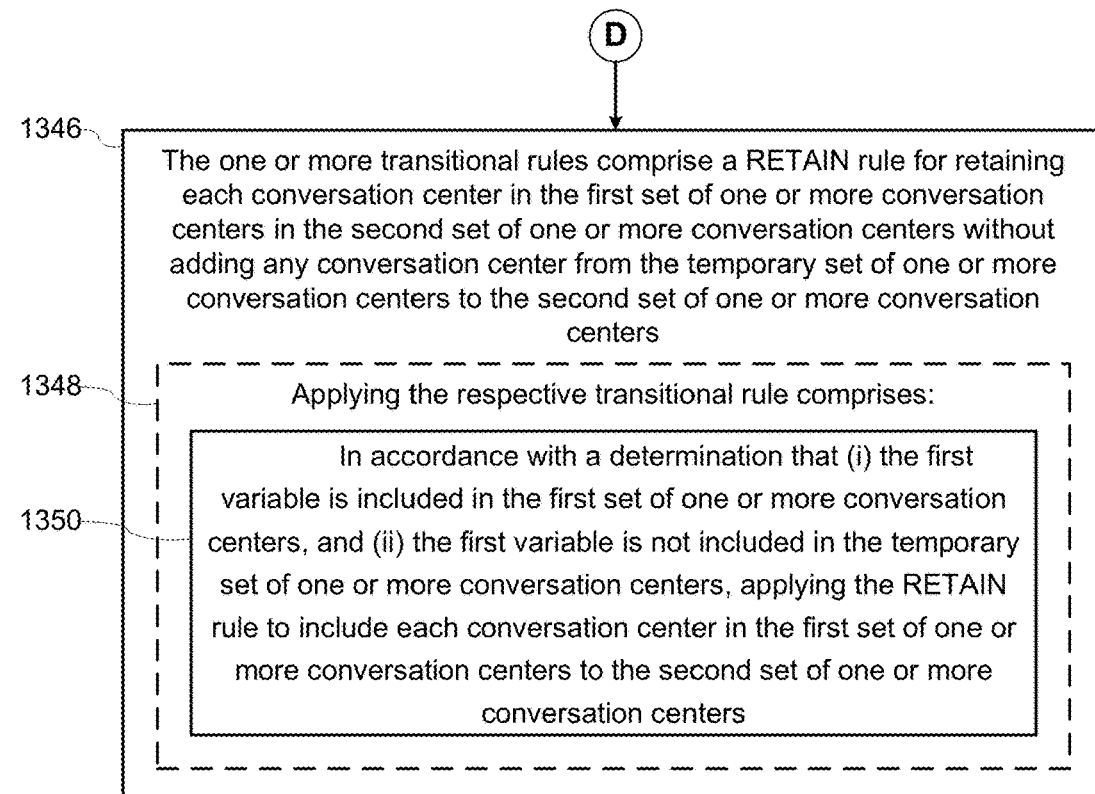

In some implementations, as shown in FIG. 13E, the one or more transitional rules used by the language processing module 238 comprise (1346) a RETAIN rule for retaining each conversation center in the first set of one or more conversation centers in the second set of one or more conversation centers without adding any conversation center from the temporary set of one or more conversation centers to the second set of one or more conversation centers. In some such implementations, applying (1348) the respective transitional rule comprises: when (i) the first variable is included in the first set of one or more conversation centers, and (ii) the first variable is not included in the temporary set of one or more conversation centers, apply (1350) the RETAIN rule to include each conversation center in the first set of one or more conversation centers to the second set of one or more conversation centers.

Figure 13F:
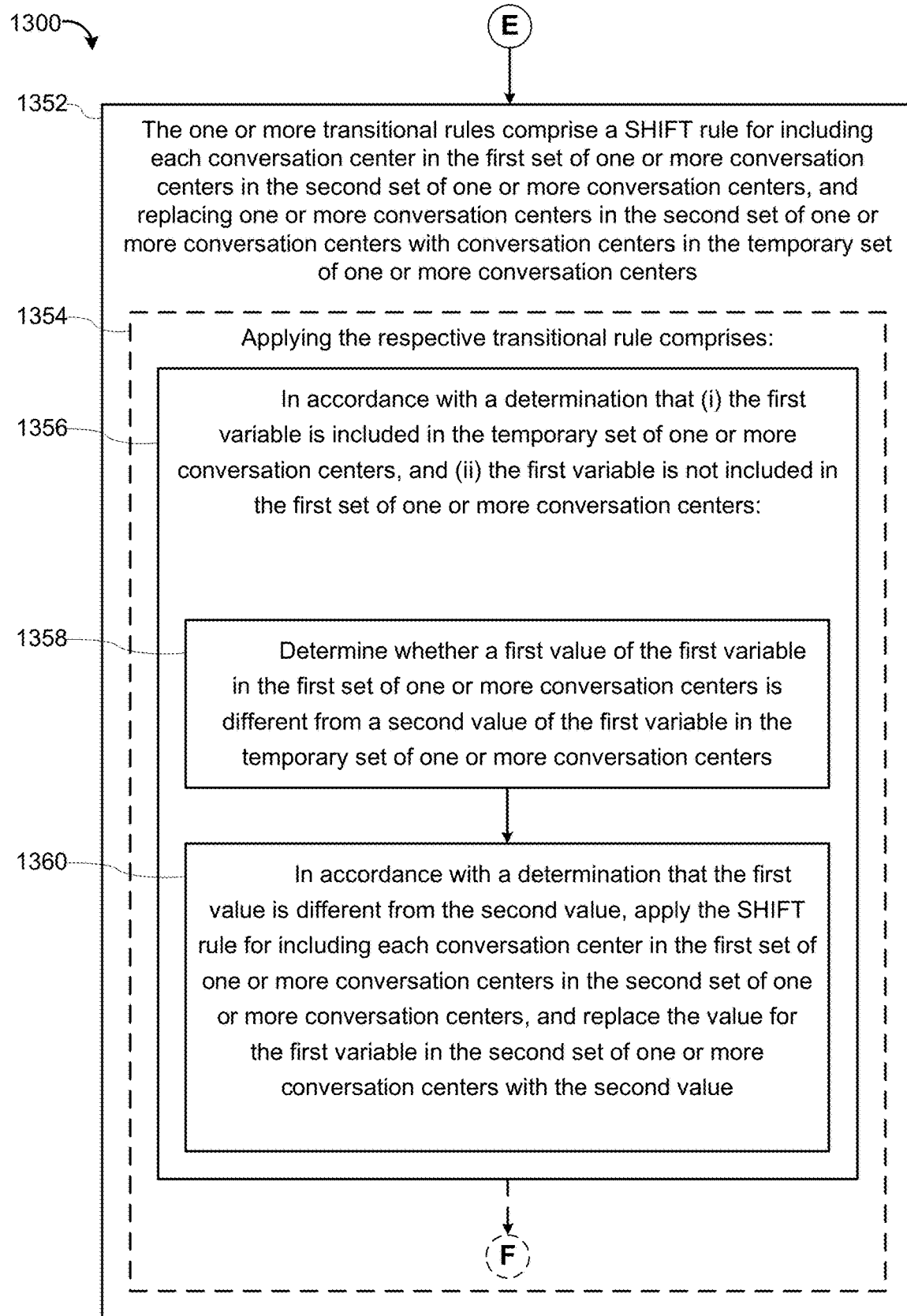
Figure 13G:
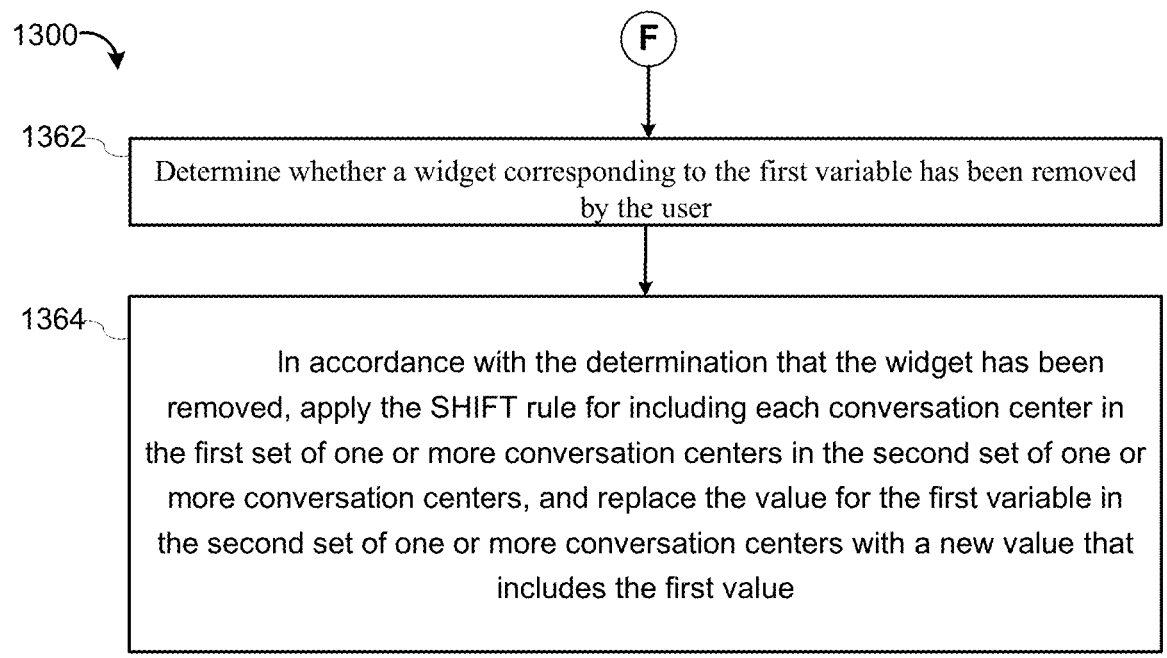

In some implementations, as shown in FIG. 13F, the one or more transitional rules used by the language processing module 238 comprise (1352) a SHIFT rule for including each conversation center in the first set of one or more conversation centers in the second set of one or more conversation centers and replacing one or more conversation centers in the second set of one or more conversation centers with conversation centers in the temporary set of one or more conversation centers. In some such implementations, applying (1354) the respective transitional rule comprises: when (1356) that (i) the first variable is included in the temporary set of one or more conversation centers, and (ii) the first variable is not included in the first set of one or more conversation centers, the language processing module 228 performs a sequence of operations to: determine (1358) if the value of the first variable in the first set of one or more conversation centers is different from the value of the first variable in the temporary set of one or more conversation centers; and when the values of the first variable are different, apply (1360) the SHIFT rule for including each conversation center in the first set of one or more conversation centers in the second set of one or more conversation centers, and replace the value for the first variable in the second set of one or more conversation centers with the value for the first variable in the temporary set of one or more conversation centers. In some such implementations, applying (1354) the respective transitional rule further comprises, as shown in FIG. 13G, determining (1362) if a widget corresponding to the first variable has been removed by the user, and when the widget has been removed, applying (1364) the SHIFT rule for including each conversation center in the first set of one or more conversation centers in the second set of one or more conversation centers, and replace the value for the first variable in the second set of one or more conversation centers with a new value (e.g., a maximum value, a super-set value) that includes the value of the first variable in the first set of one or more conversation centers.

Referring now back to FIG. 13B, the language processing module 238 computes (1328) a second set of one or more analytical functions associated with the second set of one or more conversation centers, thereby creating a second set of one or more functional phrases. The language processing module 238 performs this step, using the second set of one or more conversation centers computed in step 1326, in a manner similar to step 1316 described above.

The computer updates (1330) the data visualization based on the second set of one or more functional phrases, in accordance with some implementations. In some such implementations, as shown in FIG. 13J, the computer requeries (1378) the database using a second set of one or more queries based on the first set of one or more functional phrases, thereby retrieving a third dataset; and updates (1380) the data visualization based on the third dataset. Further, in some such implementations, the computer creates and displays (1382) a new data visualization (e.g., without updating the existing one or more data visualizations) using the third dataset.

Figure 13H:
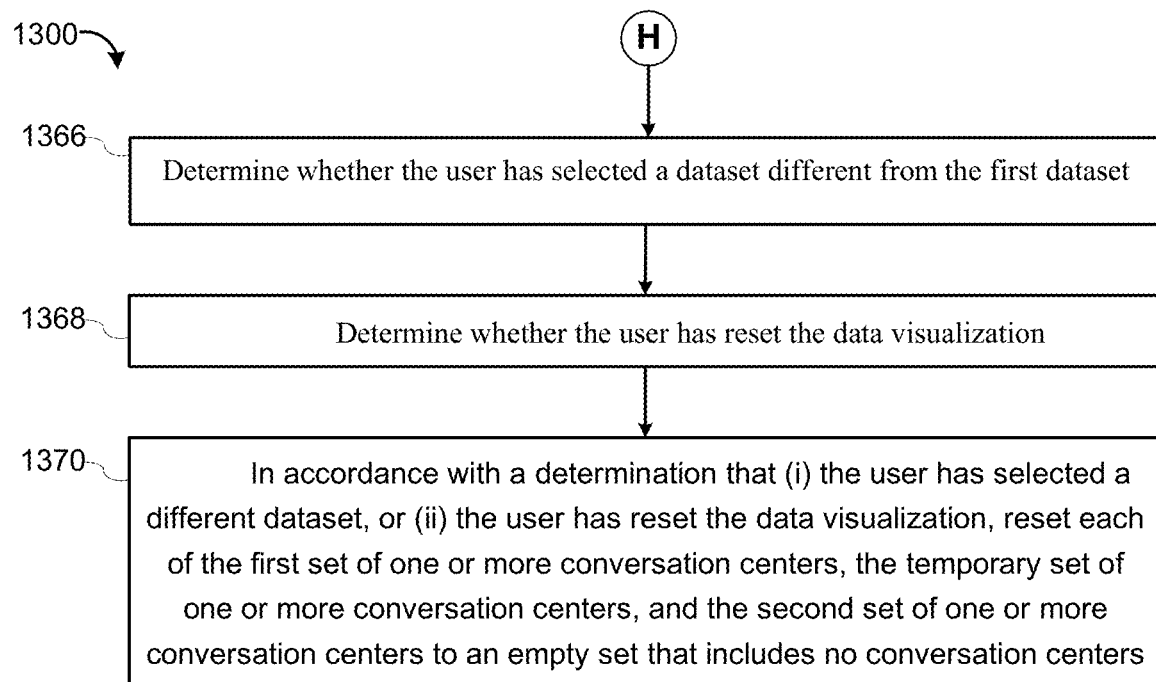
Figure 13I:
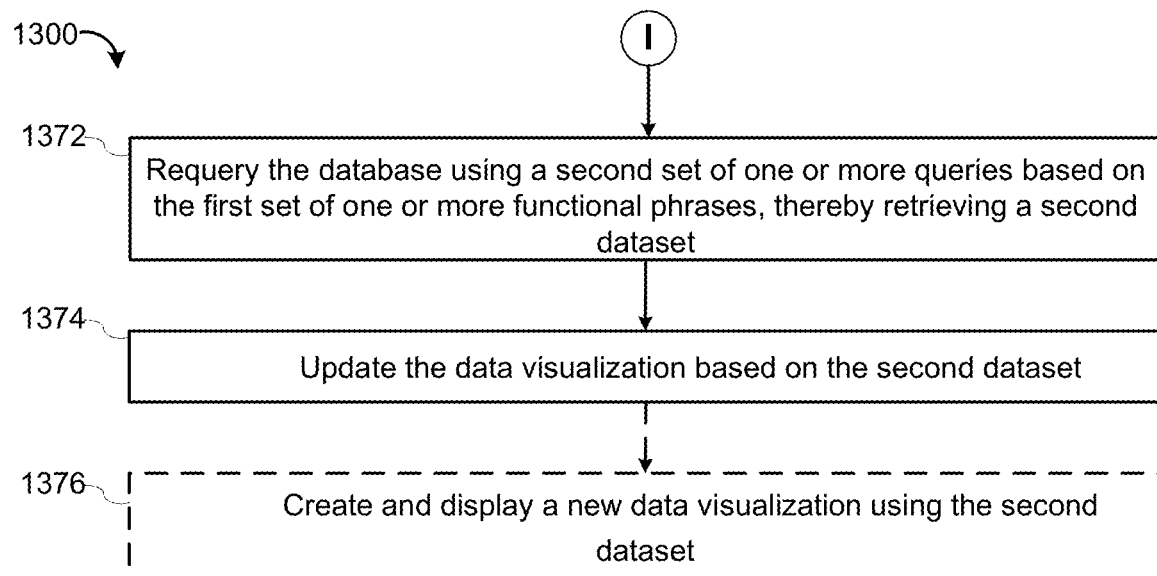
Figure 13J:
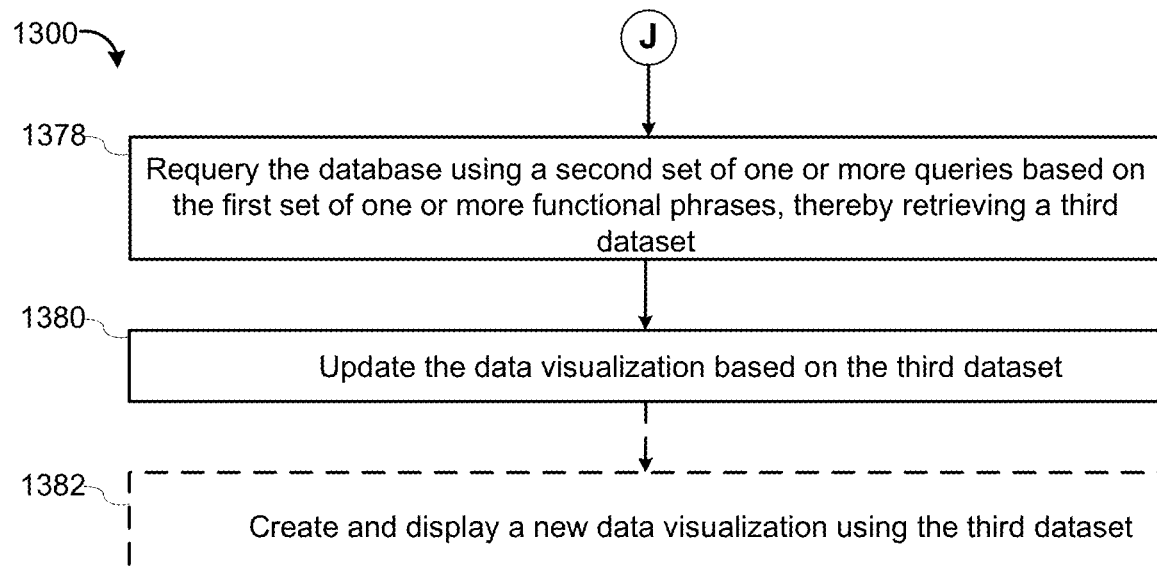

In some implementations, as shown in FIG. 13H, the computer further determines (1366) if the user has selected a dataset different from the first dataset and determines (1368) if the user has reset the data visualization. When (i) the user has selected a different dataset or (ii) the user has reset the data visualization, the computer resets (1370) each of the first set of one or more conversation centers, the temporary set of one or more conversation centers, and the second set of one or more conversation centers to an empty set that includes no conversation centers.

Figure 14A:
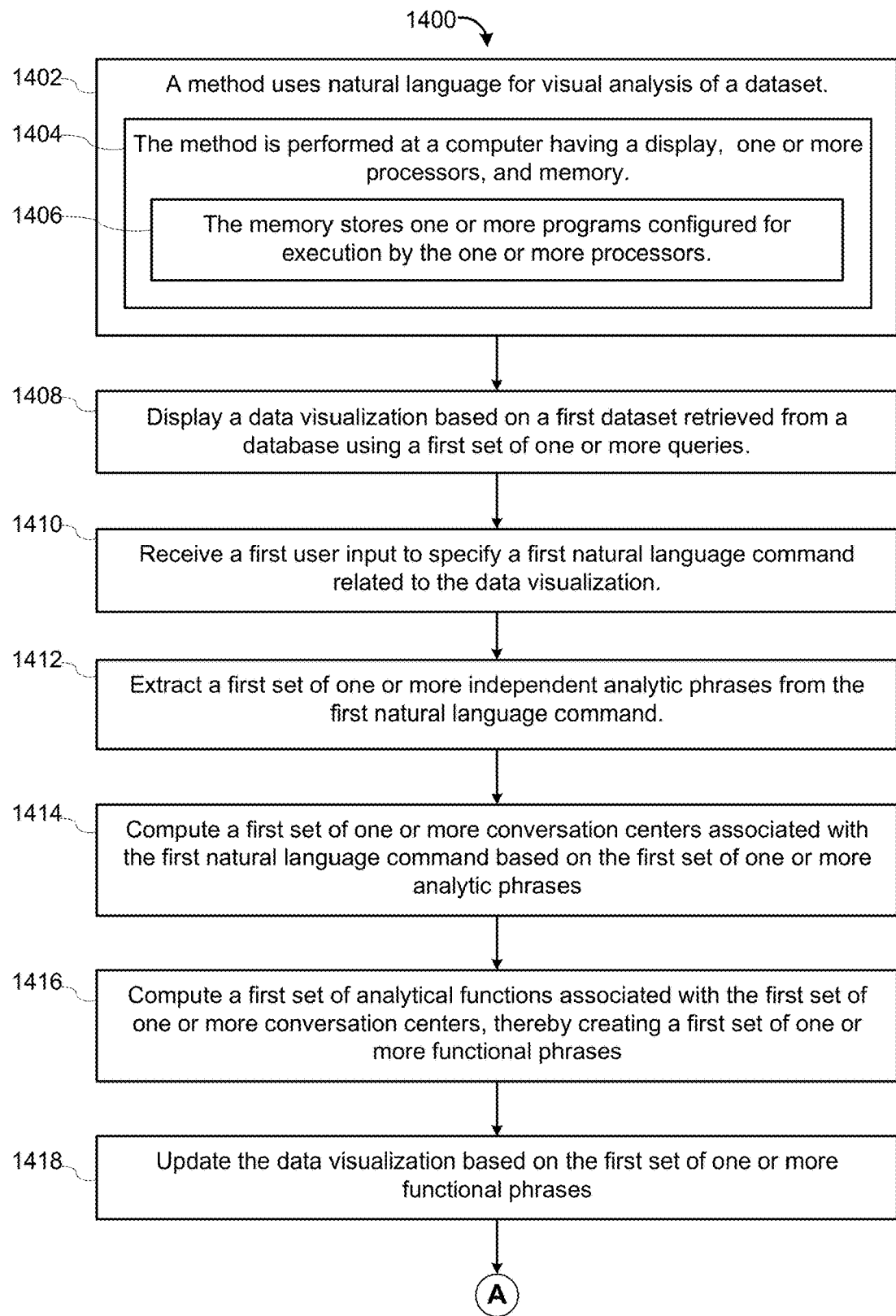
FIGS. 14A-14R provide a flowchart of a process that uses natural language for visual analysis of a dataset applying pragmatics principles, including for handling various forms of pragmatics, according to some implementations.
Figure 14B:
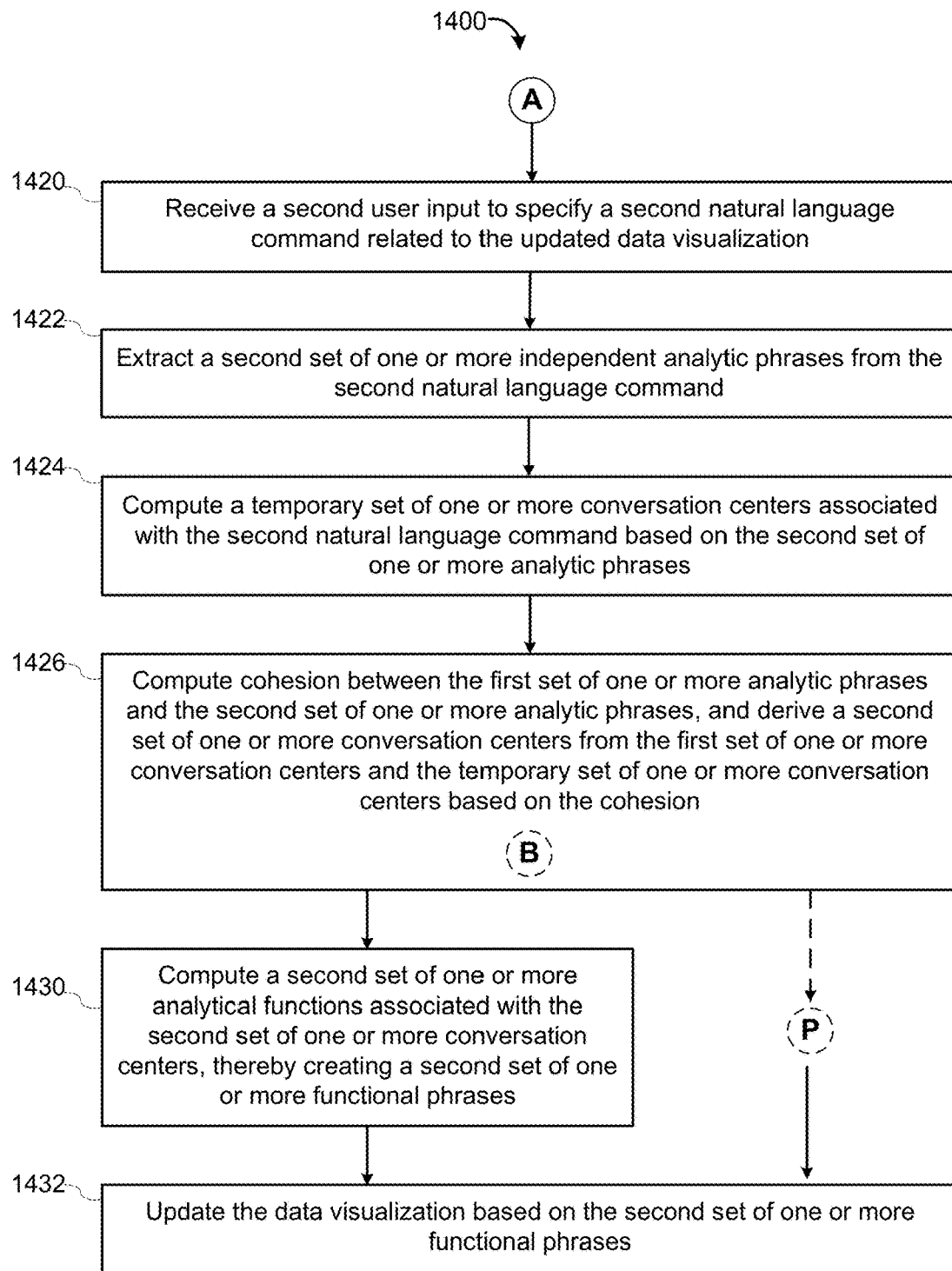
Figure 14C:
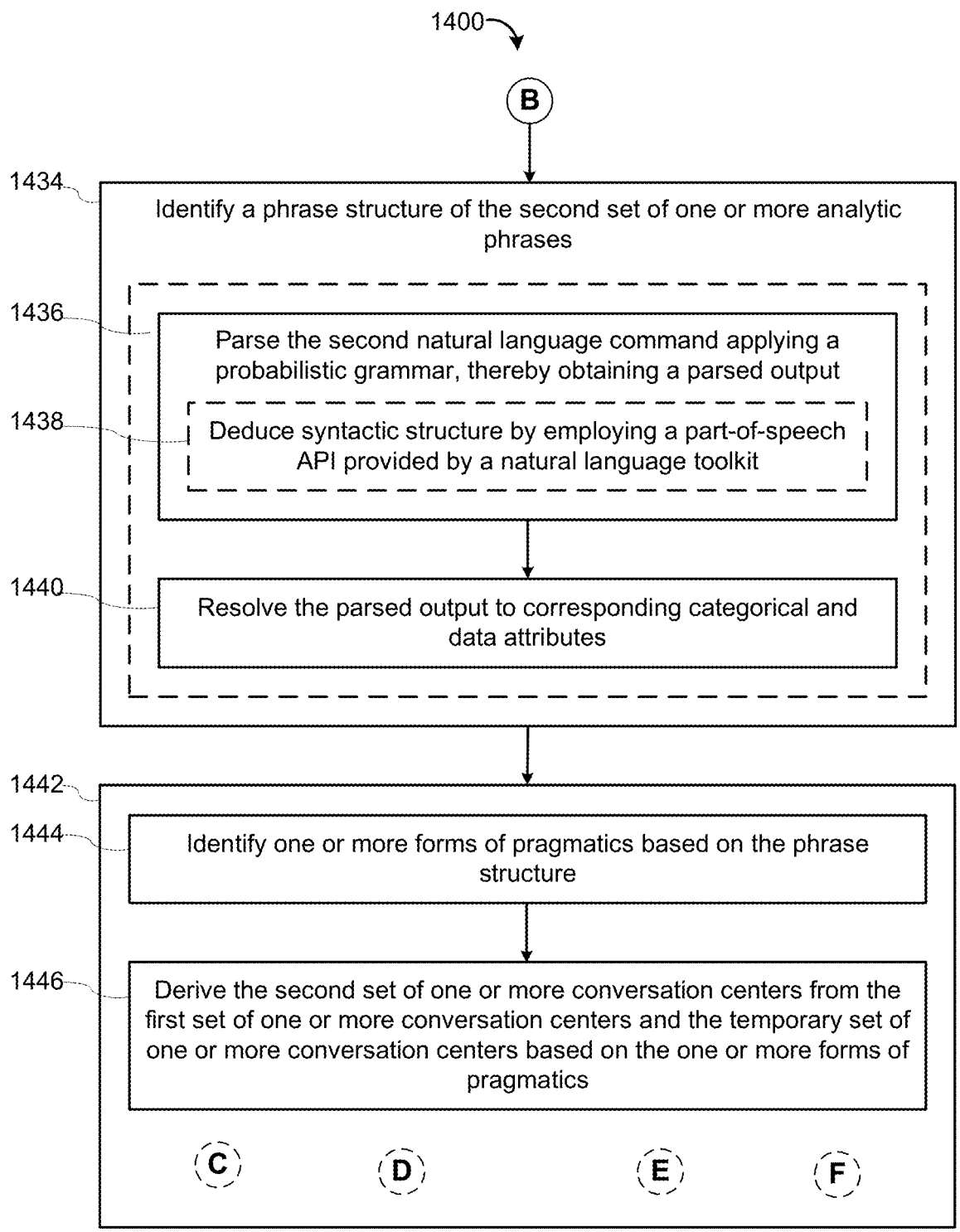
Figure 14D:
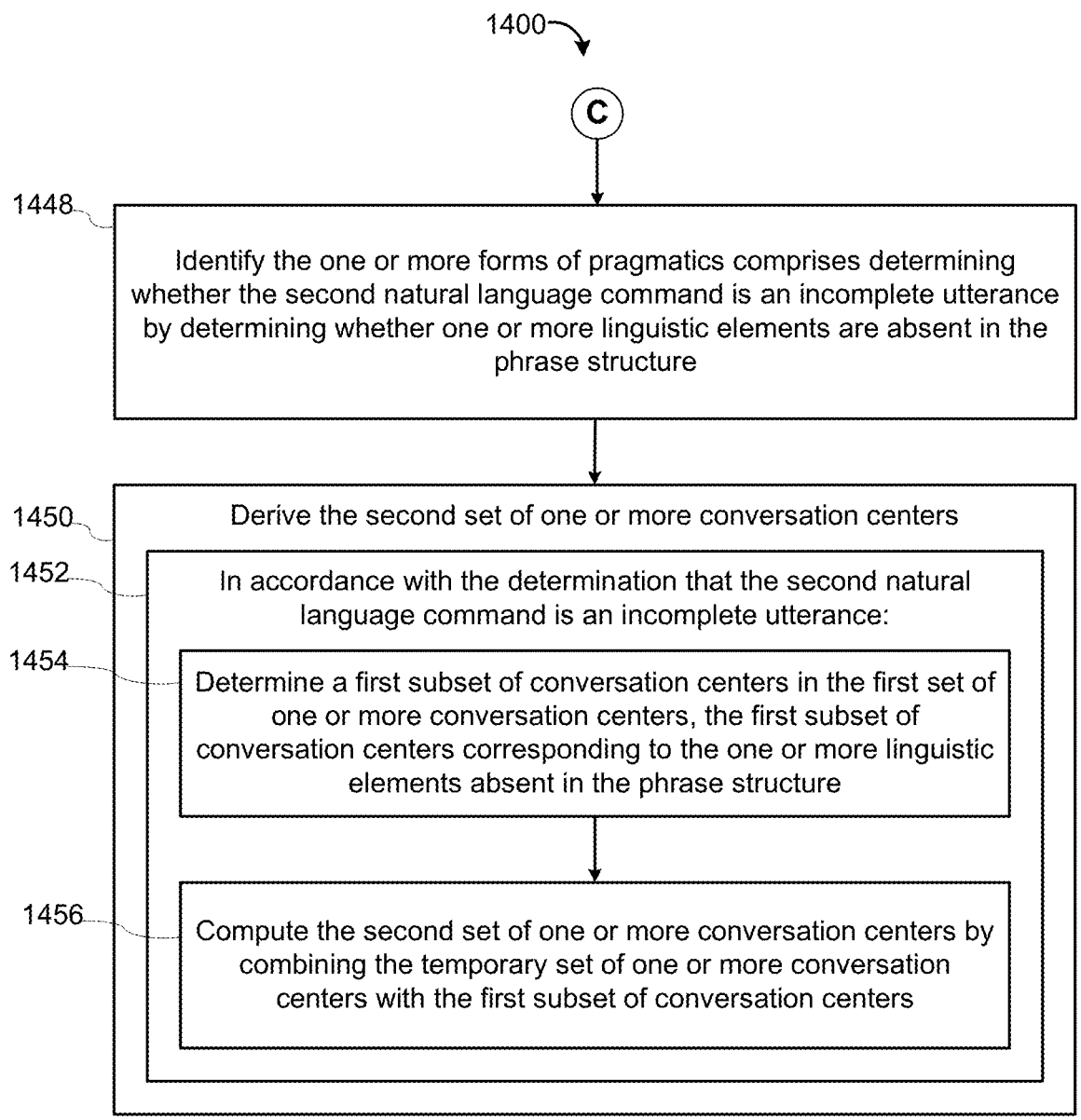
Figure 14E:
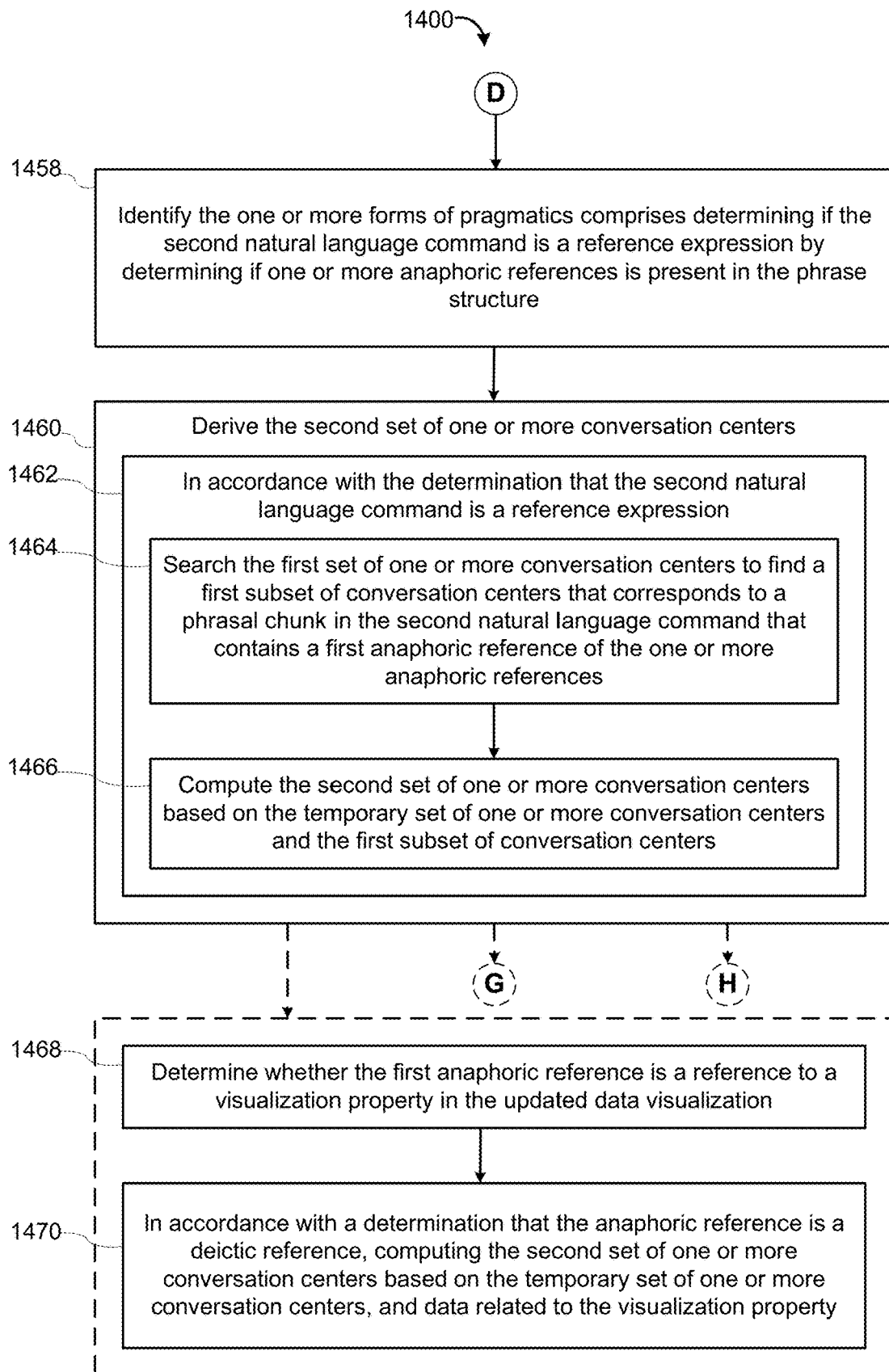
Figure 14F:
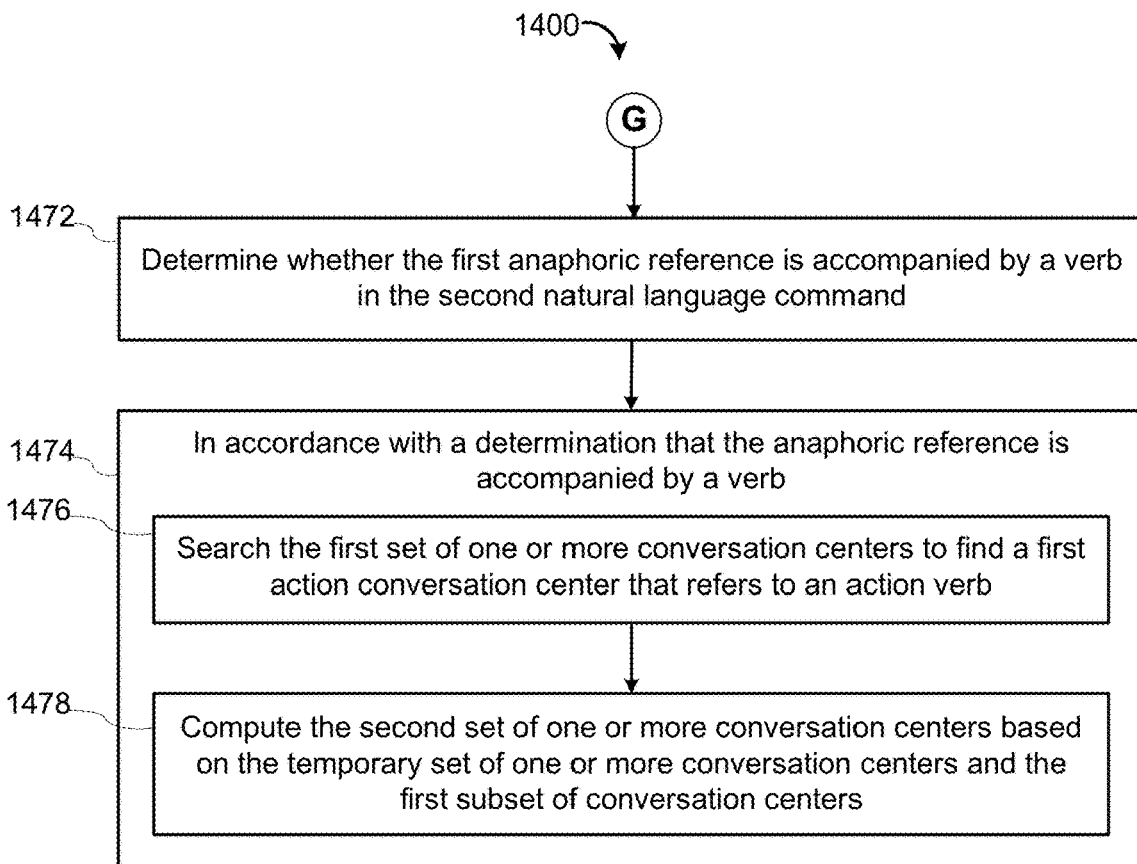
Figure 14G:
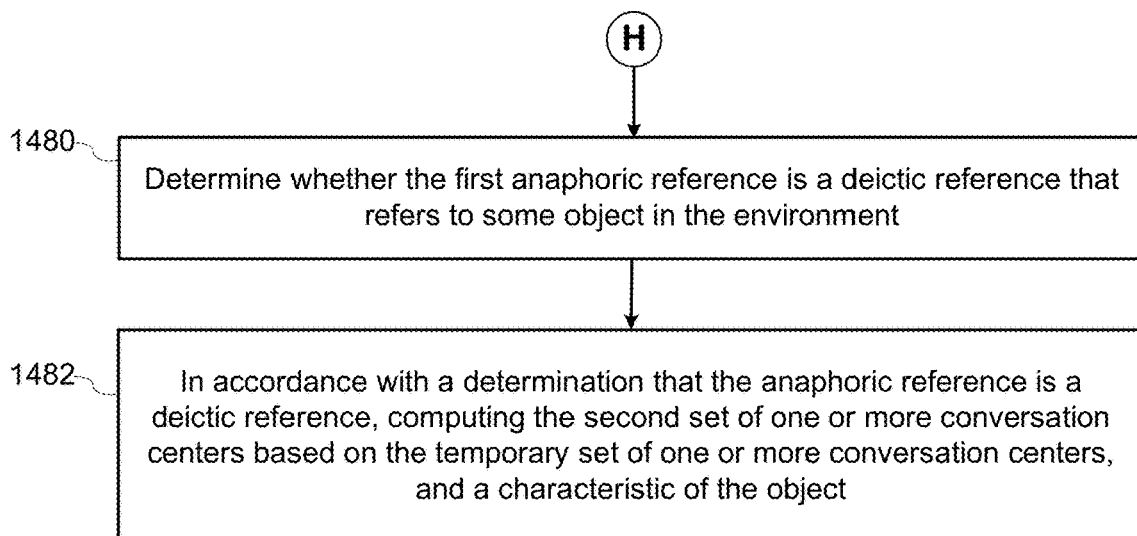
Figure 14H:
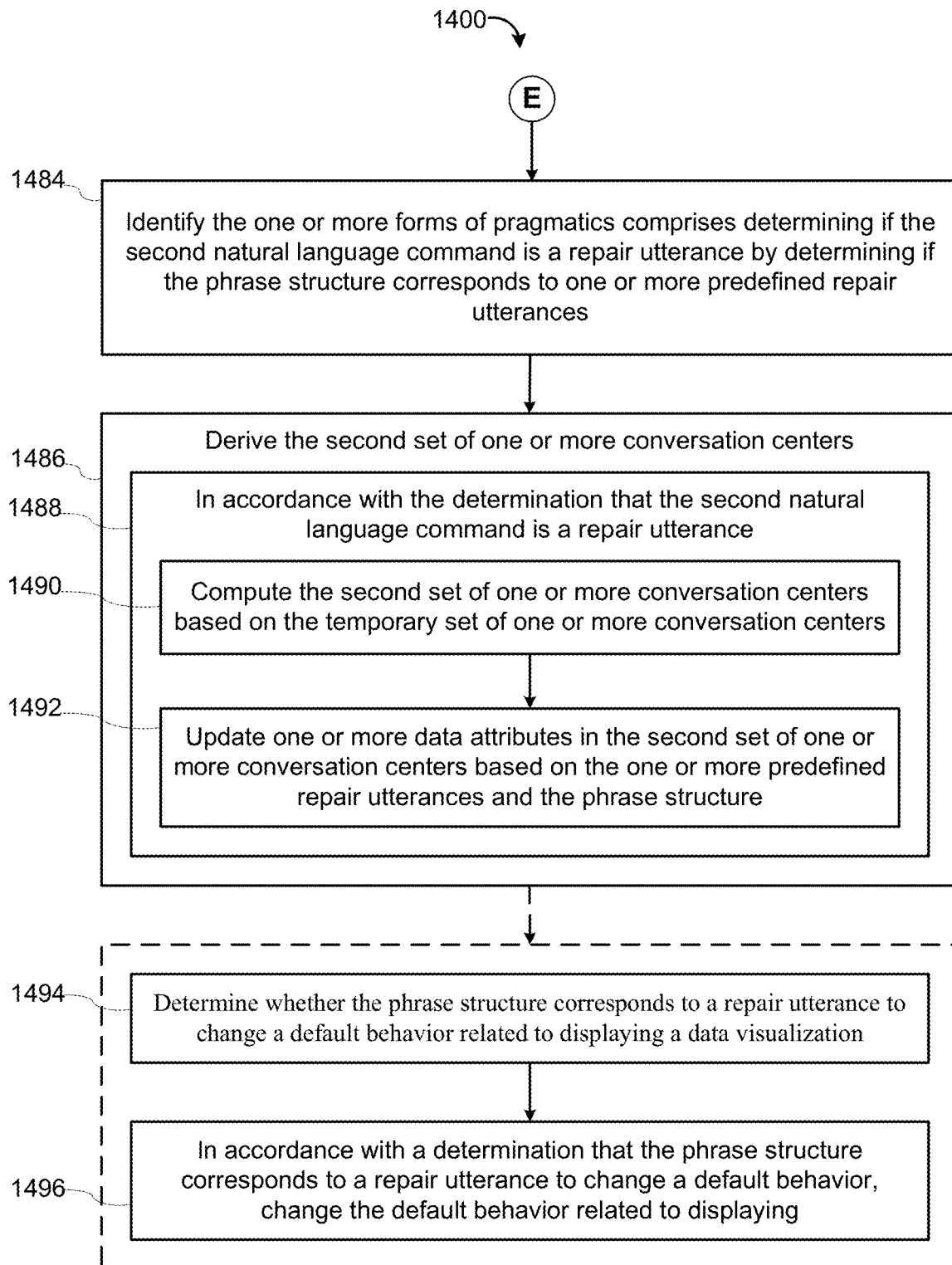
Figure 14I:
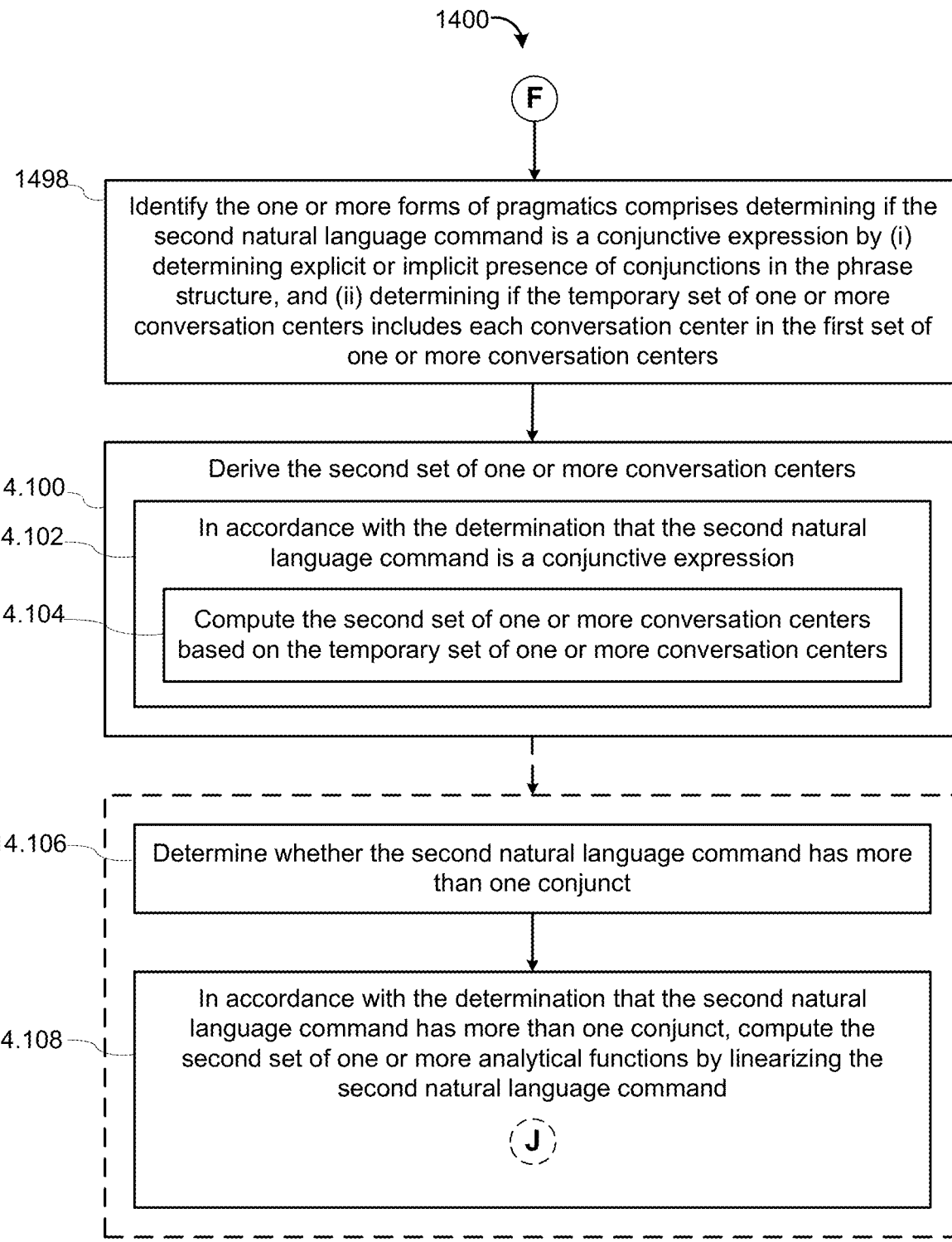
Figure 14J:
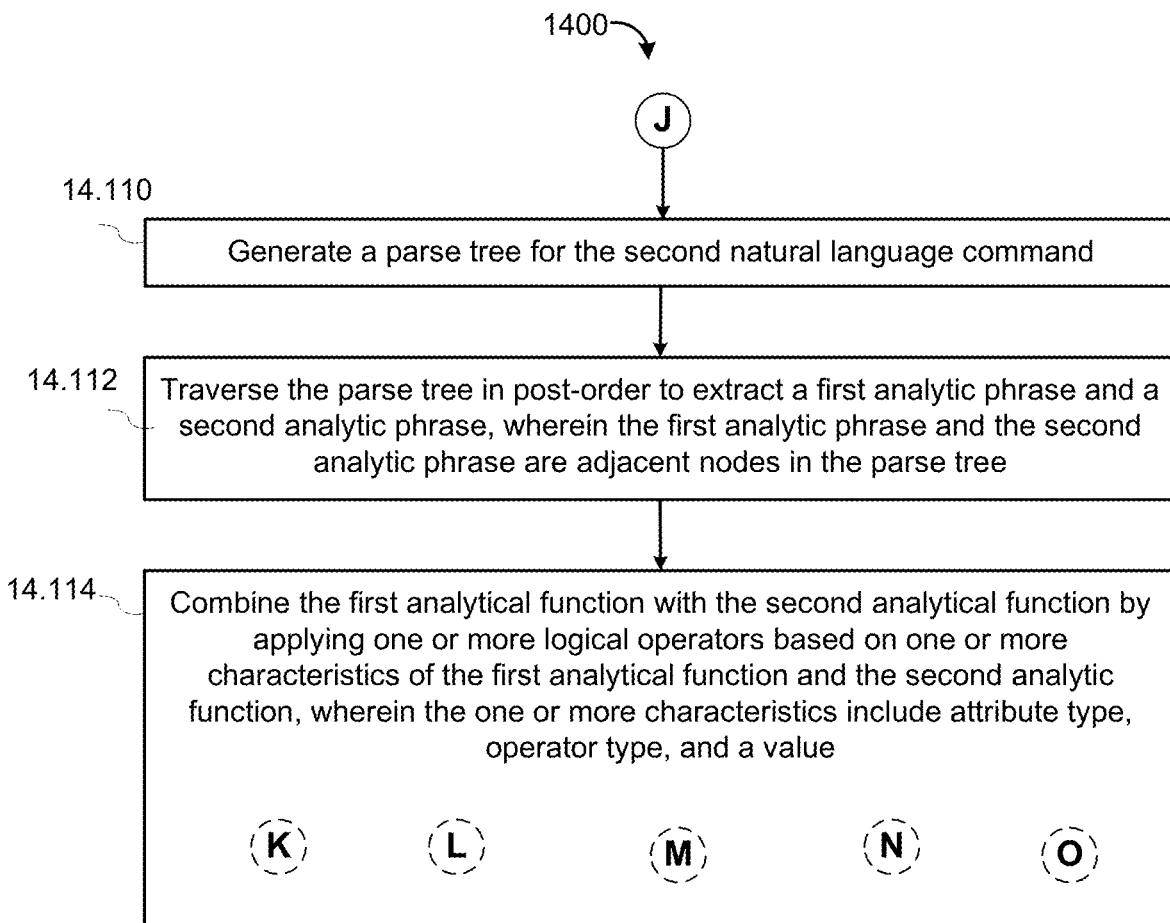
Figure 14K:
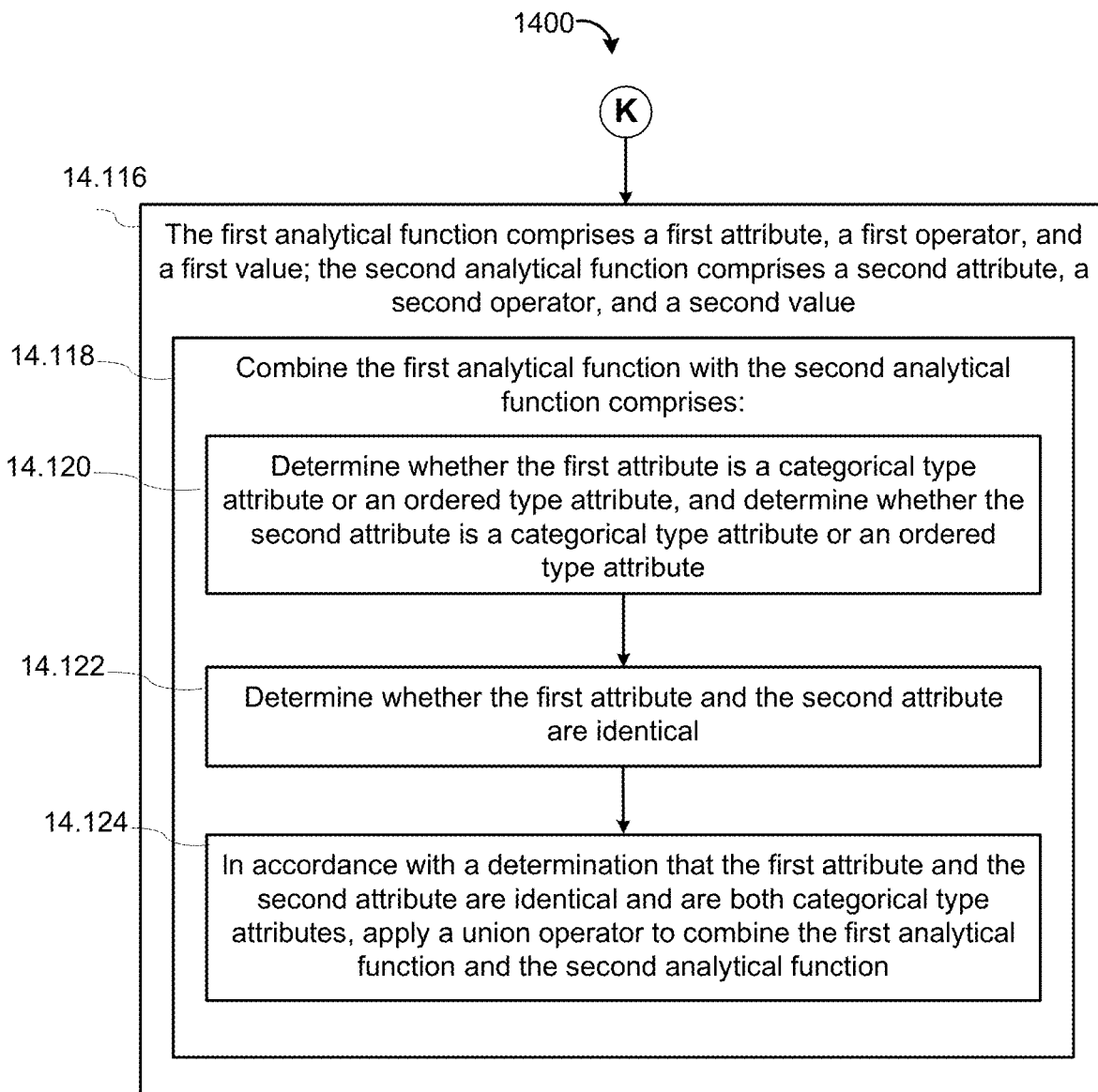
Figure 14L:
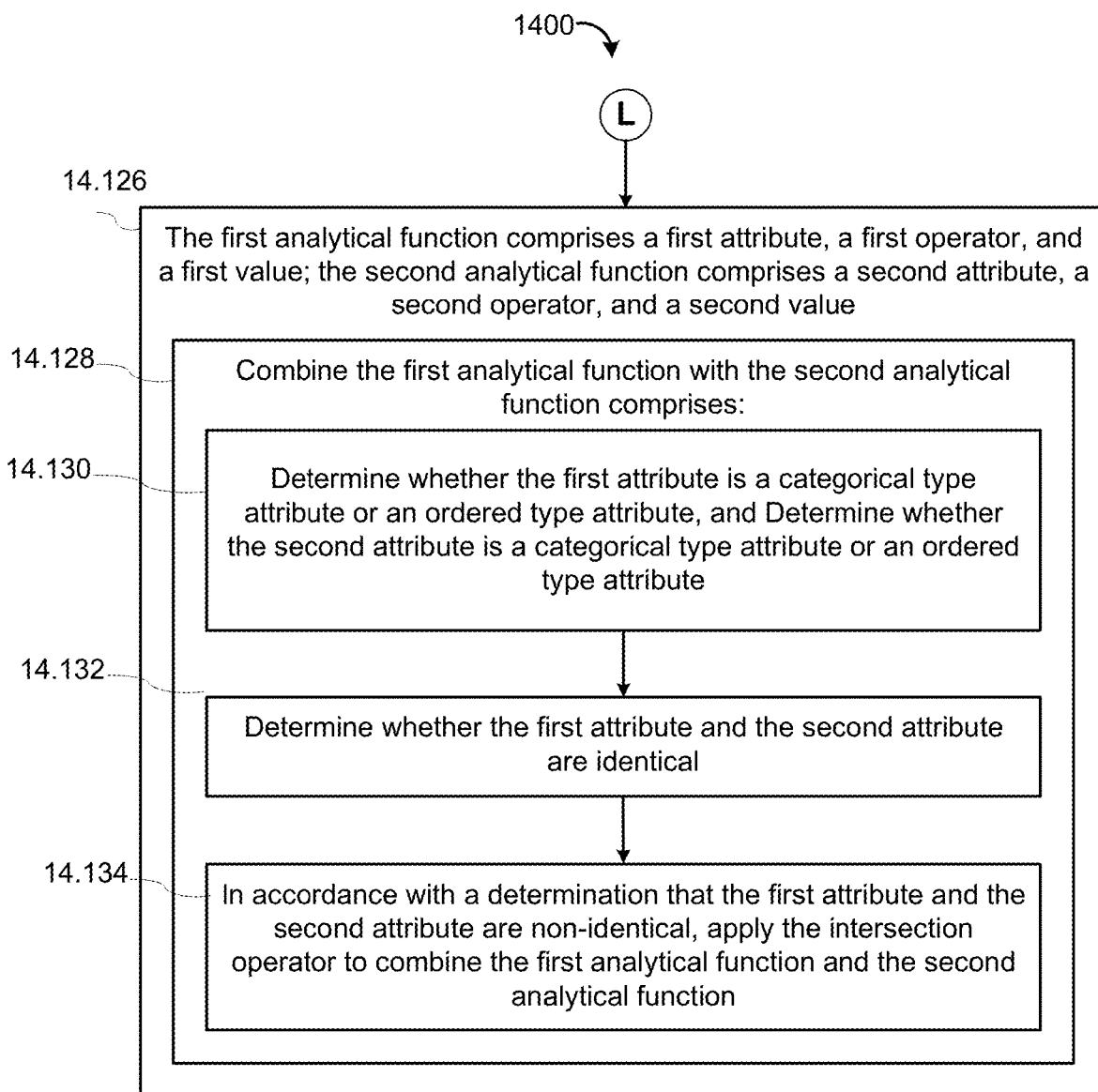
Figure 14M:
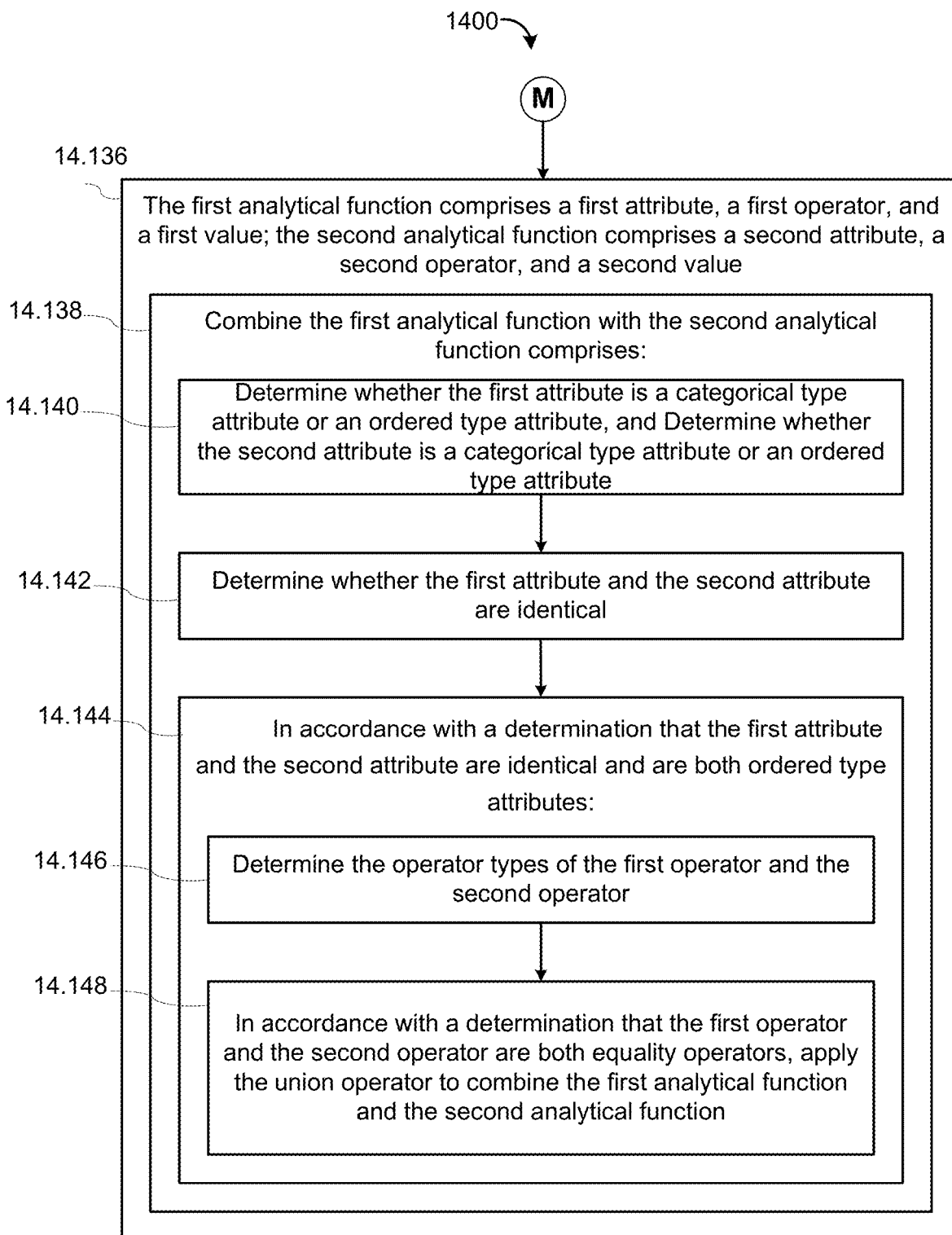
Figure 14N:
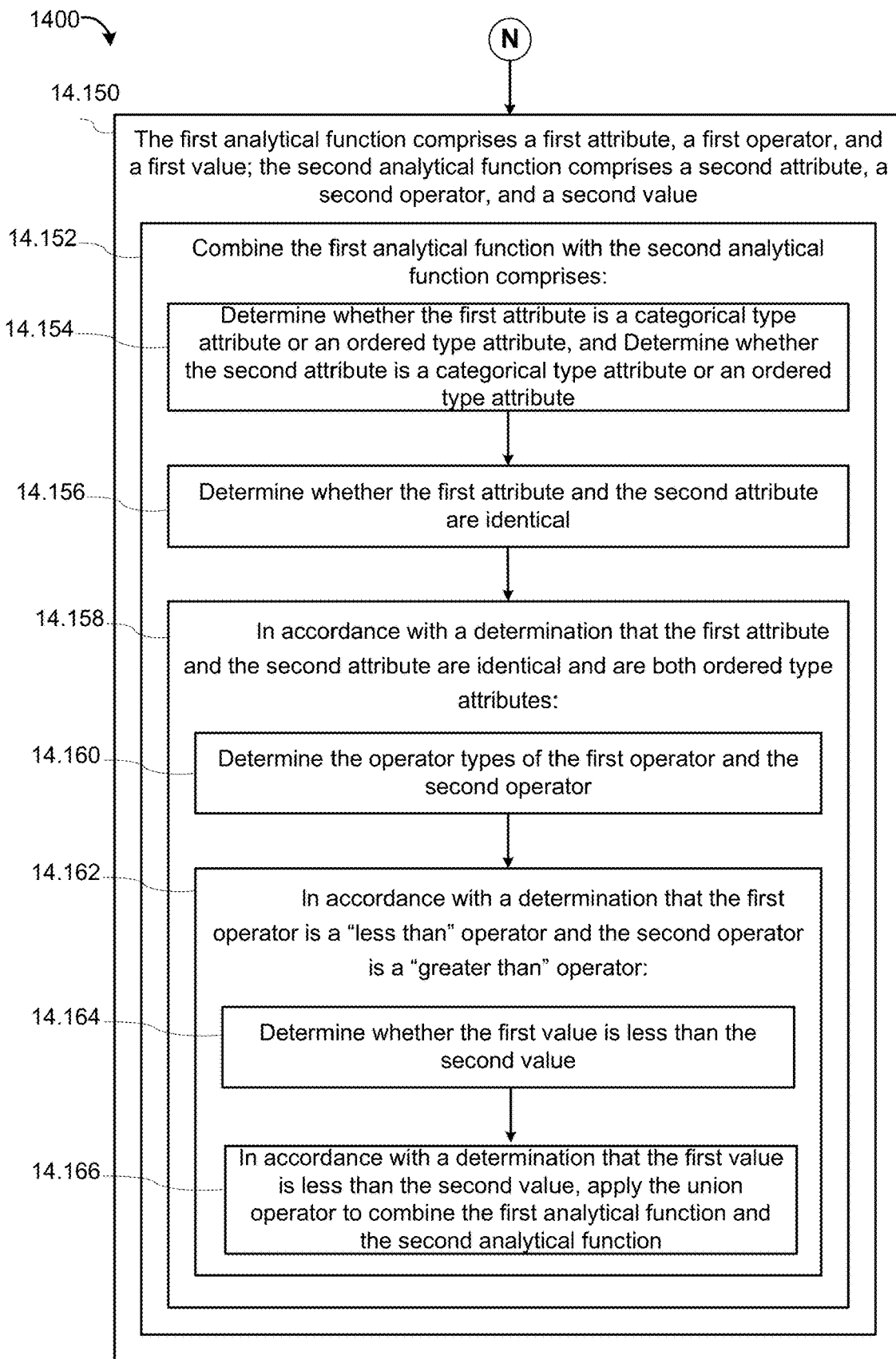
Figure 14O:
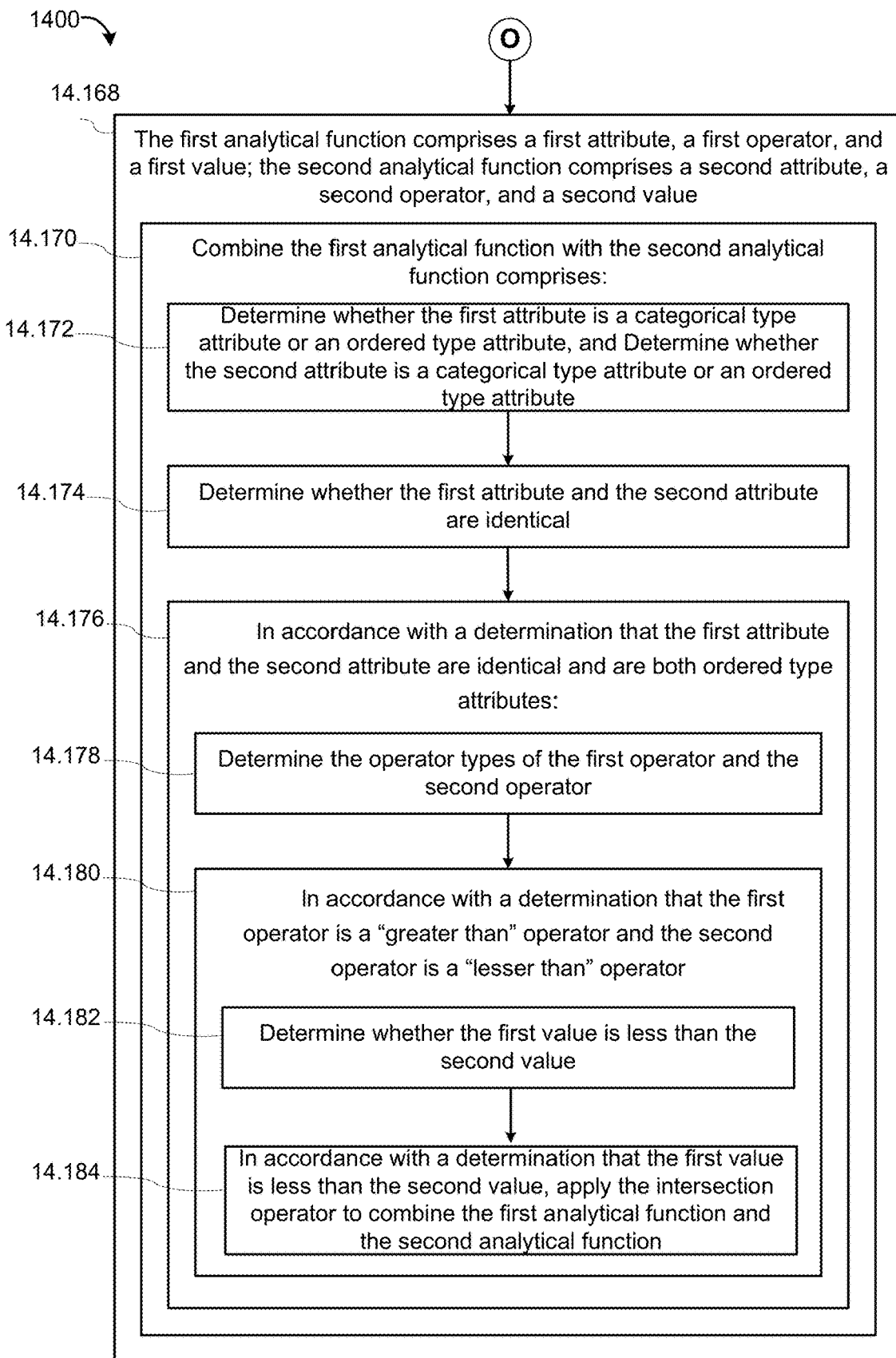
Figure 14P:
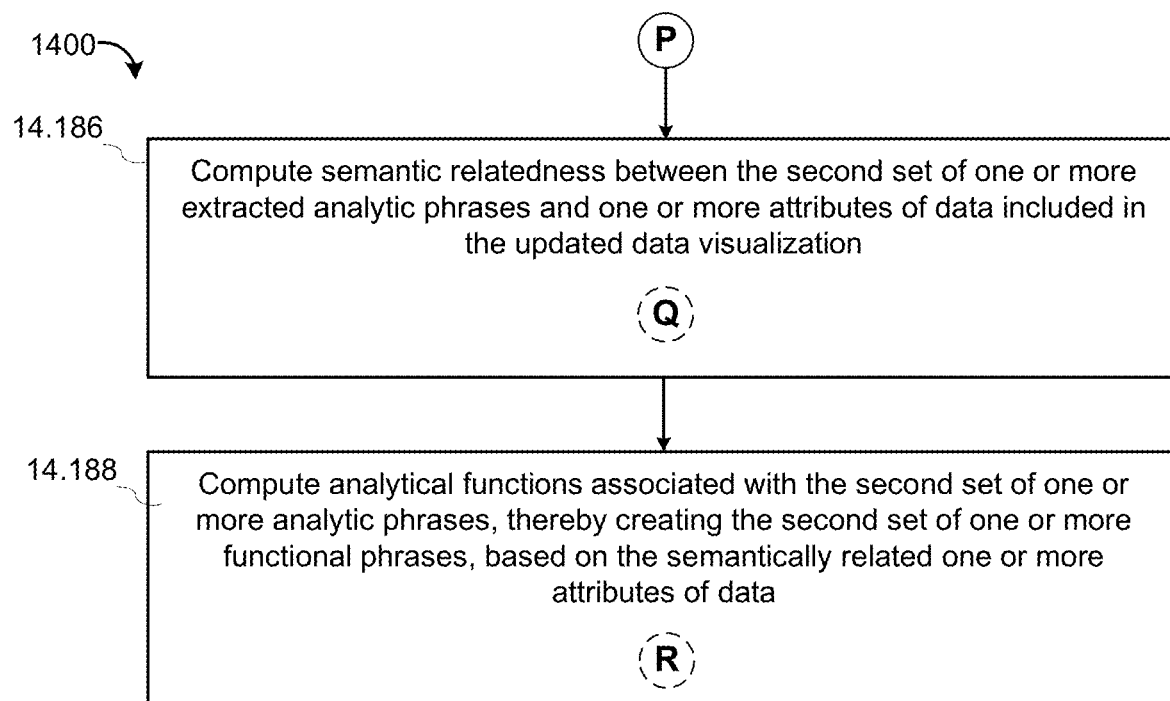
Figure 14Q:
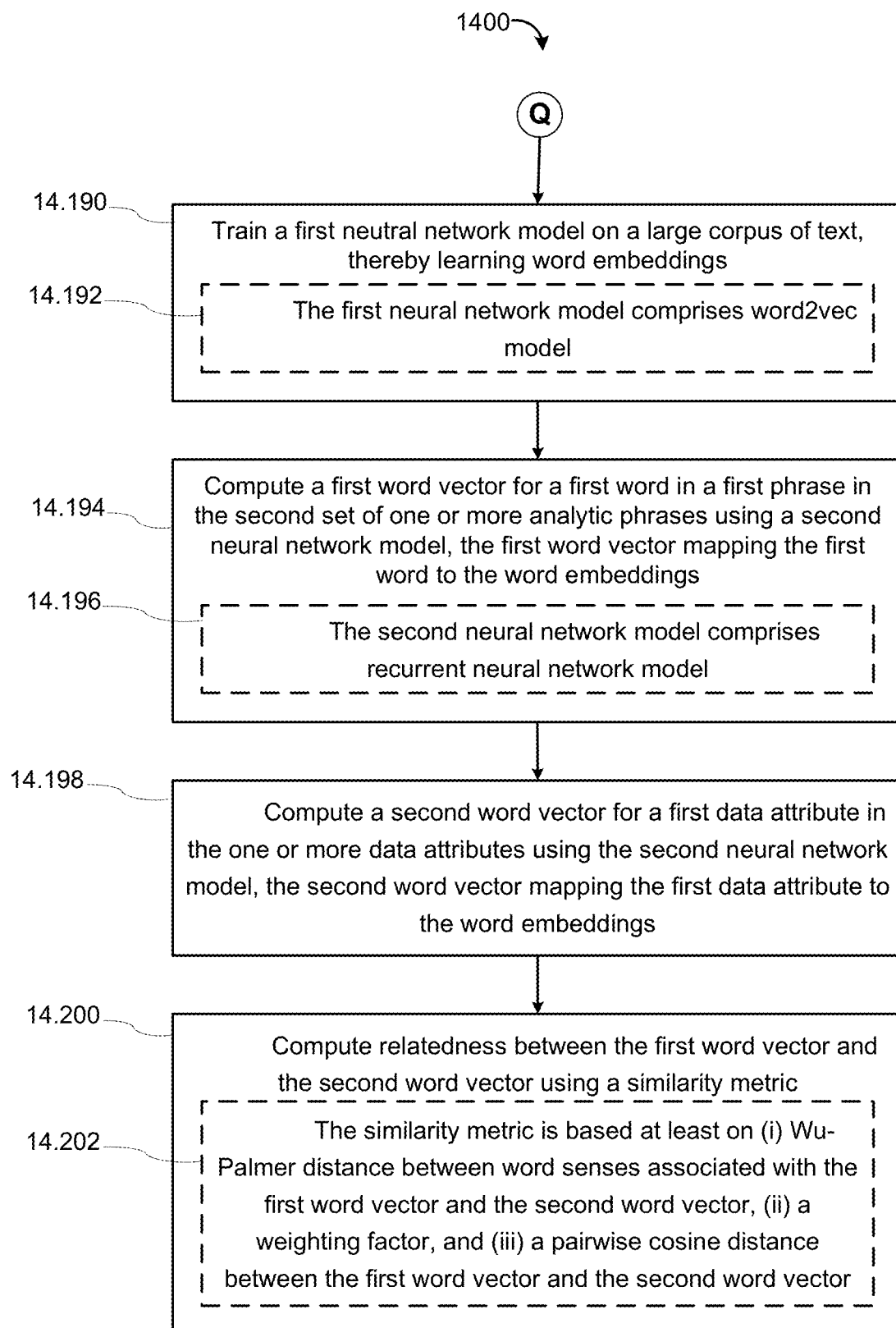
Figure 14R:
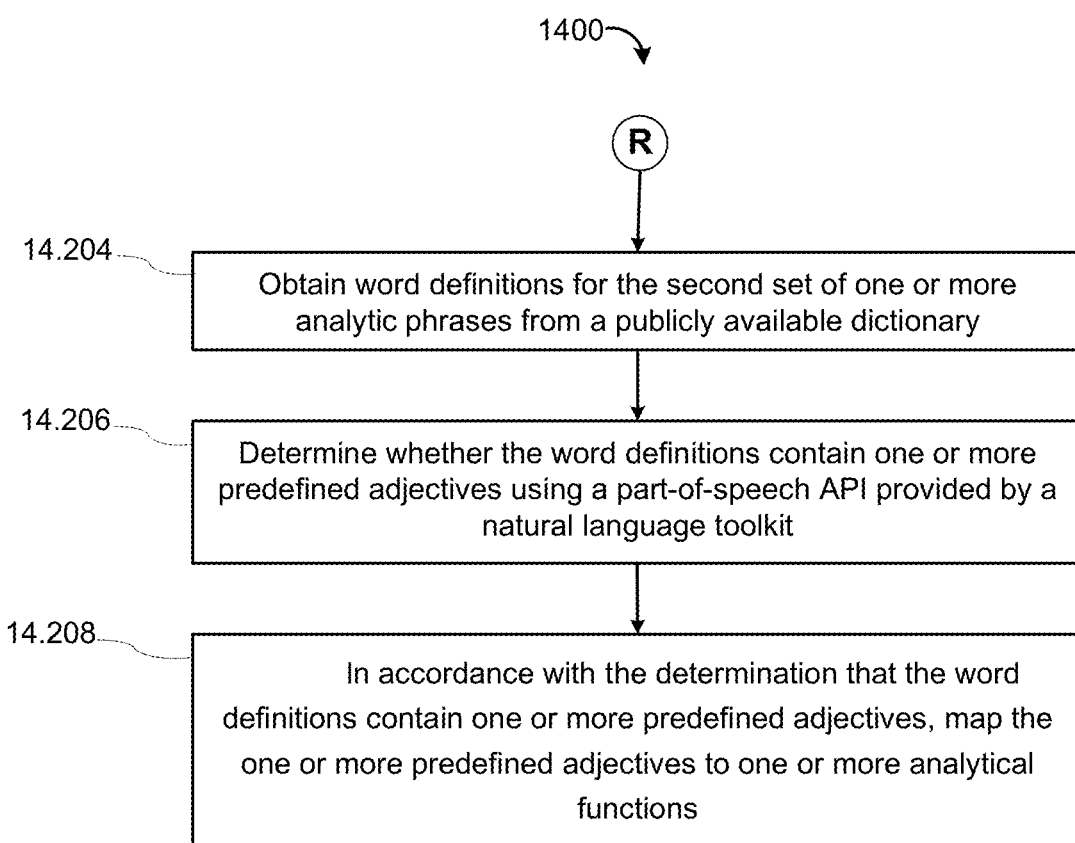

FIGS. 14A-14R provide a flow diagram illustrating a method 1400 of using (1402) natural language for visual analysis of a dataset applying principles of pragmatics, including for handling various forms of pragmatics, according to some implementations. The steps of the method 1400 may be performed by a computer (e.g., a computing device 200). In some implementations, the computer includes (1404) a display, one or more processors, and memory. FIGS. 14A-14R correspond to instructions stored in a computer memory or a computer-readable storage medium (e.g., the memory 206 of the computing device 200). The memory stores (1406) one or more programs configured for execution by the one or more processors (e.g., the processor(s) 202). For example, the operations of the method 1400 are performed, at least in part, by a data visualization generation module 234 and/or a language processing module 238.

In some implementations, the computer displays (1408) a data visualization based on a dataset retrieved from a database using a first set of one or more queries. For example, referring to FIG. 1, a user may associate one or more data fields from a schema information region 110 with one or more shelves (e.g., the column shelf 120 and the row shelf 122, FIG. 1) in the data visualization region 112. In response to receiving the user associations, in some implementations, the computer retrieves data for the data fields from the dataset using a set of one or more queries and then displays a data visualization (e.g., the data visualization 408) in the data visualization region 112 that corresponds to the received user inputs. Displaying data visualizations is discussed in further detail above with reference to FIG. 1.

The computer receives (1410) a first user input to specify a first natural language command related to the displayed data visualization. In some implementations, the user input is received as text input (e.g., a via keyboard 216 or via touch sensitive display 214) from a user in a data-entry region on the display in proximity to the displayed data visualization. In some implementations, the user input is received as a voice command using a microphone (e.g., an audio input device 220) coupled to the computer. For example, referring to FIG. 6A, the displayed data visualization 608 concerns houses less than 1M in Ballard. Receiving inputs (e.g., commands/queries) from a user is discussed in further detail above with reference to FIG. 1.

Based on the displayed data visualization, the computer extracts (1412) a first set of one or more independent analytic phrases from the first natural language command. For example, referring to FIG. 6A, the first natural language command received by the computer reads, "houses less than 1M in Ballard." The data visualization displayed prior to receiving the first natural language command concerns past home sales in Seattle. In some implementations, the computer extracts "houses" and "less than 1M" and "in Ballard" from the first natural language command because these analytic phrases relate to the displayed data visualization. When the phrases have direct reference to data fields in the displayed data visualization, extraction (1412) is straight forward: collect all phrases that are direct references to data fields. In some implementations, the computer stems or removes stop words, filler words, or any predefined set of words from the incoming query, and extracts (1412) all other phrases from the first natural language command because they may be related to the displayed data visualization. Some implementations use this approach when the phrases in the natural language command have some indirect reference to the data fields in the displayed visualization.

The language processing module 238 computes (1414) a first set of one or more conversation centers associated with the first natural language command based on the first set of one or more analytic phrases, in accordance with some implementations. A framework based on a conversational interaction model is described above in reference to FIGS. 3A, 5, and 11. A center refers to those entities serving to link that utterance (sometimes herein called a natural language command) to other utterances in a discourse (a series of utterances). Conversation centers include data attributes and values, visual properties, and analytical actions. Computing conversation centers based on the analytic phrases includes mapping the analytic phrases to one or more conversation centers after necessary transformations and analysis. For the example utterance "houses less than 1M in Ballard," the language processing module 238 processes the phrase "less than 1M" and analyzes the phrase to infer that it refers to the data attribute LAST_SALE_PRICE as shown in FIG. 6C described above.

Subsequently, the language processing module 238 computes (1416) a first set of analytic functions associated with the first set of one or more conversation centers, thereby creating a first set of one or more functional phrases, in accordance with some implementations. As described above in reference to FIGS. 3A, 5, and 11, analytical functions each consist of a variable, an operator, and a value, according to some implementations. In some implementations, for the example utterance "houses less than 1M in Ballard," the language processing module 238 creates two functions, creates four functions F_CAT(homeType, ==condo), F_CAT (homeType, ==townhouse), F_CAT(homeType==single), and F_NUMERIC(price, <, 500000). In this example, the language processing module 238 searches one or more data attributes related to the displayed data visualization that correspond to the first set of one or more conversation centers to identify a first set of data attributes, according to some implementations. The language processing module 238 also identifies, by examining the first set of one or more conversation centers, a first set of operators (e.g., operator ==, operator <) and a first set of values corresponding to the first set of data attributes, according to some implementations. With the first set of variables (attributes), and the corresponding first set of operators and first set of values, the language processing module 238 constructs the first set of one or more analytical functions, thereby creating the first set of one or more functional phrases.

In some implementations, the computer updates (1418) the data visualization based on the first set of one or more functional phrases computed in step 1416.

Referring now to FIG. 14B, the computer receives (1420) a second user input to specify a second natural language command related to the displayed data visualization. In some implementations, the user input is received as text input (e.g., a via keyboard 216 or via touch sensitive display 214) from a user in a data-entry region on the display in proximity to the displayed data visualization. In some implementations, the user input is received as a voice command using a microphone (e.g., an audio input device 220) coupled to the computer. For example, referring to FIG. 6A, the displayed data visualization 608 concerns houses less than 1M in Ballard, when the computer receives the second user input "townhomes." Receiving inputs (e.g., commands/ queries) from a user is discussed in further detail above with reference to FIG. 1.

Based on the displayed data visualization, the computer extracts (1422) a second set of one or more independent analytic phrases from the second natural language command. For example, referring to FIG. 6A, the second natural language command (620) received by the computer reads, "townhomes." In some implementations, for this example, the computer extracts "townhomes" from the second natural language command because this analytic phrase relates to the displayed data visualization (that concerns townhomes in Ballard). When the phrases have direct reference to data fields in the displayed data visualization, extraction (1422) is straight forward: collect all phrases that are direct references to data fields. In some implementations, the computer stems or removes stop words, filler words, or any predefined set of words from the incoming query, and extracts (1422) all other phrases from the second natural language command because they may be related to the displayed data visualization. Some implementations use this approach when the phrases in the natural language command have some indirect reference to the data fields in the displayed visualization.

The language processing module computes (1424) a temporary set of one or more conversation centers associated with the second natural language command based on the second set of one or more analytic phrases, in accordance with some implementations.

The language processing module computes (1426) cohesion between the first set of one or more analytic phrases and the second set of one or more analytic phrases and derives a second set of one or more conversation centers from the first set of one or more conversation centers and the temporary set of one or more conversation centers based on the cohesion, in accordance with some implementations. As shown in FIG. 14C, in some implementations, computing cohesion comprises identifying (1434) a phrase structure of the second set of one or more analytic phrases. Computing phrase structure is described above in reference to FIG. 5 (steps 522 or 510), and via the example in FIG. 6A (steps 610 and 622), according to some implementations. In some implementations, identifying the phrase structure comprises parsing (1436) the second natural language command applying a probabilistic grammar (as explained above with reference to 522 or 510, FIG. 5), thereby obtaining a parsed output. In some implementations, this step further comprises deducing (1438) syntactic structure by employing a part-of-speech API provided by a natural language toolkit, again as described above with reference to FIG. 5. In some implementations, the parsed output is resolved (1440) by the language processing module to corresponding categorical and data attributes. For example, for the utterance "townhomes" (620) in FIG. 6A, the language processing module resolves the categorical attribute to be home (or house) type. In some implementations, although not shown, the language processing module resolves the parsed output to corresponding categorical and data attributes after step 1442.

Whence the phrase structure is identified in step 1434, the language processing module identifies one or more forms of pragmatic forms based on the phrase structure, according to some implementations. Subsequently, the language processing module derives (1446) the second set of one or more conversation centers from the first set of one or more conversation centers and the temporary set of one or more conversation centers based on the identified one or more forms of pragmatics. FIGS. 14D, 14E, 14H, and 14I described below illustrate how different types of pragmatic forms are identified and how the second set of one or more conversation centers are identified based on the identified form of pragmatics.

In some implementations, the language processing module 238 computes (1430) a second set of one or more analytical functions associated with the second set of one or more conversation centers, thereby creating a second set of one or more functional phrases. The language processing module 238 performs this step, using the second set of one or more conversation centers computed in step 1426, in a manner similar to step 1416 described above.

In some implementations, as shown in FIG. 14P, the language processing module 238 computes (14.186) semantic relatedness between the second set of one or more extracted analytic phrases and one or more attributes of data included in the updated data visualization, and computes (14.188) analytical functions associated with the second set of one or more analytic phrases, thereby creating the second set of one or more functional phrases, based on the semantically related one or more attributes of data. In some implementations, the language processing module 238 computes semantically related terms for lexically cohesive expressions. The process of computing semantic relatedness and computing the analytical functions based on semantic relatedness was described above in reference to FIGS. 9A-9D. In some implementations, although not shown in FIG. 14B, computing the second set of one or more analytical functions and the second set of one or more functional phrases based on semantic relatedness of data attributes is performed in addition to (rather than as an alternative to) step 1430 described above.

In some implementations, as shown in FIG. 14Q, the language processing module 238 computes semantic relatedness by training (14.190) a first neural network model on a large corpus of text, thereby learning word embeddings. In some such implementations (14.192), the first neural network model comprises Word2vec™ model. In some implementations, the language processing module 238 computes (1494) a first word vector for a first word in a first phrase in the second set of one or more analytic phrases using a second neural network model, the first word vector mapping the first word to the word embeddings learn in step 14.190. In some such implementations (14.196), the second neural network model comprises recurrent neural network model. In some implementations, the language processing module computes (14.198) a second word vector for a first data attribute in the one or more data attributes using the second neural network model, the second word vector mapping the first data attribute to the word embeddings learnt in step 14.190. Although not shown in FIG. 14Q, computing the first word vector and the second word vector can be in performed in parallel by the language processing module 238. Subsequently, the language processing module computes (14.200) relatedness between the first word vector and the second word vector using a similarity metric, according to some implementations. In some such implementations (14.202), the similarity metric is based at least on (i) Wu-Palmer distance between word senses associated with the first word vector and the second word vector, (ii) a weighting factor, and (iii) a pairwise cosine distance between the first word vector and the second word vector.

In some implementations, as shown in FIG. 14R, the language processing module 238 obtains (14.204) word definitions for the second set of one or more analytic phrases from a publicly available dictionary, determines (14.206) whether the word definitions contain one or more predefined adjectives using a part-of-speech API provided by a natural language toolkit, and, in accordance with the determination that the word definitions contain one or more predefined adjectives, maps the one or more predefined adjectives to one or more analytical functions. These operations were described above in reference to FIG. 9B, in accordance with some implementations. The language processing module 238 computes the type of analytical function for one or more terms in the second set of one or more analytic phrases. For instance, the term "cheapest" is mapped to Bottom_N(sale price).

Referring now back to FIG. 14B, the computer updates (1432) the data visualization based on the second set of one or more functional phrases, in accordance with some implementations.

FIGS. 14D, 14E, 14H, and 14I each show the steps performed by the language processing module 238 to handle different types of pragmatic forms identified based on the phrase structure, and how the second set of one or more conversation centers are derived based on the identified form of pragmatics, in accordance with some implementations.

FIG. 14D shows the steps performed by the language processing module 238 to derive the second set of one or more conversation centers for incomplete utterances, according to some implementations. The language processing module 238 identifies (1448) the pragmatic form to be an incomplete utterance by determining whether one or more linguistic elements are absent in the phrase structure, according to some implementations. In some implementations, subsequently, the language processing module 238 derives (1450) the second set of one or more conversation centers by performing a sequence of operations (1452) that includes: determining (1454) a first subset of conversation centers in the first set of one or more conversation centers, the first subset of conversation centers corresponding to the one or more linguistic elements absent in the phrase structure, and computing (1456) the second set of one or more conversation centers by combining the temporary set of one or more conversation centers with the first subset of conversation centers. FIG. 6A described above shows an implementation that derives the second set of one or more conversation centers for incomplete utterances.

FIG. 14E shows the steps performed by the language processing module 238 to derive the second set of one or more conversation centers for reference expressions, according to some implementations. The language processing module 238 identifies (1458) the pragmatic form to be a reference expression by determining if one or more anaphoric references is present in the phrase structure, according to some implementations. In some implementations, subsequently, the language processing module 238 derives (1460) the second set of one or more conversation centers by performing a sequence of operations (1462) that includes: searching (1464) the first set of one or more conversation centers to find a first subset of conversation centers that corresponds to a phrasal chunk in the second natural language command that contains a first anaphoric reference of the one or more anaphoric references, and computing (1466) the second set of one or more conversation centers based on the temporary set of one or more conversation centers and the first subset of conversation centers. FIG. 7A described above shows an implementation that derives the second set of one or more conversation centers for reference expressions.

In some implementations, the language processing module 238 determines (1468) whether the first anaphoric reference is a reference to a visualization property in the updated data visualization (sometimes herein called a deictic reference), and, in accordance with a determination that the anaphoric reference is a deictic reference, computes (1470) the second set of one or more conversation centers based on the temporary set of one or more conversation centers, and data related to the visualization property.

In some implementations, as shown in FIG. 14F, the language processing module 238 determines (1472) whether the first anaphoric reference is accompanied by a verb in the second natural language command, and, in accordance with a determination that the anaphoric reference is accompanied by a verb (1474), searches (1476) the first set of one or more conversation centers to find a first action conversation center that refers to an action verb, and computes (1478) the second set of one or more conversation centers based on the temporary set of one or more conversation centers and the first subset of conversation centers.

In some implementations, as shown in FIG. 14G, the language processing module 238 determines (1480) whether the first anaphoric reference is a deictic reference that refers to some object in the environment, and, in accordance with a determination that the anaphoric reference is a deictic reference, computes (1482) the second set of one or more conversation centers based on the temporary set of one or more conversation centers, and a characteristic of the object.

FIG. 14H shows the steps performed by the language processing module 238 to derive the second set of one or more conversation centers for repair utterances, according to some implementations. The language processing module 238 identifies (1484) the pragmatic form to be a repair utterance by determining if the phrase structure corresponds to one or more predefined repair utterances, according to some implementations. In some implementations, subsequently, the language processing module 238 derives (1486) the second set of one or more conversation centers by performing a sequence of operations (1488) that includes: computing (1490) the second set of one or more conversation centers based on the temporary set of one or more conversation centers, and updating (1492) one or more data attributes in the second set of one or more conversation centers based on the one or more predefined repair utterances and the phrase structure. FIG. 10A described above shows an implementation that derives the second set of one or more conversation centers for repair utterances.

In some implementations, the language processing module 238 determines (1494) whether the phrase structure corresponds to a repair utterance to change a default behavior related to displaying a data visualization, and, in accordance with a determination that the phrase structure corresponds to a repair utterance to change a default behavior, changes (1496) the default behavior related to displaying.

FIG. 14I shows the steps performed by the language processing module 238 to derive the second set of one or more conversation centers for conjunctive expressions, according to some implementations. The language processing module 238 identifies (1498) the pragmatic form to be a conjunctive expression by determining if the second natural language command is a conjunctive expression by (i) determining explicit or implicit presence of conjunctions in the phrase structure, and (ii) determining if the temporary set of one or more conversation centers includes each conversation center in the first set of one or more conversation centers, according to some implementations. In some implementations, subsequently, the language processing module 238 derives (14.100) the second set of one or more conversation centers by computing (14.104) the second set of one or more conversation centers based on the temporary set of one or more conversation centers, in accordance with the determination (14.102) that the second natural language command is a conjunctive expression. FIG. 8A described above shows an implementation that derives the second set of one or more conversation centers for utterances with conjunctions.

In some implementations, the language processing module 238 determines (14.106) whether the second natural language command has more than one conjunct, and, in accordance with the determination that the second natural language command has more than one conjunct, computes (14.108) the second set of one or more analytical functions by linearizing the second natural language command.

In some implementations, the language processing module 238 linearizes the second natural language command by performing a sequence of operations shown in FIG. 14J. The sequence of operations includes generating (14.110) a parse tree for the second natural language command, traversing (14.112) the parse tree in post-order to extract a first analytic phrase and a second analytic phrase, wherein the first analytic phrase and the second analytic phrase are adjacent nodes in the parse tree, and combining (14.114) the first analytical function with the second analytical function by applying one or more logical operators based on one or more characteristics of the first analytical function and the second analytic function, wherein the one or more characteristics include attribute type, operator type, and a value.

FIGS. 14K-14O each illustrate different instances of the last step (14.114) of combining the first analytical function with the second analytical function, according to some implementations. In each case (as shown by the labels 14.116, 14.126, 14.36, 14.150, and 14.168 in the respective figures), the first analytical function comprises a first attribute, a first operator, and a first value; the second analytical function comprises a second attribute, a second operator, and a second value.

In FIG. 14K, the language processing module 238 combines (14.118) the first analytical function with the second analytical function by performing a sequence of operations, according to some implementations. The sequence of operations includes: determining (14.120) whether the first attribute is a categorical type attribute or an ordered type attribute, and determining whether the second attribute is a categorical type attribute or an ordered type attribute, determining (14.122) whether the first attribute and the second attribute are identical, in accordance with a determination that the first attribute and the second attribute are identical and are both categorical type attributes, applying (14.124) a union operator to combine the first analytical function and the second analytical function.

In FIG. 14L, the language processing module 238 combines (14.128) the first analytical function with the second analytical function by performing a sequence of operations, according to some implementations. The sequence of operations includes: determining (14.130) whether the first attribute is a categorical type attribute or an ordered type attribute, and determining whether the second attribute is a categorical type attribute or an ordered type attribute, determining (14.132) whether the first attribute and the second attribute are identical, in accordance with a determination that the first attribute and the second attribute are non-identical, applying (14.134) the intersection operator to combine the first analytical function and the second analytical function.

In FIG. 14M, the language processing module 238 combines (14.138) the first analytical function with the second analytical function by performing a sequence of operations, according to some implementations. The sequence of operations includes: determining (14.140) whether the first attribute is a categorical type attribute or an ordered type attribute, and determining whether the second attribute is a categorical type attribute or an ordered type attribute, determining (14.142) whether the first attribute and the second attribute are identical, in accordance with a determination that the first attribute and the second attribute are identical and are both ordered type attributes (14.144): determining (14.146) the operator types of the first operator and the second operator, and, in accordance with a determination that the first operator and the second operator are both equality operators, applying (14.148) the union operator to combine the first analytical function and the second analytical function.

In FIG. 14N, the language processing module 238 combines (14.152) the first analytical function with the second analytical function by performing a sequence of operations, according to some implementations. The sequence of operations includes: determining (14.154) whether the first attribute is a categorical type attribute or an ordered type attribute, and determining whether the second attribute is a categorical type attribute or an ordered type attribute, determining (14.156) whether the first attribute and the second attribute are identical, and, in accordance with a determination that the first attribute and the second attribute are identical and are both ordered type attributes: determining (14.160) the operator types of the first operator and the second operator; in accordance with a determination that the first operator is a "less than" operator and the second operator is a "greater than" operator (14.162): determining (14.164) whether the first value is less than the second value, and, in accordance with a determination that the first value is less than the second value, applying (14.166) the union operator to combine the first analytical function and the second analytical function.

In FIG. 14O, the language processing module 238 combines (14.170) the first analytical function with the second analytical function by performing a sequence of operations, according to some implementations. The sequence of operations includes: determining (14.172) whether the first attribute is a categorical type attribute or an ordered type attribute, and determining whether the second attribute is a categorical type attribute or an ordered type attribute, determining (14.174) whether the first attribute and the second attribute are identical, in accordance with a determination that the first attribute and the second attribute are identical and are both ordered type attributes (14.176): determining (14.178) the operator types of the first operator and the second operator; in accordance with a determination that the first operator is a "greater than" operator and the second operator is a "lesser than" operator (14.180): determining (14.182) whether the first value is less than the second value, and in accordance with a determination that the first value is less than the second value, applying (14.184) the intersection operator to combine the first analytical function and the second analytical function.

FIGS. 15A-15H provide a flowchart of a process (method 1500) that uses (1502) natural language for visual analysis of a dataset applying pragmatics principles, including for handling responses and feedback, and for handling ambiguity in a user query, according to some implementations. The steps of the method 1500 may be performed by a computer (e.g., a computing device 200). In some implementations, the computer includes (1504) a display, one or more processors, and memory. FIGS. 15A-15H correspond to instructions stored in a computer memory or computer-readable storage medium (e.g., the memory 206 of the computing device 200). The memory stores (1506) one or more programs configured for execution by the one or more processors (e.g., the processor(s) 202). For example, the operations of the method 1500 are performed, at least in part, by a data visualization generation module 234 and/or a language processing module 238.

In some implementations, the computer displays (1508) a data visualization based on a dataset retrieved from a database using a first set of one or more queries. For example, referring to FIG. 1, a user may associate one or more data fields from a schema information region 110 with one or more shelves (e.g., the column shelf 120 and the row shelf 122, FIG. 1) in the data visualization region 112. In response to receiving the user associations, in some implementations, the computer retrieves data for the data fields from the dataset using a set of one or more queries and then displays a data visualization (e.g., the data visualization 408) in the data visualization region 112 that corresponds to the received user inputs. Displaying data visualizations is discussed in further detail above with reference to FIG. 1.

The computer receives (1510) a first user input to specify a first natural language command related to the displayed data visualization. In some implementations, the user input is received as text input (e.g., a via keyboard 216 or via touch sensitive display 214) from a user in a data-entry region on the display in proximity to the displayed data visualization. In some implementations, the user input is received as a voice command using a microphone (e.g., an audio input device 220) coupled to the computer. For example, referring to FIG. 6A, the displayed data visualization 608 concerns houses less than 1M in Ballard. Receiving inputs (e.g., commands/queries) from a user is discussed in further detail above with reference to FIG. 1.

Based on the displayed data visualization, the computer extracts (1512) a first set of one or more independent analytic phrases from the first natural language command. For example, referring to FIG. 6A, the first natural language command received by the computer reads, "houses less than 1M in Ballard." The data visualization displayed prior to receiving the first natural language command concerns past home sales in Seattle. In some implementations, the computer extracts "houses" and "less than 1M" and "in Ballard" from the first natural language command because these analytic phrases relate to the displayed data visualization. When the phrases have direct reference to data fields in the displayed data visualization, extraction (1512) is straight forward: collect all phrases that are direct references to data fields. In some implementations, the computer stems or removes stop words, filler words, or any predefined set of words from the incoming query, and extracts (1412) all other phrases from the first natural language command because they may be related to the displayed data visualization. Some implementations use this approach when the phrases in the natural language command have some indirect reference to the data fields in the displayed visualization.

The language processing module 238 computes (1514) a first set of one or more conversation centers associated with the first natural language command based on the first set of one or more analytic phrases, in accordance with some implementations. A framework based on a conversational interaction model is described above in reference to FIGS. 3A, 5, and 11. A center refers to those entities serving to link that utterance (sometimes herein called a natural language command) to other utterances in a discourse (a series of utterances). Conversation centers include data attributes and values, visual properties, and analytical actions. Computing conversation centers based on the analytic phrases includes mapping the analytic phrases to one or more conversation centers after necessary transformations and analysis. For the example utterance "houses less than 1M in Ballard," the language processing module 238 processes the phrase "less than 1M" and analyzes the phrase to infer that it refers to the data attribute LAST_SALE_PRICE as shown in FIG. 6C described above.

Subsequently, the language processing module 238 computes (1516) a first set of analytic functions associated with the first set of one or more conversation centers, thereby creating a first set of one or more functional phrases, in accordance with some implementations. As described above in reference to FIGS. 3A, 5, and 11, analytical functions each consist of a variable, an operator, and a value, according to some implementations. In some implementations, for the example utterance "houses less than 1M in Ballard," the language processing module 238 creates two functions, creates four functions F_CAT(homeType, ==condo), F_CAT (homeType, ==townhouse), F_CAT(homeType==single), and F_NUMERIC(price, <, 500000). In this example, the language processing module 238 searches one or more data attributes related to the displayed data visualization that correspond to the first set of one or more conversation centers to identify a first set of data attributes, according to some implementations. The language processing module 238 also identifies, by examining the first set of one or more conversation centers, a first set of operators (e.g., operator ==, operator <) and a first set of values corresponding to the first set of data attributes, according to some implementations. With the first set of variables (attributes), and the corresponding first set of operators and first set of values, the language processing module 238 constructs the first set of one or more analytical functions, thereby creating the first set of one or more functional phrases.

In some implementations, the computer updates (1518) the data visualization based on the first set of one or more functional phrases computed in step 1516.

Figure 15A:
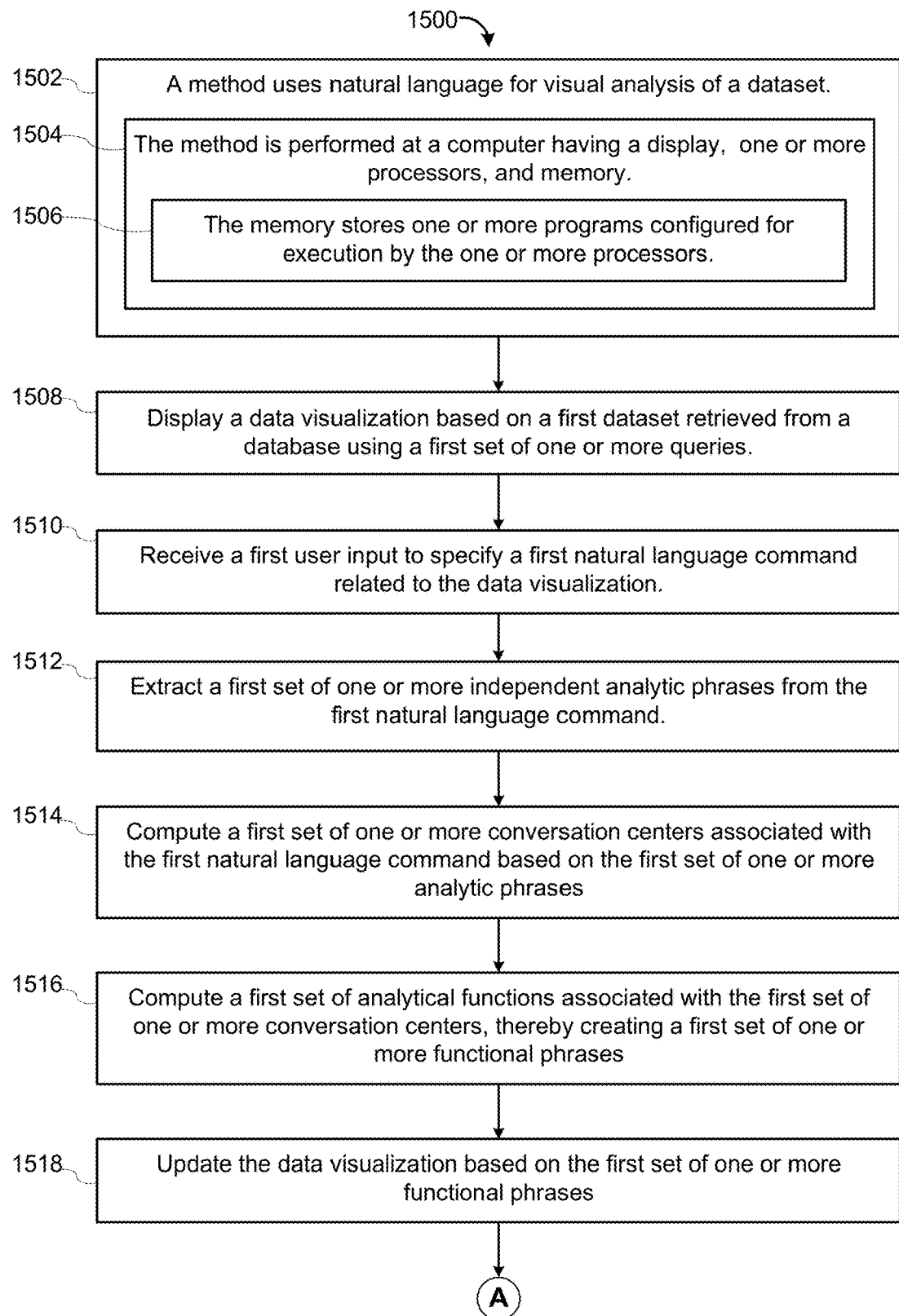
FIGS. 15A-15H provide a flowchart of a process that uses natural language for visual analysis of a dataset applying pragmatics principles, including for handling responses and feedback, and for handling ambiguity in a user query, according to some implementations.
Figure 15B:
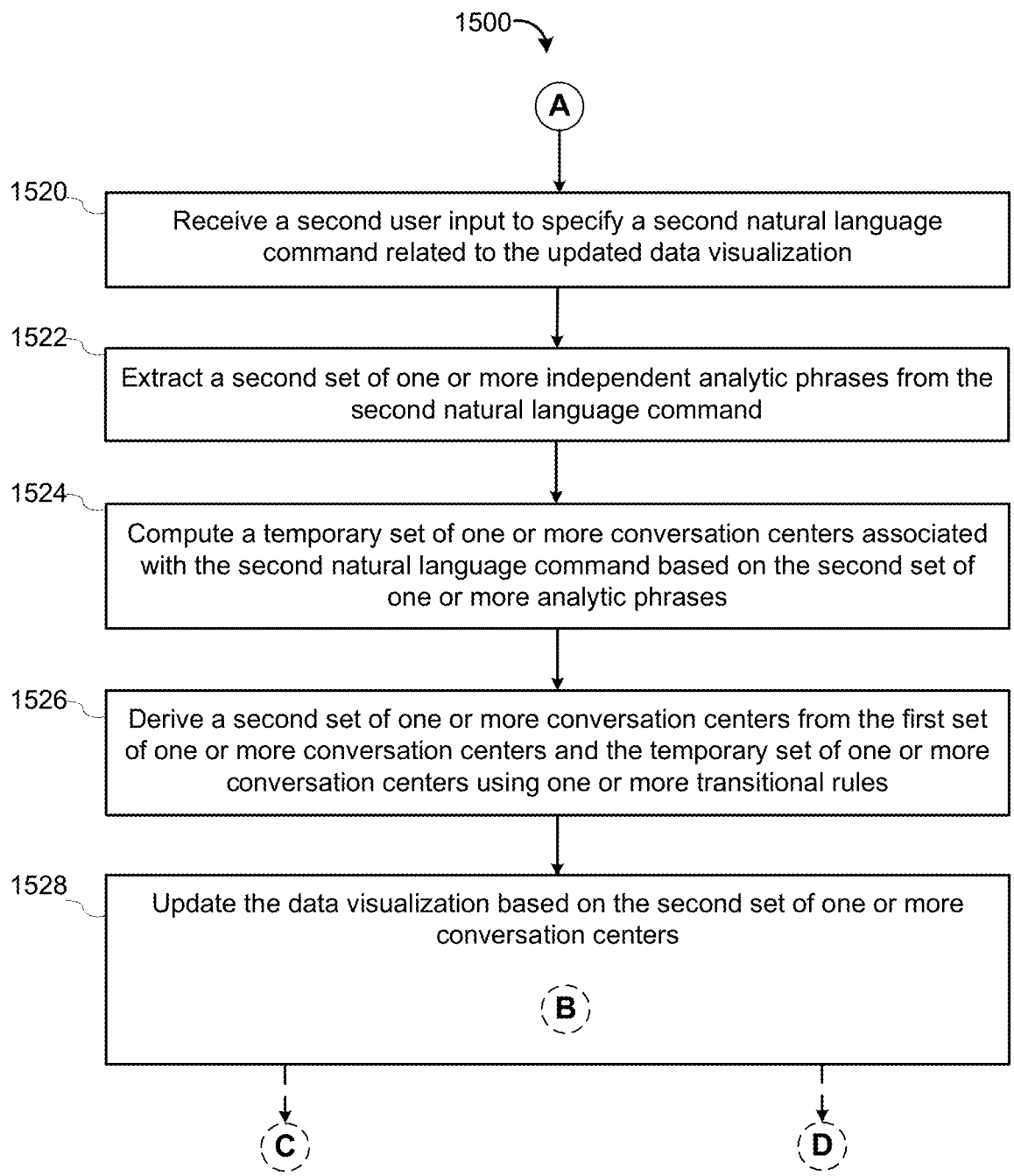

Referring now to FIG. 15B, the computer receives (1520) a second user input to specify a second natural language command related to the displayed data visualization. In some implementations, the user input is received as text input (e.g., a via keyboard 216 or via touch sensitive display 214) from a user in a data-entry region on the display in proximity to the displayed data visualization. In some implementations, the user input is received as a voice command using a microphone (e.g., an audio input device 220) coupled to the computer. For example, referring to FIG. 6A, the displayed data visualization 608 concerns houses less than 1M in Ballard, when the computer receives the second user input "townhomes." Receiving inputs (e.g., commands/queries) from a user is discussed in further detail above with reference to FIG. 1.

Based on the displayed data visualization, the computer extracts (1522) a second set of one or more independent analytic phrases from the second natural language command. For example, referring to FIG. 6A, the second natural language command (620) received by the computer reads, "townhomes." In some implementations, for this example, the computer extracts "townhomes" from the second natural language command because this analytic phrase relates to the displayed data visualization (that concerns townhomes in Ballard). When the phrases have direct reference to data fields in the displayed data visualization, extraction (1522) is straight forward: collect all phrases that are direct references to data fields. In some implementations, the computer stems or removes stop words, filler words, or any predefined set of words from the incoming query, and extracts (1522) all other phrases from the second natural language command because they may be related to the displayed data visualization. Some implementations use this approach when the phrases in the natural language command have some indirect reference to the data fields in the displayed visualization.

The language processing module computes (1524) a temporary set of one or more conversation centers associated with the second natural language command based on the second set of one or more analytic phrases, in accordance with some implementations.

The language processing module derives (1526) a second set of one or more conversation centers from the first set of one or more conversation centers and the temporary set of one or more conversation centers using one or more transitional rules, in accordance with some implementations.

The computer updates (1528) the data visualization based on the second set of one or more functional phrases, in accordance with some implementations.

Figure 15C:
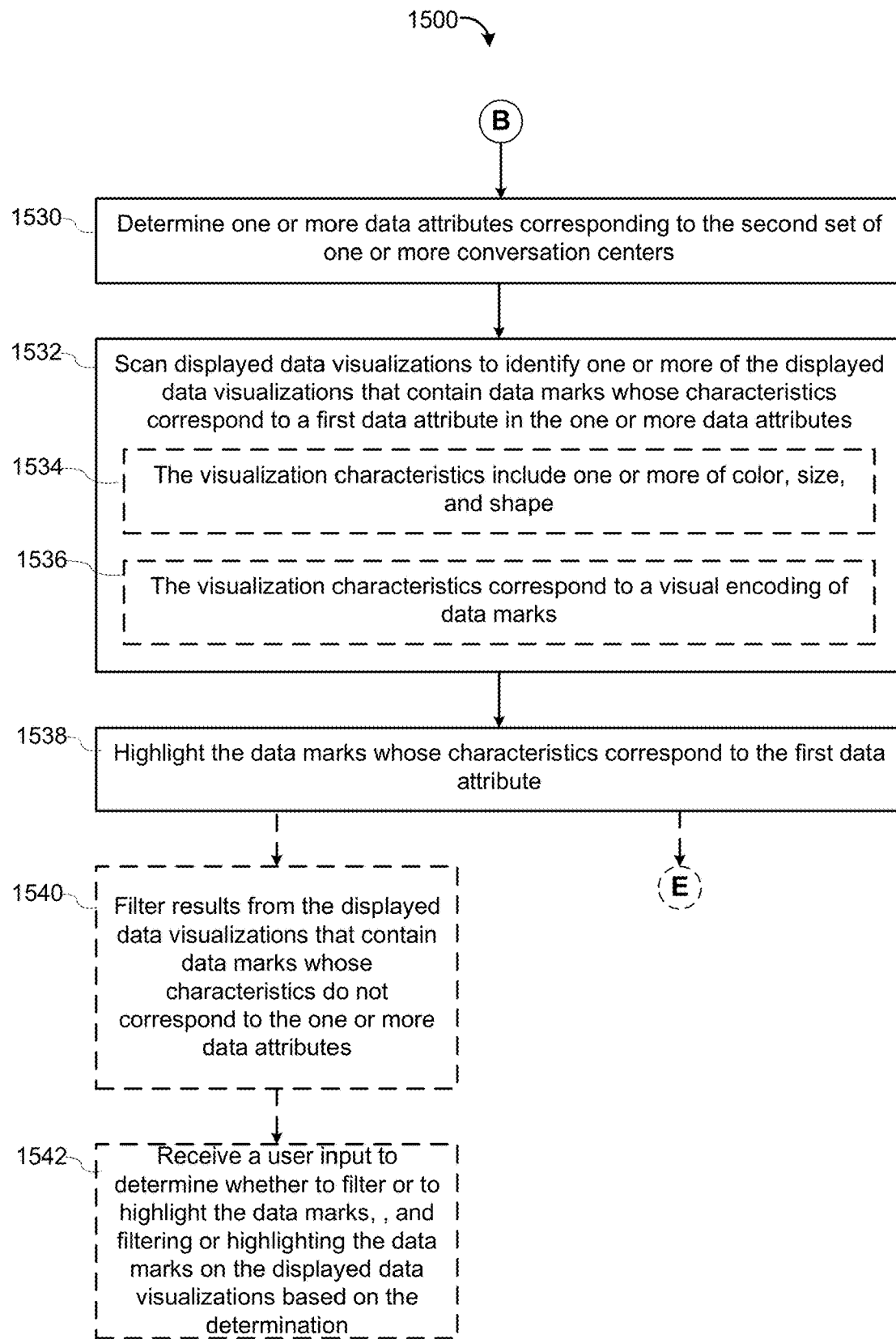

Referring to FIG. 15C, in some implementations, the language processing module 238 determines (1530) one or more data attributes corresponding to the second set of one or more conversation centers. The language processing module 238 then scans (1532) displayed data visualizations to identify one or more of the displayed data visualizations that contain data marks whose characteristics correspond to a first data attribute in the one or more data attributes, according to some implementations. In some such implementations (1534), the visualization characteristics include one or more of color, size, and shape. In some such implementations (1536), the visualization characteristics correspond to a visual encoding of data marks.

Subsequently, the computer highlights (1538) the data marks whose characteristics correspond to the first data attribute, in accordance with some implementations. In some such implementations, the computer filters (1540) results from the displayed data visualizations that contain data marks whose characteristics do not correspond to the one or more data attributes. Further, in some such implementations, the computer receives (1542) a user input to determine whether to filter or to highlight the data marks and filters or highlights the data marks on the displayed data visualizations based on the determination. FIG. 11A described above showed an example application of pragmatic principles for handling responses and feedback according to some implementations. The descriptions for FIG. 11A apply to the steps shown in FIG. 15C. For example, step 1102 in FIG. 11A to create a list of all data attributes corresponds to step 1530 to determine one or more data attributes. Similarly, step 1106 to decide which of the existing visualization encode a respective attribute correspond to step 1532 for scanning the displayed data visualizations.

Figure 15D:
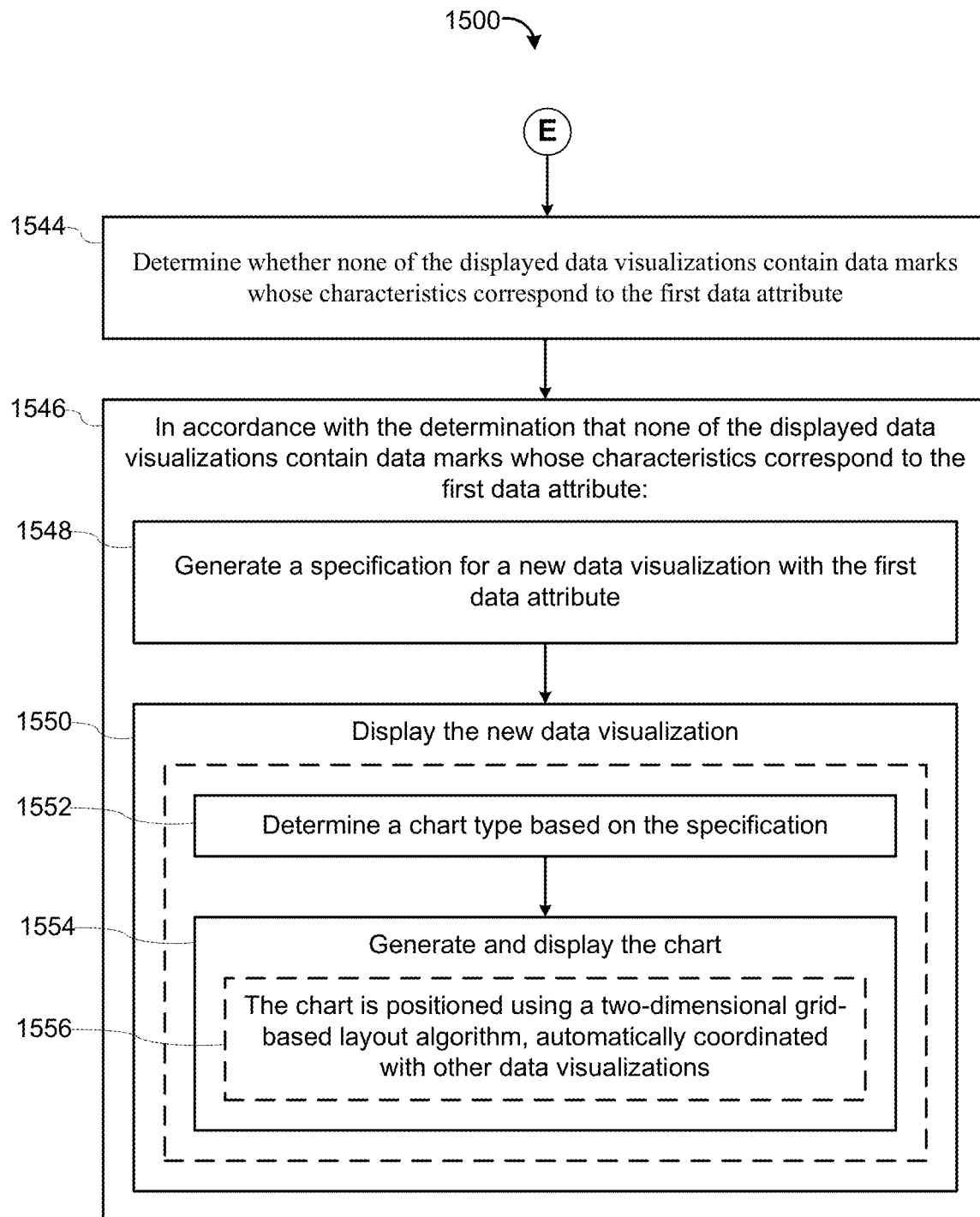

Referring now to FIG. 15D, in some implementations, the computer determines (1544) whether none of the displayed data visualizations contain data marks whose characteristics correspond to the first data attribute. In some implementations, in accordance with the determination that none of the displayed data visualizations contain data marks whose characteristics correspond to the first data attribute (1546): the computer generates (1548) a specification for a new data visualization with the first data attribute and displays (1550) the new data visualization. In some implementations, displaying (1550) the new data visualization includes: determining (1552) a chart type based on the specification, and generating and displaying (1554) the chart. In some such implementations (1556), the chart is positioned using a two-dimensional grid-based layout algorithm, automatically coordinated with other data visualizations.

Figure 15E:
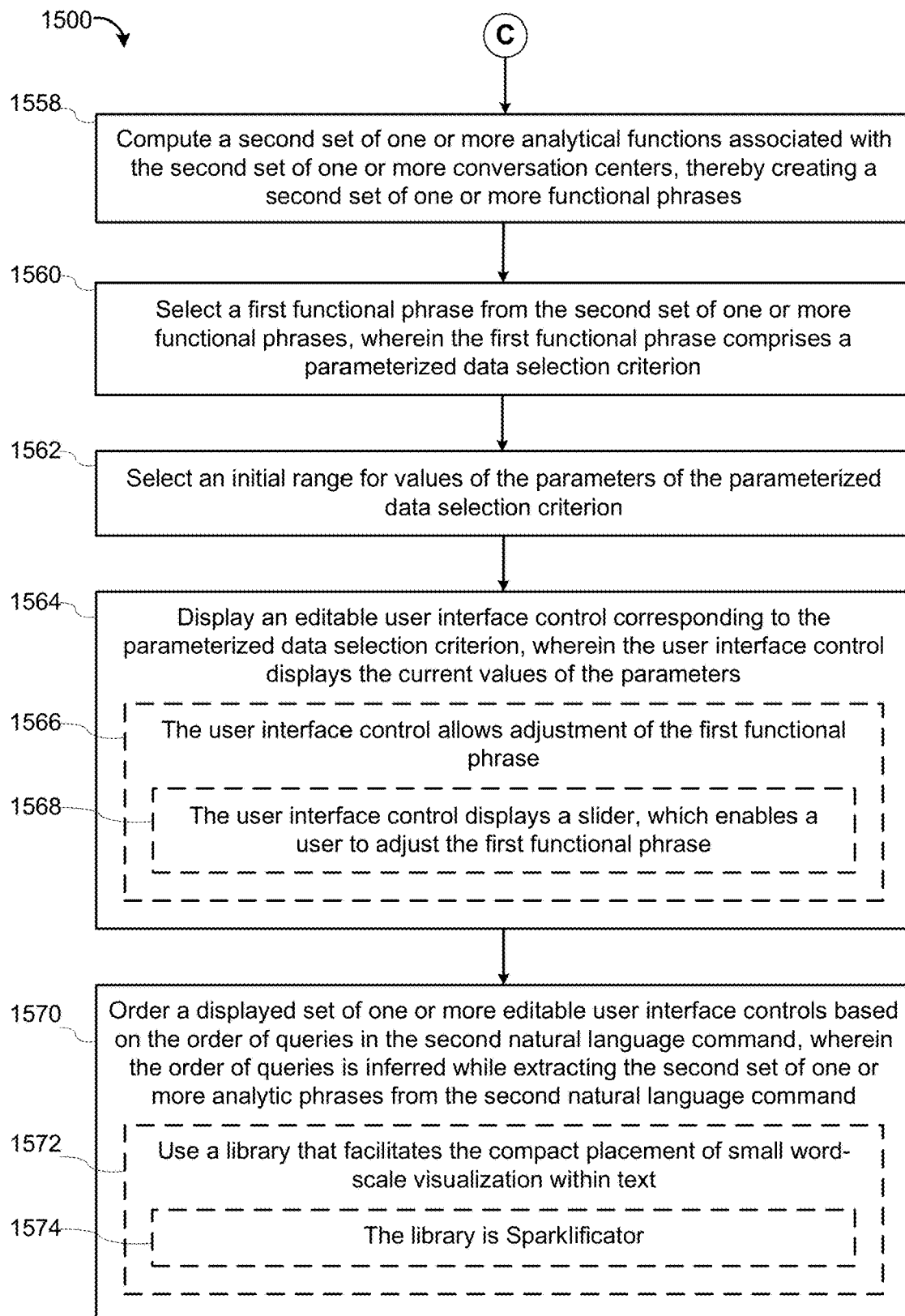

Referring to FIG. 15E, in some implementations, the language processing module 238 computes (1558) a second set of one or more analytical functions associated with the second set of one or more conversation centers, thereby creating a second set of one or more functional phrases. In some implementations, the computer selects (1560) a first functional phrase from the second set of one or more functional phrases, wherein the first functional phrase comprises a parameterized data selection criterion. In some implementations, the computer selects (1562) an initial range for values of the parameters of the parameterized data selection criterion. In some implementations, the computer displays (1564) an editable user interface control corresponding to the parameterized data selection criterion, wherein the user interface control displays the current values of the parameters. In some such implementations (1566), the user interface control allows adjustment of the first functional phrase. Further, in some such implementations (1568), the user interface control displays a slider, which enables a user to adjust the first functional phrase. In some implementations, the computer orders (1570) a displayed set of one or more editable user interface controls based on the order of queries in the second natural language command, wherein the order of queries is inferred while extracting the second set of one or more analytic phrases from the second natural language command. In some such implementations, the computer uses (1572) a library that facilitates the compact placement of small word-scale visualization within text. In some such implementations (1574), the library is Sparklificator™. FIG. 12A described above shows an example illustration of an interface that includes a selectable set of widgets presented to the user, according to some implementations.

Figure 15F:
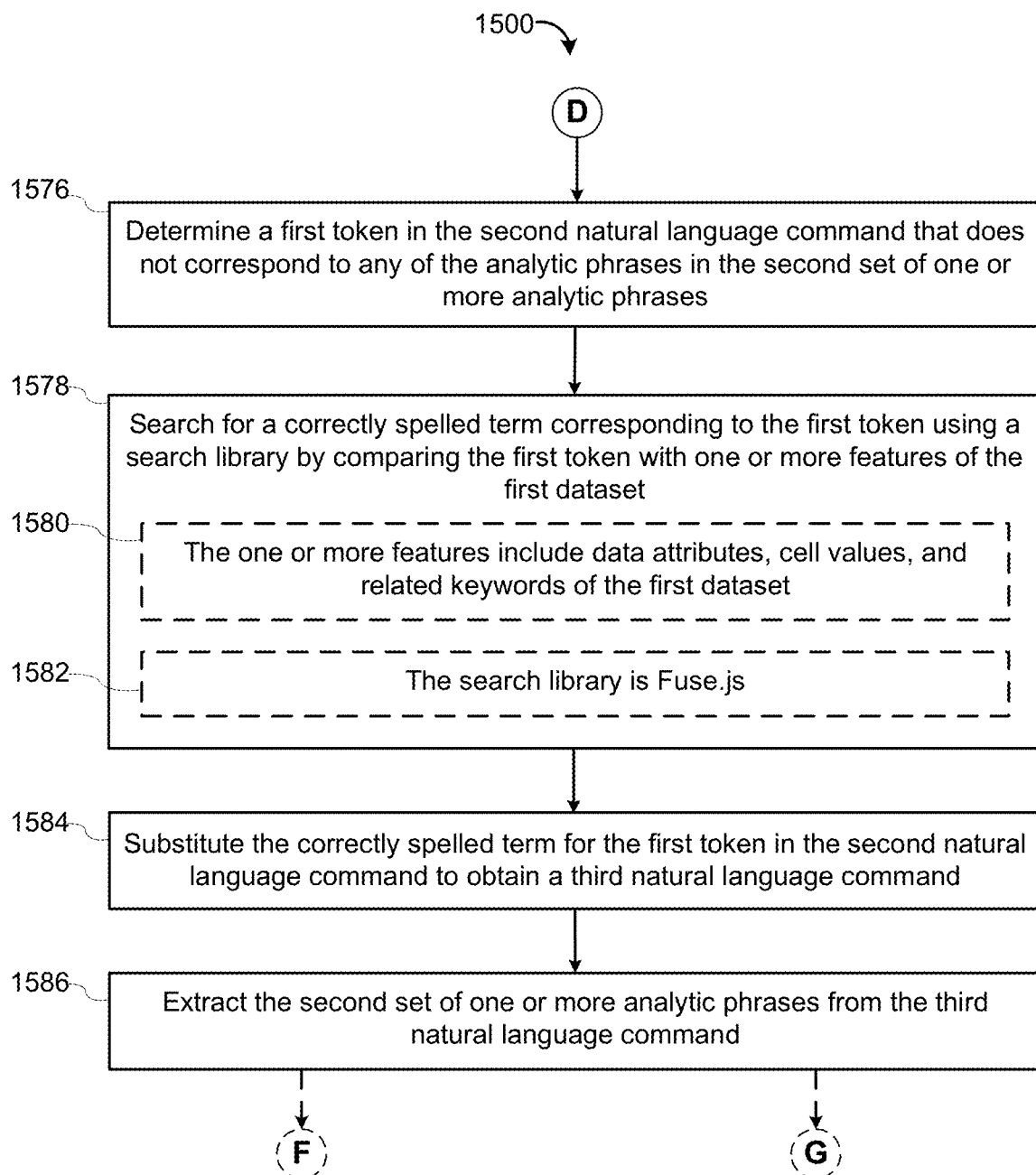

Referring to FIG. 15F, in some implementations, the computer determines (1576) a first token in the second natural language command that does not correspond to any of the analytic phrases in the second set of one or more analytic phrases. In some implementations, the computer searches (1578) for a correctly spelled term corresponding to the first token using a search library by comparing the first token with one or more features of the first dataset. In some such implementations (1580), the one or more features include data attributes, cell values, and related keywords of the first dataset. In some such implementations (1582), the search library is Fuse.js™.

In some implementations, the language processing module 238 substitutes (1584) the correctly spelled term for the first token in the second natural language command to obtain a third natural language command, and extracts (1586) the second set of one or more analytic phrases from the third natural language command.

Figure 15G:
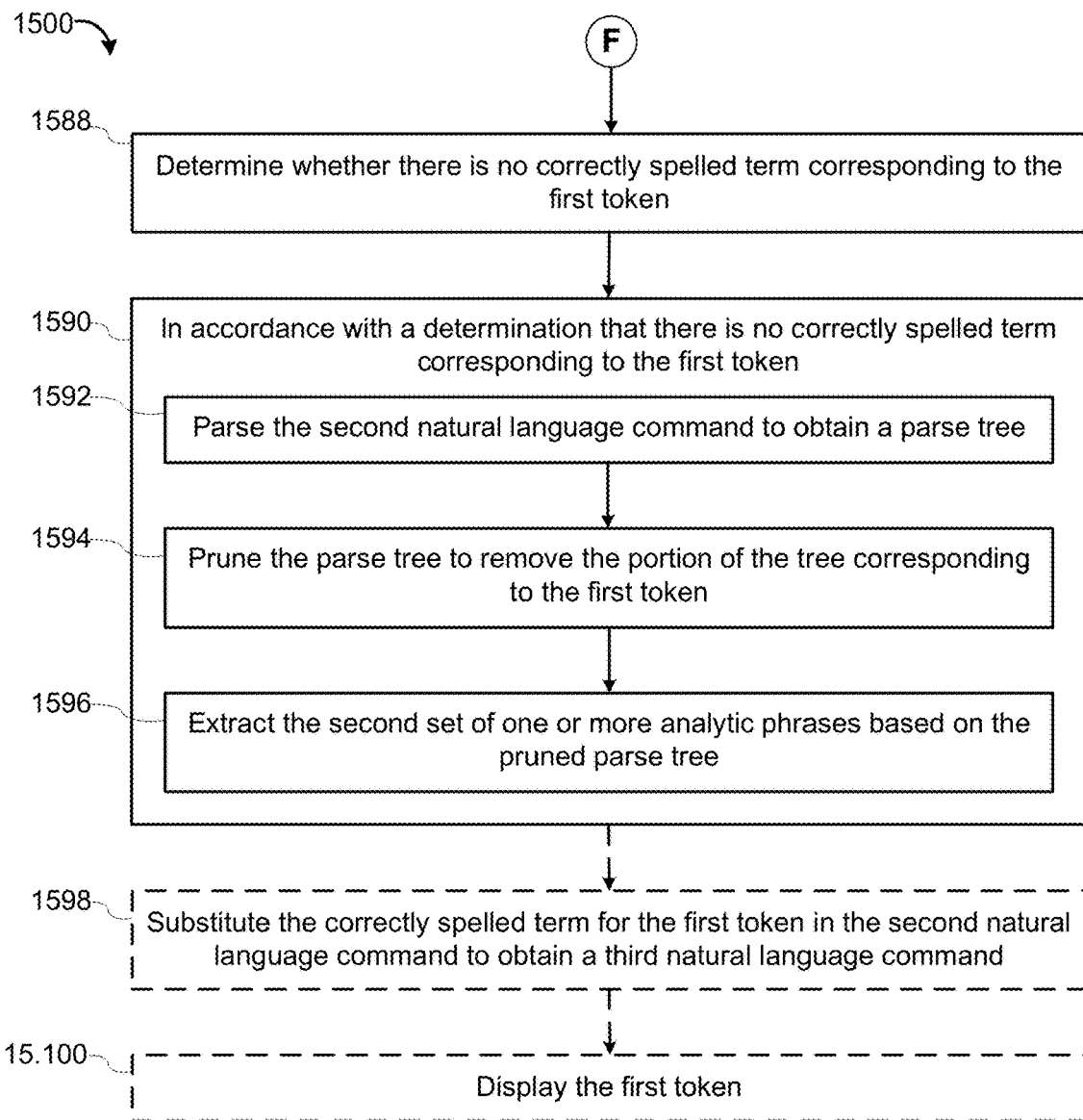

In some implementations, as shown in FIG. 15G, the language processing module 238 determines (1588) whether there is no correctly spelled term corresponding to the first token. In accordance with a determination that there is no correctly spelled term corresponding to the first token (1590), the language processing module parses (1592) the second natural language command to obtain a parse tree, prunes (1594) the parse tree to remove the portion of the tree corresponding to the first token, and extracts (1596) the parse tree to remove the portion of the tree corresponding to the first token. In some such implementations, the language processing module 238 substitutes (1598) the correctly spelled term for the first token in the second natural language command to obtain a third natural language command, and the computer displays (15.100) the first token.

Figure 15H:
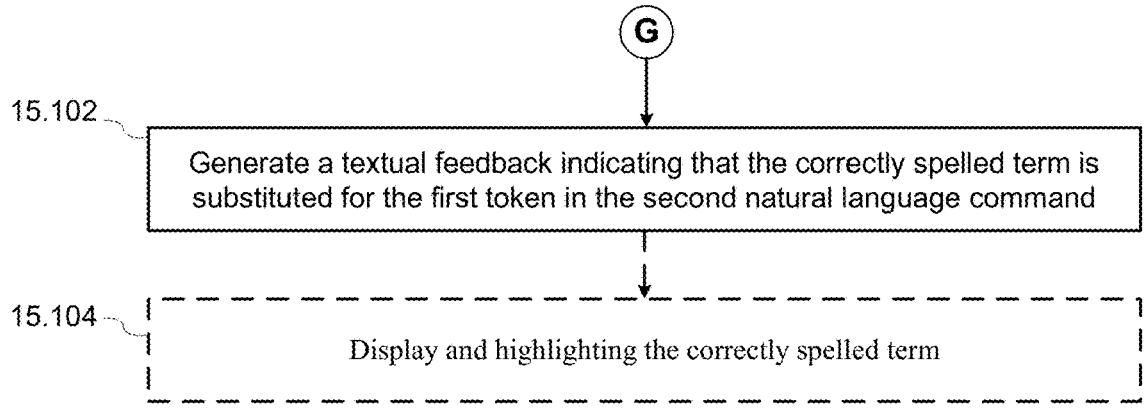

In some implementations, as shown in FIG. 15H, the computer generates (15.102) a textual feedback indicating that the correctly spelled term is substituted for the first token in the second natural language command. Further, in some such implementations, the computer displays (15.104) and highlights the correctly spelled term. FIG. 12B described above shows several example situations and the corresponding feedback generated by the computer, in accordance with some implementations.

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A method of using natural language for visual analysis of a dataset, comprising:
at computer having a display, one or more processors, and memory storing one or more programs configured for execution by the one or more processors:
displaying a data visualization based on a first dataset retrieved from a database using a first set of one or more queries;
receiving a first user input to specify a first natural language command related to the data visualization;
extracting a first set of one or more independent analytic phrases from the first natural language command;
computing a first set of one or more conversation centers associated with the first natural language command based on the first set of one or more analytic phrases;
creating a first set of one or more functional phrases by computing a first set of analytical functions associated with the first set of one or more conversation centers;
updating the data visualization based on the first set of one or more functional phrases;
receiving a second user input to specify a second natural language command related to the updated data visualization;
extracting a second set of one or more independent analytic phrases from the second natural language command;
computing a temporary set of one or more conversation centers associated with the second natural language command based on the second set of one or more analytic phrases;
deriving a second set of one or more conversation centers from the first set of one or more conversation centers and the temporary set of one or more conversation centers using one or more transitional rules; and
updating the data visualization based on the second set of one or more conversation centers, including highlighting or filtering data marks whose characteristics correspond to a data attribute corresponding to the second set of one or more conversation centers.

2. The method of claim 1, wherein updating the data visualization based on the second set of one or more conversation centers comprises:
determining one or more data attributes corresponding to the second set of one or more conversation centers;
scanning displayed data visualizations to identify one or more of the displayed data visualizations that contain data marks whose characteristics correspond to a first data attribute in the one or more data attributes; and
highlighting the data marks whose characteristics correspond to the first data attribute.

3. The method of claim 2, further comprising filtering results from the displayed data visualizations that contain data marks whose characteristics do not correspond to the one or more data attributes.

4. The method of claim 3, further comprising receiving a user input to determine whether to filter or to highlight the data marks, and filtering or highlighting the data marks on the displayed data visualizations based on the determination.

5. The method of claim 2, wherein the visualization characteristics include one or more of color, size, and shape.

6. The method of claim 2, wherein the visualization characteristics correspond to a visual encoding of data marks.

7. The method of claim 6, wherein the visual encoding is one or more of color, size, and shape.

8. The method of claim 2, further comprising:
determining whether none of the displayed data visualizations contain data marks whose characteristics correspond to the first data attribute; and
in accordance with the determination that none of the displayed data visualizations contain data marks whose characteristics correspond to the first data attribute:
generating a specification for a new data visualization with the first data attribute; and
displaying the new data visualization.

9. The method of claim 8, wherein displaying the new data visualization further comprises:
determining a chart type based on the specification; and
generating and displaying the chart.

10. The method of claim 9, wherein the chart is positioned using a two-dimensional grid-based layout algorithm, automatically coordinated with other data visualizations.

11. The method of claim 1, further comprising:
creating a second set of one or more functional phrases by computing a second set of one or more analytical functions associated with the second set of one or more conversation centers;
selecting a first functional phrase from the second set of one or more functional phrases, wherein the first functional phrase comprises a parameterized data selection criterion;
selecting an initial range for values of the parameters of the parameterized data selection criterion;
displaying an editable user interface control corresponding to the parameterized data selection criterion, wherein the user interface control displays the current values of the parameters; and
ordering a displayed set of one or more editable user interface controls based on the order of queries in the second natural language command, wherein the order of queries is inferred while extracting the second set of one or more analytic phrases from the second natural language command.

12. The method of claim 11, further comprising:
detecting a user input to edit the user interface control; and
in response to detecting the user input, adjusting the first functional phrase according to the user input.

13. The method of claim 12, wherein the user interface control displays a slider, and detecting the user input comprises detecting a sliding of the slider.

14. The method of claim 11, wherein ordering the displayed set of one or more editable user interface controls further comprises performing compact placement of small word-scale visualization within text using a library.

15. The method of claim 1, further comprising:
   determining a first token in the second natural language command that does not correspond to any of the analytic phrases in the second set of one or more analytic phrases;
   searching for a correctly spelled term corresponding to the first token using a search library by comparing the first token with one or more features of the first dataset;
   substituting the correctly spelled term for the first token in the second natural language command to obtain a third natural language command; and
   extracting the second set of one or more analytic phrases from the third natural language command.

16. The method of claim 15, wherein the one or more features include data attributes, cell values, and related keywords of the first dataset.

17. The method of claim 15, further comprising:
   determining whether there is no correctly spelled term corresponding to the first token; and
   in accordance with a determination that there is no correctly spelled term corresponding to the first token:
      parsing the second natural language command to obtain a parse tree;
      pruning the parse tree to remove the portion of the tree corresponding to the first token; and
      extracting the second set of one or more analytic phrases based on the pruned parse tree.

18. The method of claim 17, further comprising generating a textual feedback indicating that the first token was unrecognized and accordingly removed from the second natural language command.

19. The method of claim 15, further comprising displaying the first token.

20. The method of claim 15, further comprising generating a textual feedback indicating that the correctly spelled term is substituted for the first token in the second natural language command.

21. The method of claim 20, further comprising displaying and highlighting the correctly spelled term.

22. An electronic device, comprising:
   a display;
   one or more hardware processors;
   memory; and
   one or more programs, wherein the one or more programs are stored in the memory and configured to be executed by the one or more hardware processors, the one or more programs including instructions for:
      displaying a data visualization based on a first dataset retrieved from a database using a first set of one or more queries;
      receiving a first user input to specify a first natural language command related to the data visualization;
      extracting a first set of one or more independent analytic phrases from the first natural language command;
      computing a first set of one or more conversation centers associated with the first natural language command based on the first set of one or more analytic phrases;
      creating a first set of one or more functional phrases by computing a first set of analytical functions associated with the first set of one or more conversation centers;
      updating the data visualization based on the first set of one or more functional phrases;
      receiving a second user input to specify a second natural language command related to the updated data visualization;
      extracting a second set of one or more independent analytic phrases from the second natural language command;
      computing a temporary set of one or more conversation centers associated with the second natural language command based on the second set of one or more analytic phrases;
      deriving a second set of one or more conversation centers from the first set of one or more conversation centers and the temporary set of one or more conversation centers using one or more transitional rules; and
      updating the data visualization based on the second set of one or more conversation centers, wherein the updating comprises:
         determining one or more data attributes corresponding to the second set of one or more conversation centers;
         scanning displayed data visualizations to identify one or more of the displayed data visualizations that contain data marks whose characteristics correspond to a first data attribute in the one or more data attributes; and
         highlighting the data marks whose characteristics correspond to the first data attribute.

23. A non-transitory computer readable storage medium storing one or more programs configured for execution by an electronic device with a display, the one or more programs comprising instructions for:
   displaying a data visualization based on a first dataset retrieved from a database using a first set of one or more queries;
   receiving a first user input to specify a first natural language command related to the data visualization;
   extracting a first set of one or more independent analytic phrases from the first natural language command;
   computing a first set of one or more conversation centers associated with the first natural language command based on the first set of one or more analytic phrases;
   creating a first set of one or more functional phrases by computing a first set of analytical functions associated with the first set of one or more conversation centers;
   updating the data visualization based on the first set of one or more functional phrases;
   receiving a second user input to specify a second natural language command related to the updated data visualization;
   extracting a second set of one or more independent analytic phrases from the second natural language command;
   computing a temporary set of one or more conversation centers associated with the second natural language command based on the second set of one or more analytic phrases;
   deriving a second set of one or more conversation centers from the first set of one or more conversation centers and the temporary set of one or more conversation centers using one or more transitional rules; and
   updating the data visualization based on the second set of one or more conversation centers, wherein the updating comprises:
      determining one or more data attributes corresponding to the second set of one or more conversation centers;

scanning displayed data visualizations to identify one or more of the displayed data visualizations that contain data marks whose characteristics correspond to a first data attribute in the one or more data attributes; and highlighting the data marks whose characteristics correspond to the first data attribute.

* * * * *